US008470279B2

(12) United States Patent
Hinman et al.

(10) Patent No.: US 8,470,279 B2
(45) Date of Patent: *Jun. 25, 2013

(54) HIGH PURITY SILICON-CONTAINING PRODUCTS AND METHOD OF MANUFACTURE

(75) Inventors: Norman D. Hinman, Centennial, CO (US); Jerome P. Downey, Butte, MT (US); Guy Lawrence Fredrickson, Idaho Falls, ID (US); Antonio E. Blandon, Westminster, CO (US)

(73) Assignee: Si Options, LLC, Centennial, CO (US)

( * ) Notice: Subject to any disclaimer, the term of this patent is extended or adjusted under 35 U.S.C. 154(b) by 657 days.

This patent is subject to a terminal disclaimer.

(21) Appl. No.: 12/649,200

(22) Filed: Dec. 29, 2009

(65) Prior Publication Data

US 2011/0008236 A1 Jan. 13, 2011

Related U.S. Application Data

(63) Continuation-in-part of application No. 11/248,368, filed on Oct. 12, 2005, now Pat. No. 7,638,108, which is a continuation-in-part of application No. 10/822,924, filed on Apr. 13, 2004, now Pat. No. 7,588,745.

(60) Provisional application No. 61/174,376, filed on Apr. 30, 2009.

(51) Int. Cl.
*C01B 33/12* (2006.01)

(52) U.S. Cl. .................................. 423/335; 423/345

(58) Field of Classification Search ............. 423/335, 423/345; 502/413

See application file for complete search history.

(56) References Cited

U.S. PATENT DOCUMENTS

| | | | |
|---|---|---|---|
| 3,855,395 A | 12/1974 | Cutler | |
| 4,214,920 A | 7/1980 | Amick et al. | |
| 4,247,528 A | 1/1981 | Dosaj et al. | |
| 4,248,844 A | 2/1981 | Ramsey, Jr. | |
| 4,428,916 A | 1/1984 | Komeya et al. | |
| 4,483,839 A | 11/1984 | Sugiura et al. | |
| 4,504,453 A | 3/1985 | Tanaka et al. | |
| 4,591,492 A | 5/1986 | Tanaka et al. | |
| 4,610,896 A | 9/1986 | Veltri et al. | |
| 4,960,573 A | 10/1990 | Okutani et al. | |
| 5,085,582 A | 2/1992 | Edler | |
| 5,364,608 A | 11/1994 | Edler | |
| 5,782,982 A | 7/1998 | Farone et al. | |
| 6,090,361 A | 7/2000 | Baba et al. | |
| 6,117,810 A | 9/2000 | Lee et al. | |
| 6,375,735 B1 | 4/2002 | Stephens et al. | |
| 6,406,678 B1 | 6/2002 | Shipley | |
| 7,588,745 B2 * | 9/2009 | Hinman et al. | 423/345 |
| 7,638,108 B2 * | 12/2009 | Hinman et al. | 423/345 |
| 2003/0012720 A1 | 1/2003 | Victor et al. | |

FOREIGN PATENT DOCUMENTS

| | | |
|---|---|---|
| CN | 1449996 | 10/2003 |
| JP | 60016811 | 1/1985 |
| JP | 62017012 | 1/1987 |
| JP | 8104513 | 4/1996 |
| JP | 2002-265257 | 9/2002 |
| RU | 2144498 C1 | 1/2000 |
| WO | WO 02/06157 A1 | 1/2002 |
| WO | WO 02/066372 A1 | 8/2002 |

OTHER PUBLICATIONS

Chakraverty, A et al., Investigation of Combustion of Raw and Acid-Leached Rice Husk for Production of Pure Amorphous White Silica, Journal of Materials Science, 1988, No. 23, pp. 21-24, Chapman and Hall.

Chakraverty, A. et a., Production of Amorphous Silica from Rich Husk in a Vertical Furnace, Agricultural Mechanization in Asia, Africa and Latin America, Autumn 1990, vol. 21, No. 4, pp. 69-75, Farm Machinery Industrial Research Corp.

Chen, Jen-Min et al., Rice Husk as a Source of High Purity Carbon/Silica to Produce Silicon Tetrachloride, Proceedings of the National Science Council, Republic of China, Sep. 1991, vol. 15, No. 5, pp. 412-420, National Science Counsel.

Conradt, R., et al., Nano-structured Silica from Rice Husk, Journal of Non-Crystalline Solids, 1992, No. 145, pp. 75-79, Proceedings of the Third International Symposium on Aerogels.

Farag, L.M., et al., Bilancio di Material ed Energia per la Produzione di Carburo di Silicio da Lolla di Riso, Ceramurgia, 1985, vol. 15, No. 5, pp. 206-213.

Hunt, L. P. et al., Rice Hulls as a Raw Material for producing Silicon, Journal of the Electrochemical Society; Solid-State Science and Technology, Jul. 1984, vol. 131, No. 7, pp. 1683-1686.

Kaleemullah, S., Thermogravimetric analysis of paddy straw, The Madras Agricultural Journal, Oct.-Dec. 2001, No. 88, pp. 582-585, Tamil Nadu Agricultural University.

Krishnarao, R.V. et al., Formation of SiC from Rice Husk Silica-Carbon Black Mixture; Effect of Rapid Heating, Ceramics International, 1996, No. 22, pp. 489-492, Elsevier Science Limited.

Liou, Tzong-Horng et al., Pyrolysis Kinetics of Acid-Leached Rice Husk, Ind. Eng. Chem. Res., 1997, No. 36, pp. 568-573, American Chemical Society.

Lyudvinskaya, T. et al. Formation of Silicon Nitride at Treatment of Rick Husk, Latvian Journal of Chemistry, 1992, No. 6, pp. 724-728.

Mizuki, E. et al., Formation of Silicon Carbide from Rice Husks Using Enzymatic Methods for Carbon Control, Bioresource Technology, 1993, No. 44, pp. 47-51, Elsevier Applied Science.

(Continued)

*Primary Examiner* — Edward Johnson
(74) *Attorney, Agent, or Firm* — Locke Lord, LLP

(57) ABSTRACT

Silicon-containing products, such as silicon, silicon carbide and silicon nitride, containing less than 0.01 weight percent total mineral impurities and selectively determined carbon-to-silicon ratios. The products are derived from plant matter, such as rice hulls and rice straw, containing at least three weight percent silica. Methods are provided for making such high purity silicon-containing products by leaching silica-containing plant matter with aqueous sulfuric acid under controlled temperatures, pressures and reaction times to remove minerals and metals while adjusting the mole ratio of fixed carbon to silica, and then thermally treating under controlled conditions to produce the desired product.

58 Claims, 18 Drawing Sheets
(1 of 18 Drawing Sheet(s) Filed in Color)

OTHER PUBLICATIONS

Patel, M. et al., Effect of Thermal and Chemical Treatments on Carbon and Silica Contents in Rice Husk, Journal of Materials Science, 1987, No. 22, pp. 2457-2464, Chapman and Hall.

Rahman, I.A., Preparation of Si3N4 by Carbothernal Reduction of Digested Rice Husk, Ceramics International, 1994, No. 20, pp. 195-199, Elsevier Science Limited.

Real, Concho et al., Preparation of Silica from Rice Husks, Journal of the American Ceramic Society, Aug. 1996, vol. 79, No. 8, pp. 2012-2016, American Ceramic Society.

Sun Luyi, et al., Silcon-Based Materials from Rice Husks and Their Applications, Ind. Eng. Chem. Res., 2001, No. 40, pp. 5861-5877, American Chemical Society.

Temerdashev, Z. A. et al., Physiochemical Principles of Thermal Utilization of Rice Husk and its Hydrolyzed, Izbestiya Vysshikh Uchebnykh Zavedenii Severo-Kavkazskii Region Estestvennye Nauki, 1998, No. 4, pp. 68-71 (with English abstract).

Yalcin, N. et al., Studies on Silica Obtained from Rice Husk, Ceramics International, 2001, No. 27, pp. 219-224, Elsevier Science Limited.

I.A.Rahman, Preparation of SI3N4, by Carbothermal Reduction of Digested Rice Husk, Ceramics international 20, 1994, pp. 195-199, Oxford, GB.

* cited by examiner

HIGH PURITY SILICON-CONTAINING PRODUCTS AND METHOD OF MANUFACTURE

REFERENCE TO RELATED APPLICATIONS

This application is a continuation-in-part of U.S. application Ser. No. 11/248,368, filed Oct. 12, 2005, now U.S. Pat. No. 7,638,108, which is a continuation-in-part of U.S. application Ser. No. 10/822,924, filed Apr. 13, 2004, now U.S. Pat. No. 7,588,745, and this application also claims the benefit of U.S. Provisional Application No. 61/174,376, filed Apr. 30, 2009.

BACKGROUND OF THE INVENTION

1. Technical Field

This invention relates generally to various silicon-containing products and to methods for making such products from starting materials obtained from plant matter or processed plant matter having a silica content greater than about three weight percent, most preferably rice hulls and rice straw. One aspect of the invention relates to the production of silicon, silicon carbide, silicon nitride, silicon tetrachloride and other carbon-silica products from silica-containing plant matter such as rice hulls and rice straw. Another aspect of the invention relates to silicon-containing products having total mineral impurities lower than 1,000 ppm and phosphorus contents lower than 400 ppm. Another aspect of the invention relates to photovoltaic-grade silicon made from rice hulls and rice straw. Another aspect of the invention relates to intermediate carbon-silica products as defined herein that have low mineral contents previously unattainable using leaching processes and desired ratios of fixed carbon to silica. Another aspect of the invention relates to high purity carbon-silica products as defined herein that are made by leaching silicon-containing plant matter with sulfuric acid for controlled periods at controlled temperatures to achieve desired ratios of fixed carbon to silica. Another aspect of the invention relates to chemical and thermal methods for removing and recovering volatile carbon from compositions made by the leaching process, and to the resultant devolatilized carbon-silica products. Another aspect of the invention relates to silicon-containing products such as silicon, silicon carbide and silicon nitride made from leached and devolatilized, high purity, carbon-silica products using a carbothermal process.

2. Description of Related Art

The unique performance properties of high purity silicon have made the development of the semiconductor industry possible and are important to the rapidly growing photovoltaic industry. Other well known silicon-containing materials include, for example, silicon carbide and silicon nitride, which, in certain forms, are used to produce high performance ceramics and high performance composites. These, and other silicon-containing materials, are used in a variety of applications including electronics, defense, automotive, aerospace, industrial wear parts, advanced glasses, and in chemical and environmental products.

The photovoltaic industry is growing at a rapid pace, but the cost of silicon is one of the deterrents to even faster growth and to the production of bulk power using photovoltaic panels. Due to a lack of cost-effective processes for making solar-grade silicon, a majority of solar cells are presently made from the more pure and more costly semiconductor-grade silicon. Likewise, the demand for high performance ceramics and composites is growing, but the promise of these industries is hampered by the high cost of materials such as silicon carbide and silicon nitride.

The production of essentially all materials and products containing silicon involves the reaction of carbon and silica ($SiO_2$) at a very high temperature, often referred to as a carbothermal reduction. The carbon "pulls" oxygen atoms off the silica and the resulting carbon monoxide exits the reactor as a gas, leaving behind the silicon product. If the desired product is silicon by itself, then the molar ratio of fixed carbon to silica for this reaction should be 2:1 as shown below:

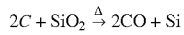

$$2C + SiO_2 \xrightarrow{\Delta} 2CO + Si$$

If the desired product is silicon carbide (SiC), the molar ratio for the reaction should be approximately 3:1, as shown by the following formula:

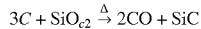

$$3C + SiO_{c2} \xrightarrow{\Delta} 2CO + SiC$$

Other Si-based products, such as ferrosilicon (FeSi) and silicon nitride ($Si_3N_4$) and silicon tetrachloride ($SiCl_4$) can be produced using the same reactions between carbon and silica. For example, to make silicon nitride, two moles of carbon are used per mole of silica, while the reaction is carried out under a nitrogen-containing atmosphere.

The standard commercial process for producing silicon involves the mixing of a carbon source such as coke with crystalline silica, i.e. sand or quartz, in a predetermined ratio and reacting this mixture to produce metallurgical grade silicon. Because the coal and sand particles are large and not very porous, with limited contact and available surface area, the rate of reaction using the conventional feedstocks is slow, typically taking more than a day to complete. As a result, the energy requirements for this carbothermal process are high, and the silicon produced is often less than 99% pure. Silicon produced in this manner is suitable for applications in the aluminum and certain chemical industries, but is not of adequate purity for such applications as the semiconductor and photovoltaic industries. Very expensive and complicated processes have previously been needed to upgrade the metallurgical silicon to photovoltaic and semiconductor grade materials.

Similarly, silicon carbide produced using the slow and energy-intensive Acheson process is costly and is limited to use in the metallurgical, refractory and abrasives industries and in other applications that do not require high purity, small particle size, and/or whiskers or fibers. The production of high-end silicon carbide powders has previously required the use of processes that are even more expensive and complicated.

Silicon nitride can be produced through a variety of processes and is often made commercially using expensive starting materials such as silicon tetrachloride. The resultant powder, although commercially desirable, is too expensive for use in all but a few high-end applications.

During the past 20 years, several researchers have investigated the use of rice plants as a source of silica for industrial products. All plant matter contains significant amounts of carbon and many types of plants contain silica. The rice plant is perhaps one of the most unique because of its high concentrations of silica. Whereas the mineral content of most plants is, for example, about 1-2%, the rice plant typically has a mineral content of about 11-23%. More significantly, about 75-95% of the mineral content of the rice plant is silica. Rice straw contains about 11% silica and rice hulls typically contain about 15-23% silica. Although rice is one of the most abundant crops grown worldwide, to date there has been little practical use for rice hulls and rice straw, which constitute a considerable portion of the rice plant.

Rice hulls are the natural sheaths that form on rice grains during their growth. They are removed during the refining of rice and are a waste or low value by-product of the rice milling industry. Rice straw consists of stem, leaf sheathes, leaf blades and the remains of the panicle after harvesting. Generally, the amount of rice straw obtained from rice plants is at least equal to the rough yield of rice harvested. Because of their high silica content, these materials have little value as components of animal feeds. Because rice hulls and rice straw have a relatively large amount of potassium that interacts with the silica at combustion temperatures to produce boiler slag and deposits, and have a large fraction of noncombustible ash, they are similarly viewed as being a poor fuel source. If rice hulls and rice straw are burned as fuel, the relatively high ash content of both rice hulls and rice straw requires special handling equipment. For these reasons, rice hulls are frequently deposited in landfills and rice straw is usually burned in the fields. Thus, rice hulls and rice straw have little-to-no commercial value and have historically presented a disposal problem.

Nevertheless, rice hulls and rice straw continue to be an attractive source of silica because of the high silica content and low cost. Most of the organic material in rice hulls can be removed by combustion. The ash produced from such combustion processes comprises up to about 95% silica, but still contains non-silica mineral impurities. Several investigators have studied the removal of non-silica minerals from rice hulls in order to create value-added products from the "purified" hulls.

L. P. Hunt, J. P. Dismukes, J. A. Amick, "Rice Hulls as a Raw Material for Producing Silicon," *J. Electrochem. Soc.*, 131(7), 1984, investigated the potential use of rice hulls for producing silicon pure enough for fabrication into solar cells and low enough in cost so that photovoltaic energy could be more cost-competitive with conventional energy sources. Following grinding of raw rice hulls to −20 to +80 mesh, washing and drying, two samples of the dried hulls were leached for 15 minutes under boiling conditions with HCl: deionized water at 1:3 and 1:10, respectively. Leaching with 1:10 acid solution was found to be just as effective as 1:3 acid solution. However, leaching a sample with the weaker acid solution for 5 hours at 50° C. did not reduce impurity concentrations to levels as low as those attained under boiling conditions. Three rice hull samples from different sources were acid leached for 15 minutes in boiling 1:10 HCl acid solution. Concentrations of calcium, potassium, magnesium and manganese were reduced by factors of 40-100 times (97.5 to 99% removal). Sulfur concentration was reduced by a factor of 8 (87.5% removal); sodium and phosphorus concentrations were reduced by a factor of about 3 (67% removal); boron, aluminum and iron concentrations were not reduced. The investigators reported that raw rice hulls have a total non-silica mineral impurity concentration about 30 times greater than that of leached hulls (overall 96.7%), and projected that an acid-leached and coked product is of interest as a raw material for the production of solar-grade silicon. However, it was noted that since the phosphorus/boron ratio exceeded 10, eventual fabrication of solar cells would require a different process to substantially reduce the concentration of phosphorus, which was reported at 40 ppm (averaged).

The effect of porosity on encouraging the production of silicon carbide whiskers as well as the importance of porosity in removing mineral impurities is disclosed in U.S. Pat. No. 4,504,453 (1985) to Tanaka.

M Patel, A. Karera and P. Prasanna, "Effect of thermal and chemical treatments on carbon and silica contents in rice husk," *J. Mater Sci*, 22 (7), 1987, report subjecting rice husk samples obtained from the vicinity of Bhopal, India, to treatment with laboratory grade hydrochloric (4 to 12 N), sulfuric (2 N) or nitric (8 N) acid for 2 to 6 hours at 100° C. The authors concluded that $SiO_2$ of 99% purity (10,000 ppm of non-silica minerals, which is a high impurity level for high purity applications) can be produced from rice husk treated with HCl, followed by carbonization at temperatures below 700° C. to avoid any transformation of amorphous to crystalline form, and that the purity cannot be increased above 99% because the remaining 1% may be metal oxides insoluble in acid. They also reported that reflux reactions are difficult to carry out in sulfuric or nitric acid, and therefore only limited experiments were performed. The authors also reported that they were able to achieve a carbon:silica ratio of 2:1 by partial coking or rice hulls. However, this was a mass ratio that corresponds to a mole ratio of 10:1, whereas the desired molar ratios are in the range of 3:1 to 2:1.

A. Chakraverty, P. Mishra and H. D. Banerjee, "Investigation of combustion of raw and acid-leached rice husk for production of pure amorphous white silica,"*J. Mater Sci,* 23(1), 1988, disclosed milling cleaned and dried rice husks to a particle size of about 40 mesh, leaching in hydrochloric (1 N, 3 N, 5 N and 11.3 N), sulfuric (1N, 4.5 N, 9 N and 18 N) and nitric (4.5 N, 9N and 18N) acid at 50° C. for 2 hours, washing with distilled water, and drying. The acid-leached husks were then combusted at temperatures ranging from 500 to 700° C. Acid treatment with sulfuric acid was less effective than leaching with either hydrochloric acid or nitric acid at comparable concentrations for reducing the concentrations of oxides of sodium, potassium, calcium, iron, magnesium, manganese, zinc and copper. The overall metallic impurity level (reported as oxides) ranged from 300-747 ppm for samples treated with hydrochloric acid, from 496-688 ppm for samples treated with nitric acid, and from 3534-4483 ppm for samples treated with sulfuric acid. Even the best performance, achieved using 11.3 N HCl, failed to produce a 99% reduction in the identified non-silica impurities. No data was presented regarding phosphorus levels either before or after treatment.

R. Conradt, P. Pimkhaokham and U. Leela-Adisorn, "Nano-structured silica from rice husk", *J. of Non-Crystalline Solids,* 145 (1992) 75-79, report the acid leaching of washed That rice husk by reflux boiling in 2.4 molar hydrochloric acid or 3.6 molar sulfuric acid for 3 hours at a ratio of 100 g. husk/liter. The leached husks were subsequently incinerated at 600° C. and characterized. The investigators concluded that omission of acid pre-treatment yielded a considerably reduced surface area in the incinerated products. Specific surface areas of 180-250 sq. m/g. are reported for the silica prepared from rice husks. The best non-silica mineral level achieved in the ash obtained from rice hulls pretreated with HCl was 6500 ppm. The best non-silica mineral purity level in the ash obtained from rice hulls pretreated with sulfuric acid was 10,000 ppm.

I. A. Rahman, "Preparation of $Si_3N_4$ by Carbothermal Reduction of Digested Rice Husk," *Ceramics Int'l* (1994), investigated the production of carbon and silica through digestion of rice husk using nitric acid. About 30 g of pre-washed rice husk was digested in 300 ml of nitric acid at 60° C. The concentration of acid was varied from 10M to 14M.

During digestion (for up to 7 hrs. with continuous stirring), the temperature was carefully controlled. The digested husk was then filtered and washed with distilled water until neutral. The overall non-silica mineral level (reported as oxides) in the digested husks was reported to be 2,500 ppm. The digested husk was pyrolysed at 800° C. to a constant weight under a flow of argon gas. The carbon content of pyrolysed digested husk was determined by heating at 700° C. in air for one hour. Rahman reported that after more than 3 hours digestion in 12M nitric acid, the digestion product obtained was in the stoichiometric ratio of $2C/SiO_2$ and that higher concentrations could not produce the desired ratio. Lower concentrations required a longer time to produce a suitable carbon-silica mixture. The weight loss after heating was considered to be the amount of carbon present in the pyrolysed digested husk, and the residue was considered to be pure silica. Next, the pyrolysed powder was nitrided by heating in a furnace in a controlled nitrogen atmosphere, raising the temperature gradually to 1430° C., after which the products were burned in a muffle furnace at about 700° C. for 30 min. to remove any excess carbon. The most important factor contributing to the completeness of reaction was found to be the homogeneity of mixing, and the use of rice husk was said to be an advantage, as the silica and carbon are naturally mixed.

C. Real, M. Alcala and J. Criado, "Preparation of Silica from Rice Husks," *J. Am. Ceram. Soc.*, 79(8) 1996, investigated a procedure for obtaining pure silica gel with a high specific surface area from rice husks and reported that silica with >99% purity can be obtained by burning rice husks at 600° C. under inert atmosphere, followed by the combustion of the residual carbon under oxygen atmosphere at the same temperature, provided that either the husks used as raw material or the silica obtained as final product have been leached previously in boiling 10% hydrochloric acid solution for 2 hrs. However, the yield of a silica gel with a high specific surface area and a homogeneous distribution of nanometric particles requires either the preliminary leaching of the rice husks with diluted hydrochloric acid or its washing with boiling water to remove the $K^+$ cations.

R. V. Krishnarao and J. Subrahmanyam, "Formation of SiC from Rice Husk Silica-Carbon Black Mixture: Effect of Rapid Heating," *Ceramics Int'l*, 22 (1996) 489-492, demonstrated that porosity is important for the production of silicon carbide whisker.

N. Yalcin and V. Sevinc, "Studies on silica obtained from rice husk," *Ceramics Int'l* 27 (2001) 219-224, report leaching of washed and dried rice husks by reflux boiling in 3% (v/v) HCl or in 10% (v/v) sulfuric acid for 2 hours at a ratio of 50 g. husk/l, or by leaching with 3% (v/v) NaOH solution for 24 h at room temperature at a ratio of 50 g husk/l. After leaching the husk was thoroughly washed with distilled water, dried in an air oven at 110° C. and then burned in a muffle furnace at 600° C. by four different methods. The investigators found that the silica content of rice husk ashes was strongly dependent upon the type of chemical used for leaching the rice husks prior to incineration. Reported $SiO_2$ content (wt %) was 99.60±0.05 (4000 ppm) for the ash samples where the husks were pre-leached with 10% (v/v) sulfuric acid (v/v) for 2 hr. at the boiling point, and 99.66±0.02 (3400 ppm) for the ash samples where the husks were both pre- and post-leached with 3% HCl (v/v) for 2 hr. at the boiling point. The sample leached with sulfuric acid before incineration exhibited a BET specific surface of 282 $m^2/g$.

Except for Hunt et al and Rahman et al., the foregoing references do not suggest that the carbon found in rice hulls can be used as a source of carbon to be reacted with the silica in rice hulls to form desired products. Instead, the rice hulls are burned to form ash, thereby removing all of the carbon, after which the ash is treated with acid to remove minerals from the resulting silica. However, because the removal of $K^+$ prior to heating the rice hulls allows the silica to maintain a higher specific surface area and smaller particle size upon heating, Real et al. in 1996 demonstrated that it is advantageous to carry out acid leaching prior to using combustion to reduce the rice hulls to silica. In either situation, the resulting silica is combined with carbon or another reducing agent from another source in order to produce the desired silicon-containing product.

Rice hulls contain both fixed and volatile carbon. Fixed carbon is retained in the solids to high enough temperatures to react with silica to form products, while volatile carbon is volatilized at relatively low temperatures, making it unavailable to react with the silica. The mole ratio of fixed carbon to silica in untreated rice hulls is about 4:1. Consequently, the mole ratio must be adjusted to the proper ratio for the desired product (e.g., about 3:1 for SiC and about 2:1 for Si). It is important to note that this is a mole ratio and is not a mass percentage ratio, as is sometimes used in the prior art. Even a mass percentage ratio as low as 1:1 correlates to a mole ratio of about 5:1, which is well above what is required in most carbothermal reactions. Hunt et al. referenced the use of pyrolysis followed by controlled combustion with $CO_2$ to remove some of the fixed carbon after the mineral content had been previously reduced to moderate levels with HCl, which levels contained unacceptable amounts of phosphorus and no reduction of iron. Rahman et al. used concentrated nitric acid, which is a strong oxidizing agent that disintegrates organic material in the husk, to remove carbon. However, the mineral purity of the ash from the treated husks was still 2500 ppm, with an iron content at 200 ppm. No data was reported regarding phosphorus. As noted by Rahman et al., the high reactivity of the carbon after acid treatment, the retention of the high specific area of the silica after acid treatment and the intimate association of the silica and carbon in acid treated rice hulls should enhance the rate of reaction between the silica and the carbon at high temperatures.

To make materials that can cost effectively achieve the properties required for solar power and high performance materials, it is critical to develop processes that can achieve adjusted mole ratios of intimately associated fixed carbon and silica, and that can achieve very low levels of non-silica minerals, particularly phosphorus and iron, from plant material containing high levels of silica. These materials can then be used in less-expensive carbothermal processes to produce high-end silicon, silicon carbide, silicon nitride, silicon tetrachloride and other silicon-based products at a much lower cost than the current processes.

SUMMARY OF THE INVENTION

The present invention includes novel processes and intermediate products that can be used to produce high-performance, high purity end products such as silicon, silicon carbide (alpha- and beta-), silicon nitride, silicon tetrachloride and other high purity, silicon-containing products with lower energy requirements and higher throughputs at significantly lower costs than are experienced using conventional processes and/or feed materials. As used herein, the term "high purity" means end products that contain less than 1000 ppm total mineral impurities and phosphorus levels lower than 400 ppm, with phosphorus levels below 100 ppm being readily achievable.

According to a preferred method of the invention, naturally occurring plant matter, processed plant matter, or mixtures thereof containing at least about three weight percent silica is leached in either a single-stage or multi-stage process using a sulfuric acid solution at a controlled temperature for a suitable time. Leaching temperatures can range, for example, from ambient up to about 250° C. and leaching times can range, for example, from about 6 seconds up to about 48 hours. The solid carbon-silica products obtained from the leaching process contain a mole ratio of fixed carbon to silica of from about 1:1 or lower to about 5:1, very low levels of minerals, and high porosity and reactivity.

As used herein, the terms "mineral" and "minerals" exclude silica and mean one or more of sodium (Na), potassium (K), magnesium (MG), calcium (Ca), manganese (Mn), iron (Fe), aluminum (Al), boron (B) and phosphorus (P), whether present alone or in combinations with each other, or with other metals or atoms, such as oxygen. As used herein, the term "carbon-silica products" means products made by leaching rice hulls, rice straw or other plant matter containing at least three weight percent silicon with sulfuric acid under such conditions that the resultant material contains less than 1000 ppm total minerals and has a fixed carbon to silica ratio that can be adjusted chemically or thermally to achieve any desired ratio between 0.5:1 and 5:1. The fixed carbon and silica are intimately mixed on a micron or even submicron scale, and the silica is present in an amorphous form with large specific surface area.

The carbon-silica products of the invention are frangible and easily reducible to a fine powder form by milling or other suitable means. The devolatilized carbon-silica products of the invention embody all the advantages of the carbon-silica products mentioned above and also have low levels of volatile carbon. The devolatilized-carbon-silica products can easily be milled to fine powder. Pellets can be formed from either the devolatilized or undevolatilized carbon-silica products without adding external binders.

The carbon-silica products of the invention, whether or not devolatilized, milled or pelletized, can be further reacted in a controlled environment in a carbothermal reactor to produce desired silicon-containing products including but not limited to silicon, silicon carbide (alpha- or beta-), and silicon nitride and silicon tetrachloride. Many of the products made according to the improved carbothermal process of the invention are themselves believed to be novel because of their higher purities and enhanced performance characteristics. The high reactivity of the carbon after acid treatment, the retention of the high specific surface area of the silica after acid treatment, and the intimate association of the silica and carbon in the carbon-silica products of the invention enhance the rate of reaction between the silica and the carbon at high temperatures. During the carbothermal process, any remaining volatile carbon can also be removed and recovered if desired.

Because each particle of the carbon-silica products and devolatilized carbon-silica products of the invention embodies fixed carbon and silica interspersed at a micron, submicron, or even nanometric scale, the contact points between the silica and the carbon are numerous. Also, because the carbon and silica are amorphous and have large surface areas, the material reacts very fast when producing silicon-containing products. For example, reaction times of about 75 minutes to produce silicon carbide are readily achievable, compared to a day or more when conventional coal, or coke, and sand are used as feed materials. This in turn means that much less energy is required to produce the same amount of product. Because energy consumption is a major operating cost for the conventional carbothermal process, use of the process and materials disclosed herein should produce significant savings in operating costs.

According to one embodiment of the invention, a method is disclosed for leaching naturally occurring plant matter, processed plant matter, and mixtures of naturally occurring and processed plant matter embodying at least about 3 weight percent silica with sulfuric acid to produce carbon-silica products having total mineral contents lower than 1000 ppm. The use of rice hulls and rice straw as the plant matter is preferred. Rice hulls contain three basic components: 1) organic material comprised of molecules made up of carbon, oxygen, hydrogen, nitrogen and sulfur. 2) silica ($SiO_2$); and 3) minerals such as sodium (Na), magnesium (Mg), boron (B), aluminum (Al), phosphorus (P), potassium (K), calcium (Ca), manganese (Mn), and iron (Fe). Rice hulls do not contain free carbon per se. The production of all silicon (Si) containing products except silica ($SiO_2$) involve the reaction of free carbon (C) with silica ($SiO_2$). The free carbon (C) strips the oxygen atoms off of the silica and, depending on the amount of free carbon relative to silica, the temperature, and the gas atmosphere during reaction, the result will be silicon (Si) or silicon nitride ($Si_3N_4$) or silicon carbide (SiC). Furthermore, the commercial specifications for all of these products include limitations on the amount of minerals present.

According to another embodiment of the invention, a method is disclosed for making carbon-silica products comprising the steps of comminuting plant matter comprising at least 3 weight percent silica to a particle size ranging from about 10 microns to over 1 millimeter, and contacting and preferably mixing from about 1 to about 35 weight percent of the comminuted plant matter with a sulfuric acid solution having an acid concentration ranging from about 0.01 weight percent to about 30 weight percent at a temperature ranging from about 10° C. to about 250° C. for a time ranging from about six seconds to about 48 hours. During the leaching process, minerals are leached out of the plant matter and the ratio of fixed carbon to silica is preferably adjusted as discussed in greater detail below to a mole ratio of from at least about 1:1 up to about 5:1 or greater. Desired end products can then be produced from the intermediate carbon-silica product by further thermal or chemical treatments.

According to another embodiment of the invention, a leaching method is disclosed that comprises two or more stages of leaching. Following application of the leaching method as described above, leaching of the washed or unwashed material is repeated one or more additional times to further reduce the remaining mineral content and further adjust the ratio of fixed carbon to silica. Using the multi-stage leaching method disclosed herein, fixed carbon-to-silica mole ratios as low as 1:1 or lower can be achieved.

According to another embodiment of the invention, a leaching method is disclosed that is useful in either single or multiple stages for improved removal of minerals from naturally occurring or processed plant matter containing significant silica contents of greater than about 1 weight percent and preferably greater than 3-5 weight percent.

According to another embodiment of the invention, a leaching method is disclosed that is useful for reducing the amount of volatile carbon in naturally occurring or processed plant matter containing more than about 3 weight percent silica.

According to another embodiment of the invention, a leaching method is disclosed that is useful for reducing the amount of fixed carbon in naturally occurring or processed plant matter containing more than about 3 weight percent silica.

According to another embodiment of the invention, a leaching method is disclosed that is useful for converting volatile carbon into fixed carbon in naturally occurring or processed plant matter containing more than about 3 weight percent silica.

According to another embodiment of the invention, a leaching method is disclosed that is useful for increasing the porosity of the carbon and silica contained in naturally occurring or processed plant matter having more than 3 weight percent silica.

According to another embodiment of the invention, high purity carbon-silica products are disclosed that comprise fixed carbon and silica in a desired mole ratio and minerals at a level well below 0.1 weight percent. The high purity carbon-silica products exhibit significantly improved porosity and reactivity, and are a preferred material for use in making other silicon-containing products as disclosed below.

According to another embodiment of the invention, carbon-silica products are disclosed that have a mole ratio of fixed carbon to silica ranging from less than about 2:1 to greater than about 5:1, a total mineral content less than about 200 ppm, most preferably less than about 100 ppm, a boron content less than 1 ppm, and a phosphorus content less than 4 ppm.

According to another embodiment of the invention, carbon-silica products are disclosed in which the carbon and silica are intimately mixed at a micron, submicron or nanometric scale. These carbon-silica products can be produced in the form of a fine powder or made into pellets without the need for external binders, and are preferred for use in the subsequent production of silicon-containing products including, but not limited to, silicon carbide, silicon nitride, silicon, and silicon tetrachloride.

According to another embodiment of the invention, carbon-silica products are disclosed that comprise accessible internal void volume of from about 30% to about 90%, and most preferably greater than about 50%.

According to another embodiment of the invention, carbon-silica products are disclosed that are frangible and easily reduced in size with minimal energy consumption to powdered particles sizes in the fine (500 μm-50 μm), very fine (50 μm-5 μm) and ultrafine (5 μm-submicron) categories. The average size and size distribution of the resulting particles is controlled by the process parameters as disclosed herein according to the characteristics desired in the final silicon-containing products.

According to another embodiment of the invention, thermal and chemical devolatilization processes are disclosed that produce high purity, devolatilized carbon-silica products that exhibit significantly improved porosity and reactivity, and are themselves an embodiment of the invention. Both the devolatilized and undevolatilized products made by the inventive method are preferred materials for use in making other silicon-containing products, including, but not limited to, silicon carbide, silicon nitride, silicon, and silicon tetrachloride.

According to another embodiment of the invention, a carbothermal process is disclosed that generally involves heating the carbon-silica product and/or the devolatilized carbon-silica product as disclosed herein in a carbothermal reactor to a very high temperature to initiate reduction of the silica to a silicon-containing product. The carbothermal reactor desirably heats the presently disclosed carbon-silica product to about 1250° C. to about 2200° C., depending upon the silicon-containing product of interest. For silicon or silicon carbide, an inert atmosphere is used. For other products, different atmospheres are used in the carbothermal reactor. Both the carbothermal process and the high purity, silicon-containing products made by the process are inventions over the conventional methods and products.

Advantages achievable through use of the inventions disclosed herein can include, but are not limited to, energy savings attributable to reduced processing times and temperatures, energy production from the recovery of volatilized carbon, higher processing throughputs, higher silicon-containing product yields, higher removal of impurities, and resultant high performing silicon-containing products.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The invention is further described and explained in relation to the following figures of the drawings.

DETAILED DESCRIPTION OF PREFERRED EMBODIMENTS

Because of their uniquely high concentrations of silica, rice hulls and rice straw are especially well suited for use in the present invention, and the following description will focus on the use of rice hulls as the preferred embodiment. It is believed, however, that other naturally occurring or processed plant matter containing at least about 1 weight percent silica, and preferably at least about 3-5 weight percent silica can be similarly used. Rice hulls contain both fixed and volatile carbon, with volatile carbon being present primarily in the form of cellulose. Untreated rice hulls typically have a mole ratio of fixed carbon to silica of about 4:1, a volatile carbon to fixed carbon weight ratio of about 5.24, and a mineral content ranging from about one to about three weight percent (10,000 to 30,000 ppm).

Figure 1A:
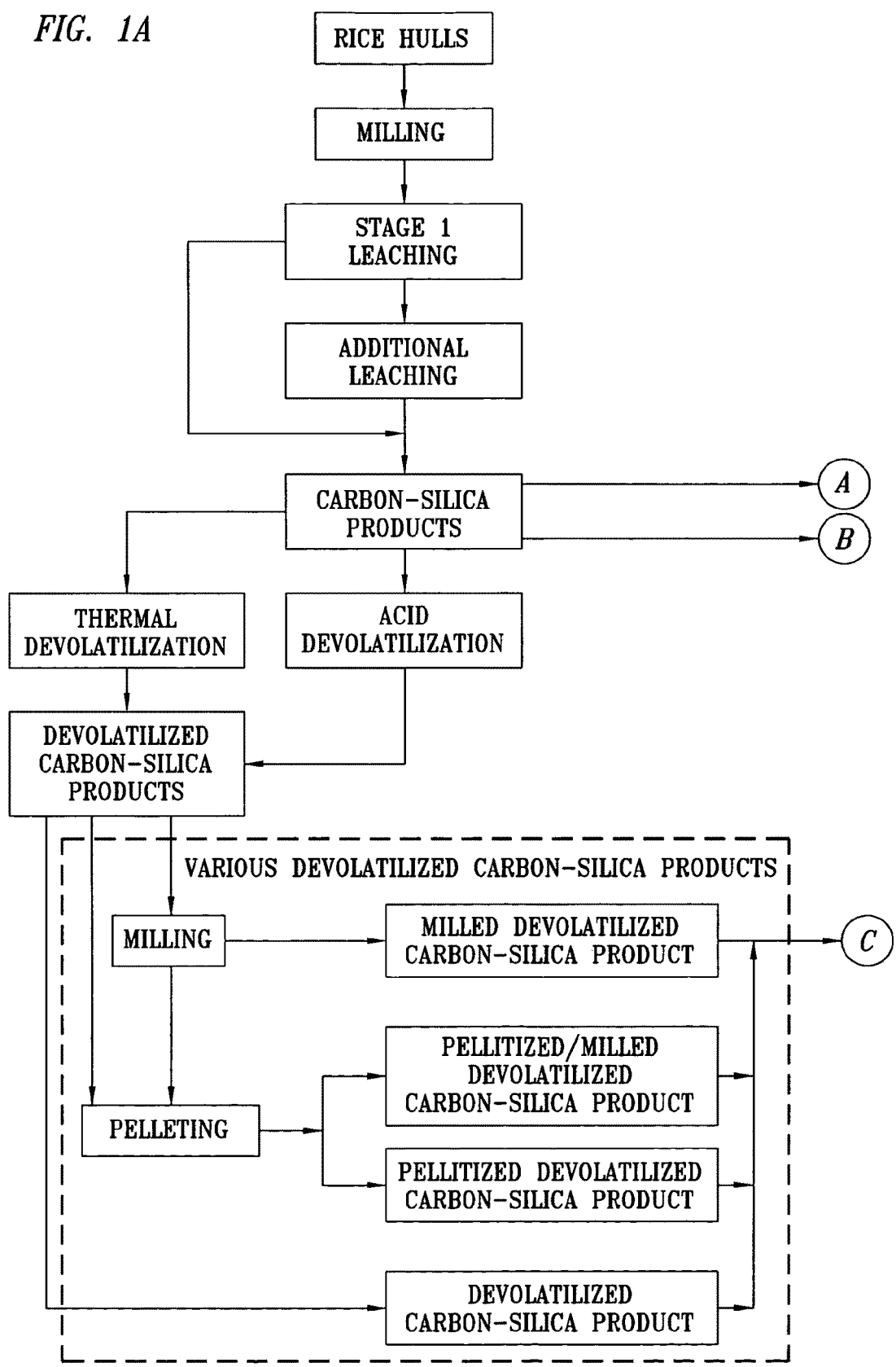
FIGS. 1A and 1B together comprise a process flow diagram illustrating in simplified form preferred methods by which the products disclosed herein are made from a preferred starting material such as rice hulls.
Figure 1B:
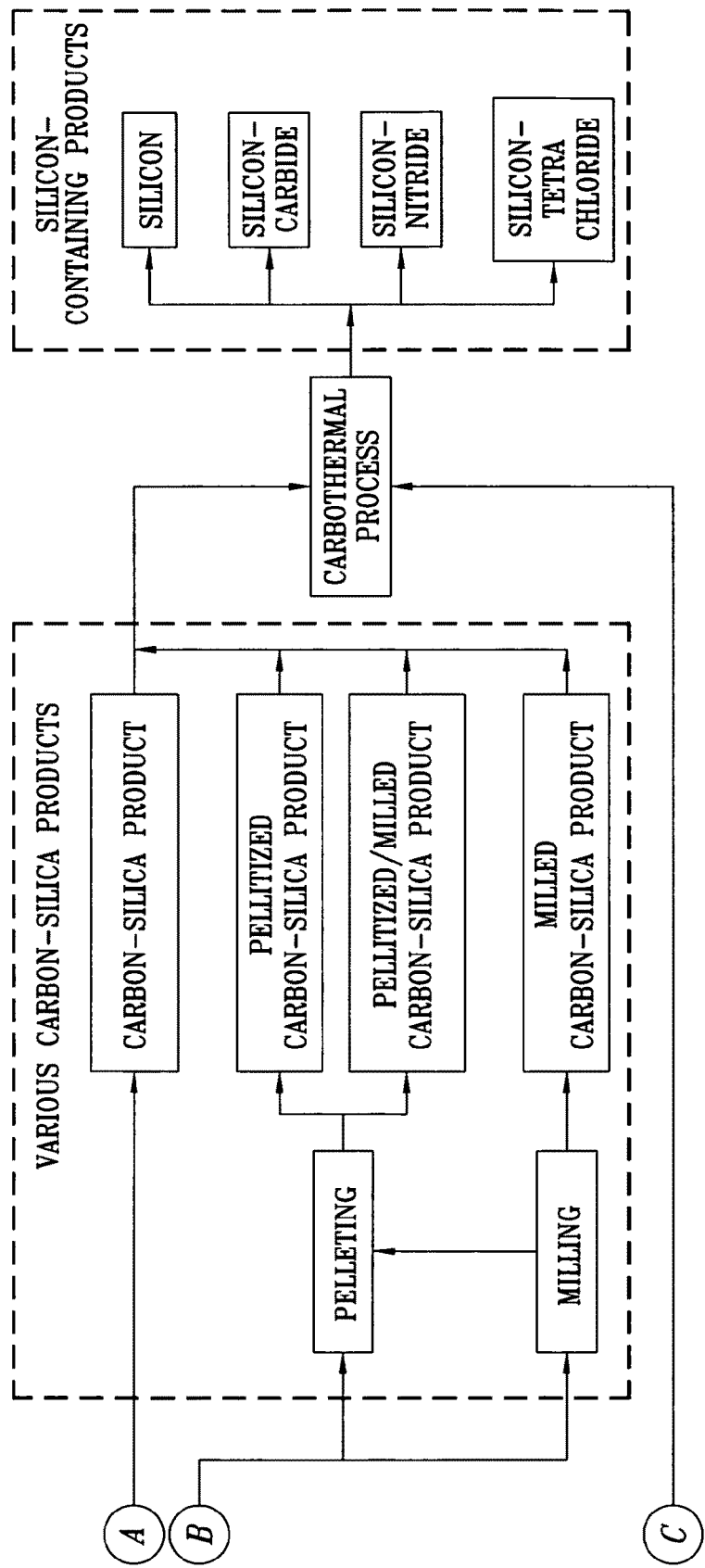
Figure 2:
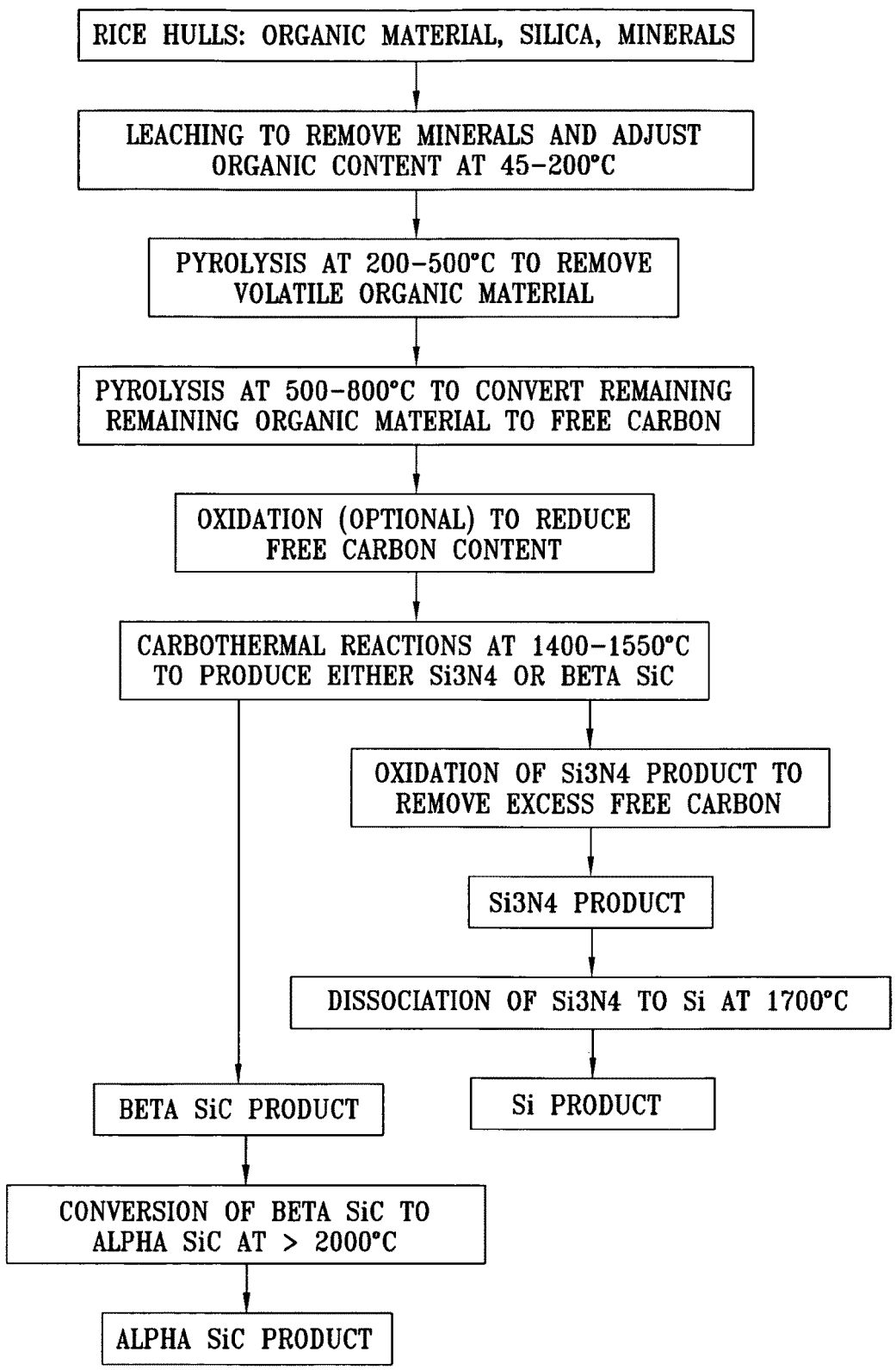
FIG. 2 is a process flow diagram illustrating in simplified form preferred methods for selectively converting rice hulls to high purity silicon carbide (alpha- or beta-), silicon nitride or silicon.

The methods of the invention are further described and explained with reference to FIGS. 1A and 1B. Rice hulls are desirably milled and screened to adjust the average particle size and to open up the hulls so that they can mix readily with aqueous sulfuric acid solutions as disclosed herein. The rice hulls are preferably milled to particle sizes ranging from about 10 μm to about 1 mm. An average particle size of about 150 μm provides good results. If the rice hulls contain dirt or other debris, they are preferably washed and dried before milling. Rice hulls obtained directly from a rice mill are usually relatively clean and require no washing and drying prior to milling.

Following milling, the rice hulls are preferably leached using an aqueous sulfuric acid solution. Sulfuric acid is believed to be particularly effective at removing mineral impurities, for adjusting the ratio of fixed carbon to silica in the leached rice hulls, for reducing the content of volatile carbon, and for increasing the porosity of the leached hulls. Suitable aqueous sulfuric acid solutions can comprise acid concentrations ranging from about 0.01 weight percent to more than 30 weight percent acid. From about 0.3 to about 1 weight percent acid is suitable for adjusting the mole ratio of fixed carbon to silica and for reducing minerals other than iron to very low levels. From about 1 to about 5 weight percent acid is suitable for accomplishing that which can be done in the low range plus reducing iron to the lowest levels. From about 5 to about 20 weight percent acid concentration is useful for removal of volatile carbon through the likely solubilization of cellulose. Sulfuric acid solutions more concentrated than about 30 weight percent are more expensive, extremely corrosive and, at high concentrations, may produce undesirable byproducts. By contrast, dilution of the sulfuric acid leaching solution to concentrations approaching the lower end of the range can reduce the effectiveness of the acid and increase the time required to achieve the desired product characteristics.

The solids concentrations that can be satisfactorily used in the leaching method of the invention can range from less than one percent to greater than 50 percent by weight of the resultant mixture, with concentrations preferably ranging from about one to about 45 weight percent. A solids concentration in the range of from about 1 to about 10 weight percent provides for optimum removal of phosphorus with a single stage of leaching. However, if extremely low levels of phosphorus are not critical, then a higher solids range of from about 10 to about 45 weight percent provides for reduced water and acid consumption and minimum energy use in drying the carbon-silica product. The leaching process can be performed in single or multiple stages in a batch or continuous mode, and with various types of reactors and reactor configurations as desired.

We have discovered that in rice hulls the silica is surrounded by an organic material that is removed by leaching in dilute sulfuric acid and that the removal is most effective at leaching temperatures between about 40 and about 140° C. It is believed to be important to remove this organic material to expose the surface of the silica particles, which particles have residual phosphorous and iron bound to them. Once this surface is exposed, the sulfuric acid can solubilize these bound minerals, allowing them to be removed from the material and allowing the lower levels of mineral impurities to be achieved. The solids and liquid are preferably mixed continuously during the leaching process so that all the solid particles are contacted by acid solution and so that heat is distributed throughout the mixture. Temperatures at boiling (94-100° C., depending upon elevation) can aid in agitating the mixture of rice hulls and aqueous sulfuric acid, depending upon the solids concentration. At temperatures below about 94° C., removal of the surrounding organic material is slowed, necessitating longer leaching times to achieve the reduced levels of mineral impurities that are otherwise achieved at higher leaching temperatures and shorter leaching times. However, we have discovered that, given sufficient leaching time, the organic material will be removed at temperatures at or below 94 deg C. and that the residual phosphorous and iron can be solubilized without going to temperatures above boiling. When leaching with sulfuric acid at temperatures below boiling for a sufficient time, sodium, potassium, calcium, magnesium and manganese are also effectively leached from rice hull to levels at or below 10 ppm for each mineral. The advantage to this is that the very lowest mineral levels can be achieved without using equipment that must withstand greater than atmospheric pressure. Temperatures below boiling (94-100° C.) are also suitable for adjusting the fixed carbon-to-silica mole ratio to values less than 3:1.

Although the phosphorus level is significantly reduced at temperatures below boiling, it is desirable to leach at temperatures above boiling, typically in the range of 120-140° C., to achieve removal of phosphorus to very low levels, such as less than 4 ppm, with shorter leaching times. The levels of iron are significantly reduced at temperatures below boiling, but it is desirable to leach at temperatures above boiling, typically in the range of about 120° C. to about 160° C. to achieve iron levels of 10-20 ppm with shorter leaching times. Because boron is naturally low in rice hulls, the resulting boron concentration is less than 1 ppm. The resulting low phosphorus and boron contents make this process and the unique carbon-silica product very attractive for the production of photovoltaic grade silicon for use in the production of solar cells, as well as for other industrial applications.

Test results show that temperature also has a significant effect on the removal of fixed carbon and consequently on the fixed carbon to silica mole ratio. Using sulfuric acid at leaching temperatures as low as 25° C., some fixed carbon is solubilized, but to remove enough fixed carbon to achieve the lower ratios of fixed carbon to silica, it is desirable to leach at temperatures at about boiling or above, preferably around 120° C. Temperature and time also have a significant effect on the removal of volatile carbon. At leaching temperatures above 160° C. and with relatively short reaction times, a large fraction of the volatile carbon is solubilized. On the other hand, at leaching temperatures above 160° C. and longer reaction times, the solubilized volatile carbon is converted to fixed carbon, which is incorporated into the solid, increasing the mole ratio of fixed carbon to silica. Although the rate and extent of solubilization of rice hull silica is increased with increasing temperatures, the overall percent of silica removed from the hulls is relatively small at any temperature.

Temperatures above 140° C., and especially above 160° C. are more effective for removing volatile carbon and, at longer reaction times, for increasing fixed carbon so that very high mole ratios of fixed carbon-to-silica ratios can be achieved. Depending upon acid strength, solids concentration, mixing, temperature and the desired product characteristics, leaching times can range from as low as about six seconds to about 48 hours or more. Thereafter, the remaining solids are preferably separated from the acid solution and washed with water. Use of this method increases the measured void volume of milled rice hulls from low values up to values ranging from at least about 30% to about 90%, with values greater than about 50% being generally preferred. At the same time, the leaching method disclosed herein removes a large portion of the minerals that may have originally been present in the silica-containing plant matter.

Using the leaching method of the invention, the fixed carbon to silica ratio can be adjusted as desired by controlling the sulfuric acid concentration, solids concentration, temperature, residence time and degree of mixing to produce carbon-silica products of high purity, high porosity, high reactivity, fine particle size, and intimately mixed fixed carbon and silica at mole ratios ranging from about 1:1 or less up to about 5:1 or greater. A particular advantage of the subject method is that products can be selectively produced with fixed carbon-to-silica mole ratios of, for example, 1:1, 1.5:1, 2:1, 2.5:1, 3:1, 3.5:1, 4:1, 4.5:1, 5:1, or any preferred stoichiometric ratio for making various silicon-containing products.

The leaching method of the invention can be demonstrated with a bench scale apparatus in which reactions at or below boiling are carried out in a 3-liter Pyrex resin kettle using a temperature controlled heating mantle. A water-cooled condenser is attached to the top of the kettle to insure that the acid or solids concentration do not change during the reaction. Reactions above the boiling point of water are carried out in a 2-liter zirconium vessel. In both cases, a thermocouple is used to measure reactor temperature and a Teflon device is used to stir the contents of the reaction vessel. The reaction vessel and other components are preferably cleaned by treating with 50% HCl and then washed with demineralized water to remove any trace metal contaminants.

For leaching processes conducted at temperatures at or below boiling, the resin kettle is filled with an aqueous sulfuric acid solution and heated to the desired temperature. Once the kettle is at temperature, milled hulls are added to the kettle to give the desired solids concentration. The milled hulls immediately form a uniform mixture in the kettle and the mixture is periodically sampled. All samples are filtered and the filtered solids are washed several times with demineralized water. The washed solids samples are dried and are saved along with the filtrate for analysis.

For laboratory reactions above boiling, an aqueous sulfuric acid solution and milled rice hulls are preferably added to a zirconium vessel. The vessel is sealed and heated with gas-fired heaters to the desired reaction temperature. Once at reaction temperature, the temperature is maintained for the duration of the reaction time and the reaction mixture is periodically sampled. At the end of the reaction time, the vessel is quickly cooled with a water spray to a temperature below boiling. Samples are immediately filtered and then washed several times with demineralized water. The washed solids samples are dried and saved together with the filtrate for analysis. It will be appreciated by those of ordinary skill in the art upon reading this disclosure that various types of conventional, commercially available industrial equipment can be used for scaling up the bench-scale experimental apparatus as described above, but altered as needed to achieve these results economically. Also, the order of adding solutions and materials to the reactor as well as the order of other steps, such as heating the reactor, can be varied to accommodate the scale of operation and the type of reactor.

Benefits from the leaching step can be accomplished using varying solids concentrations with sulfuric acid solutions of various strengths and reacted for varying times and temperatures. The mixing rate during leaching is desirably such that the solids and liquid are well mixed, so that acid and heat can be distributed throughout the mixture. Although leaching with water alone will produce some reduction of mineral impurities, the use of sulfuric acid is more effective at significantly reducing the mineral content, adjusting the fixed carbon to silica mole ratio, reducing the content of volatile carbon and improving the porosity of the rice hulls while retaining the desirable natural features of the rice hulls. Such features include intimate contact between the carbon and silica, amorphicity of the silica and carbon, and very high surface area of the silica and carbon.

Test results show that the total amount of solids in the mixture during the leaching step can also have an effect on the resulting fixed carbon to silica mole ratio. For a given temperature, acid concentration, and time, solids concentrations approaching 30% will provide higher fixed carbon to silica ratios than lower solids concentrations for single-stage leaching. Higher solids concentrations can also result in a higher phosphorus content in solids produced by a single-stage leaching operation. However, higher solids concentrations do not appear to affect the concentrations of other minerals or have a significant effect on the amount of silica in the solids.

Test results show that differences in practical leaching times do not have a significant effect on the extent of removal of any of the minerals from rice hulls with sulfuric acid solution. The differences in mineral content between samples collected at very short times of a minute or less and longer times are indistinguishable. However, time and temperature do affect the removal of fixed carbon. For example, at 94° C., 1% sulfuric acid and 10% solids, it takes about 300 minutes to remove the maximum amount of fixed carbon. By comparison, at 120° C., the time needed to achieve maximum removal of fixed carbon decreases to 120 minutes. Time is also important in the removal of volatile carbon and the conversion of volatile carbon to fixed carbon. For example at 200° C., 1% acid, 10% solids a significant amount of volatile carbon is released almost instantly providing a volatile carbon to fixed carbon ratio of 1.82 compared to 5.24 for rice hulls. As time progresses, the solubilized volatile carbon is converted to fixed carbon attached to the solid material. The result is that the volatile carbon to fixed carbon ratio continues to decline, reaching values of about 1.12. At the same time, the fixed carbon-to-silica mole ratio increases to 5:1. By comparison, the rate of solubilization of rice hull silica is slower. For example, at 94° C., 1% acid and 10% solids concentrations, it takes over 1400 minutes for the silica solid to achieve equilibrium with solubilized silica.

Test results show that sulfuric acid preferentially reduces the non-silica mineral content. Excluding iron, a minimal amount of sulfuric acid is needed to effect the removal of non-silica minerals. For example, for a given set of conditions, the maximum possible removal of non-silica minerals other than iron is achieved at acid concentrations as low as 0.3% and many of the minerals are effectively removed with as little as 0.06% acid. Higher concentrations of acid are needed to effect maximum removal of iron. For example, at 94° C. and 10% solids, maximum removal of iron is achieved at about 2.5% acid.

Acid concentration affects the rate of solubilization of carbon. For example, at 94° C., 10% solids, 100 minutes and 1% acid, the concentration of solubilized carbon in the acid solution is 5-6 gm/L. Under the same conditions at 2.5% acid, the concentration of solubilized carbon is 8-9 gm/L. However, the extent of carbon solubilization is essentially the same at both acid concentrations, namely about 12.5 g/L. The effect of acid concentration on the ultimate mole ratio of fixed carbon-to-silica is relatively minor. However, higher acid concentration does affect the solubilization of volatile carbon as revealed by the effect of high acid concentrations on the fixed carbon to volatile carbon weight ratio. For example, at acid concentrations between 0.06% and 10% the ratio is between 0.16:1 and 0.2:1, whereas at 20% acid concentration the ratio is 0.3, indicating removal of volatile carbon is enhanced somewhat at the higher acid concentration. Sulfuric acid concentration also affects the rate, as opposed to the extent, of silica solubilization. For example, at 94 deg C., 10% solids and 0.30% acid, the concentration of silica in the acid solution is 0.12 gm/L at 180 minutes. At 1% acid, the concentration of silica in the acid solution is 0.28 gm/L at 180 minutes. The ultimate concentration of rice hull silica at 94 deg C., regardless of the acid concentration, appears to about 0.450 gm/L.

Test data shows that aqueous sulfuric acid solution, under the right conditions of acid concentration, temperature, time and solids concentration, can dissolve a very significant amount of the minerals in rice hulls, can remove significant portions of the fixed carbon and volatile carbon, can provide for converting the solubilized volatile carbon to fixed carbon, and can increase the porosity of rice hulls. As silica is not very soluble in the aqueous sulfuric acid, this has the effect of reducing or increasing the mole ratio of fixed carbon to silica in the composition, removing minerals, removing volatile carbon and increasing the porosity of the material. Based upon this disclosure, one of ordinary skill in the art can, without undue experimentation, adjust these reaction parameters to provide the desired mole ratio of fixed carbon to silica, the desired mineral purity, the desired volatile carbon content and the desired porosity.

For example, a fixed carbon to silica mole ratio of about 2:1 and a very low level of minerals (less than 100 ppm total, less than 4 ppm phosphorus, and 1 ppm or less boron) can be achieved with temperatures between about 94° C. and about 140° C., sulfuric acid concentrations of about 1% to about 5% and solids concentrations of about 10% in about two hours. A fixed carbon to silica mole ratio of about 3:1 and a very low level of minerals can be achieved at temperatures in the range of about 150° C., sulfuric acid concentrations of about 1% to about 5% and solids concentrations of about 10% in about 4 hours. In addition, the leaching conditions preserve the intimate relationship between the silica and the fixed carbon, the amorphicity of the carbon and silica, the high surface area of the silica and carbon and provide for an overall increase in measurable void volume. If a fixed carbon to silica mole ratio of 3:1 is desired, but the levels of phosphorus and iron are not critical, a temperature of less than 94° C. can be used with acid and solids concentration described above to achieve the sought ratio.

The high purity (removal of over 99.7% of the minerals) carbon-silica product produced by the leaching process contains a mixture of fixed carbon and silica, together with varying amounts of volatile carbon. The carbon and silica are intimately Mixed at least on a micron, and generally on a nanometer, scale. The carbon-silica product contains high porosity, small average particle size, and is highly reactive. The increased porosity in indicated by the fact that the accessible void volume of the milled rice hull particles is very low, but, when the material is treated with 1% sulfuric acid at 94° C., the accessible void volume increases to 80%. The high reactivity of the produced material is established by the fact that the material undergoes carbothermal reduction significantly faster than when conventional feedstocks are used. Conventional feedstocks generally take a day or more to undergo carbothermal reduction. In contrast, the carbon-silica products disclosed herein undergo carbothermal reduction for production of silicon carbide in under 75 minutes and within 5-7 hours for silicon nitride. This results in a substantial energy savings and greater throughput for operation of the carbothermal reactor.

The leaching method of the invention can also be practiced in multiple stages. The first leaching stage can be used to remove a large portion of the minerals and make adjustments to the fixed carbon to silica mole ratio. The washed or unwashed material is then contacted a second time in a sulfuric acid solution. Thereafter, the remaining solids are separated from the acid solution by filtration or another similarly effective means, and washed with water. The second leaching stage can be used to reduce the mineral impurities to a lower level than was achieved with a single-stage leaching to further adjust the mole ratio of fixed carbon to silica to a desired ratio ranging between about 5:1 to less than 2:1, and to reduce the level of volatile carbon. Additional stages of leaching can likewise be added to reduce the mineral impurity level of the solids even more while continuing to make adjustments in the fixed carbon to silica mole ratio and volatile carbon content.

As an example, which should not be construed as the only application of a multiple-stage leaching method, two-stage leaching is useful when it is desirable to carry out the leaching process at high solids concentrations while achieving a low fixed carbon to silica ratio and very low non-silica mineral content, including very low levels of phosphorus. As noted above, for a given temperature, acid concentration and time, higher solids concentrations (approaching 30%) provide higher fixed carbon-to-silica ratios than lower solids concentrations for single-stage leaching. Higher solids concentrations also result in a higher phosphorus content than lower solids concentrations for single-stage leaching. However, if two-stage leaching is used at high solids concentrations, the first stage will reduce the fixed carbon-to-silica ratio to 3:1 or less (but greater than 2:1) and will reduce all the non-silica minerals except phosphorus to very low levels. The phosphorus will be significantly reduced compared to the starting values, but will remain higher than desired. If, for example, the first stage is operated at 25% solids, 1% acid, and 140° C. for 15 minutes, the fixed carbon-to-silica ratio is reduced to between 3:1 and 2.5:1. The levels of sodium, potassium, magnesium, and manganese are reduced to less than 10 ppm. The level of calcium is 10 ppm and the level of iron is 20 ppm. However phosphorus is at 100 ppm. With a second stage of leaching at the same solids concentration, temperature and acid concentration as the first stage, the fixed carbon-to-silica mole ratio is further reduced to low values of around 2:1 or less, and phosphorus is reduced to very low values of less than 4 ppm.

In another application of the leaching process for the sole purpose of reducing the phosphorus content to a low value, for example, phosphorus levels are reduced by more than 99.96%, to less than 4 ppm with a single stage of leaching at 120° C., 10% solids, 1% acid and a time of 15 minutes or less.

In another application of the leaching process for the sole purpose of reducing the iron content to a low value, for example, the iron levels are reduced by over 92% to values less than 20 ppm with a single stage of leaching at 140° C., 28.6% solids, 1% acid and a time of 15 minutes or less.

In another application of the leaching process for the sole purpose of reducing total minerals to overall low values, for example, the total level of sodium, potassium, magnesium, calcium, manganese, iron and phosphorus is reduced to less than 79 ppm with a single stage of leaching at 120° C., 10% solids, 1% acid and a time of 15 minutes or less.

In another application of the leaching process for the sole purpose of removing fixed carbon, for example, the fixed carbon to silica mole ratio of the rice hulls is reduced from 3.88:1 to 3:1 using a single stage of leaching at 25° C., 10% solids, 1% acid and times ranging from 1 minute to 60 minutes. On the other hand, this ratio can be reduced to 2:1 with a single stage of leaching at 94° C., 10% solids, 1% acid and a time of 300 minutes.

In another application of the leaching process, using either single stage or multiple stages for the sole purpose of reducing the volatile carbon content, for example, at 200° C. at very short reaction times, where significant fixed carbon has been removed, the volatile carbon to fixed carbon mole ratio drops to 1.82 compared to values of 5.24 in raw rice hulls in spite of the reduction of the amount of fixed carbon. It is likely that, at this temperature and short reaction time, a significant amount of the cellulose, which is a form of volatile carbon, has been solubilized.

In another application of the leaching process, either single stage or multiple stage leaching is used for the sole purpose of increasing the fixed carbon. For example, the native fixed carbon to silica mole ratio of rice hulls used in this study is 3.88:1. This ratio can be increased to 5:1 with a single stage of leaching at 200° C., 10% solids and 1% acid in 120 minutes. As another example, if material is prepared from a single stage of leaching that has a fixed carbon to silica ratio of 2:1, the mole ratio of fixed carbon to silica can be increased to any higher value up to about 5:1 by operating a second stage of leaching at a temperature above 160° C. for longer reaction times.

Another application of this invention relates to use of the leaching process, either single stage or multiple stages, for the sole purpose of increasing the porosity. For example the accessible void volume in milled hulls is rapidly increased to 30% after 15 minutes of leaching at 94° C. and 1% acid. The void volume increases yet further to 80% after 30 minutes of leaching under the same conditions.

Another application of the invention relates to use of the leaching process, either single stage or multiple stages, for a combination of any two or more of: removing phosphorus, iron or other minerals from naturally occurring or processed plant matter containing more than 3 weight percent silica; adjusting the mole ratio of fixed carbon to silica; removing volatile carbon; converting volatile carbon to fixed carbon; and increasing the porosity of the resultant carbon-silica products.

Another application of this invention relates to use of a pyrolysis reaction for thermally volatilizing the volatile carbon component of the carbon-silica product in a reactor separate from the carbothermal reactor. Pyrolysis is the process of heating organic or organic-derived material to drive off volatile organic material ("volatile carbon") and convert the remaining organic material to free carbon. It is a two-step process in which the volatile carbon is removed between about 200 and about 500° C. at atmospheric pressure and the remaining organic material is subsequently converted to free carbon at a temperature between about 500 and 800° C. at atmospheric pressure.

We have now discovered how to control the pyrolysis process so that different amounts of free carbon are created. This discovery provides one more option, in addition to the adjustment of the organic composition via leaching, for adjusting the free carbon (C):silica ($SiO_2$) ratio. More particularly, we have discovered that the rate of heat-up during pyrolysis has a significant effect on the amount of free carbon formed. Slower heat-up rates result in more carbon being formed and, therefore, a higher carbon:silica ratio in the pyrolyzed product. Conversely, faster heat-up rates result in less carbon being formed and, therefore, a lower carbon:silica ratio in the pyrolyzed product. Furthermore, faster heat-up rates result in a carbon-silica product with more surface area than the product from a slower rate of heat-up. We have also discovered that it is possible to reduce the carbon content of the pyrolyzed material by oxidizing a portion of the carbon with air. This discovery provides yet one more option in addition to the adjustment of the organic composition via leaching and the adjustment of the heat-up rate during pyrolysis for adjusting the free carbon (C):silica ($SiO_2$) ratio. More particularly, the literature indicates that in order to reduce the carbon content in pyrolyzed rice hull material, it is necessary to use non-aggressive oxidative agents such as carbon dioxide. However, we have developed a method using only air as the oxidative agent to reduce the carbon content of pyrolyzed rice hull material. The method allows for adjustment of the carbon:silica mole ratio from that resulting from pyrolysis to any ratio less than that resulting from pyrolysis.

The pyrolysis reaction can be performed in a bench-scale alumina reactor fitted with a metal head plate, and can be scaled up for industrial application using conventional process equipment. If desired, other materials such as graphite can be used to construct the reactor. The bench-scale reactor is three feet long and six inches in diameter. The carbon-silica product is contained in an alumina or graphite crucible that was located at the bottom of the reactor. The lower portion of the reactor is positioned in an electric furnace that is controlled by a program that allows different rates of temperature rise. The furnace heats the carbon-silica product from ambient temperature to over 1,000° C. Argon or nitrogen enters the top of the reactor and is directed to a particular level in the reactor through an adjustable tube. Volatilized carbonaceous material exits the reactor through the top. A slipstream of this material is sent to a CO monitor, and the majority of the material is directed to a condenser where the condensables are separated from the gases. Volatilization starts at about 400° C. and reaches a peak at about 600° C. Subsequently, the carbon monoxide levels decrease, reaching a base line at about 950° C. This profile differs from those reported for raw rice hulls in that, with raw rice hulls, the volatilization process starts at about 250° C. It is clear that the material that normally volatilizes at lower temperatures has been removed by the leaching process from the carbon-silica product. The volatilized gases and vapors can be captured and used as an energy source for the leaching process, the carbothermal process or other processes. A further benefit is that a portion of the remaining mineral content is also volatilized with the volatile carbon. The volatilized mineral can be collected in order to further purify the resulting devolatilized carbon-silica product. The resulting material is in the form of thermal-devolatilized carbon-silica products, which are unique products and are themselves an embodiment of this invention.

Alternatively, according to another preferred embodiment, most if not all of the volatile carbon is removed by further treating the unique carbon-silica products produced from the leaching step with dilute sulfuric acid at temperatures ranging from about 160° C. up to about 200° C. The residence time at the higher temperatures is very short, on the order of about 1 minute. This significantly lowers the volatile carbon content with minimal effect on the fixed carbon content of the solids. This method also removes a portion of the residual minerals left in the carbon silica products derived from the leaching step, enhancing the purity of the resulting high purity acid devolatilized carbon-silica products. The remaining solids are separated from the acid solution and the solids are washed with water. The resulting solid material is a high purity, devolatilized carbon-silica product with a predetermined fixed carbon-to-silica ratio and mineral impurities well below 0.1 weight percent.

A variety of unique acid devolatilized carbon-silica products, each of which has a predetermined molar ratio of fixed carbon to silica, contains very low levels of minerals and are highly porous and highly reactive, can be produced by the leaching step followed by an acid devolatilization step. The products preferably have a desired mole ratio of fixed carbon to silica from around 3:1 to less than 2:1, have a total mineral content less than 100 ppm, have a boron content less than 1 ppm, and have a phosphorus content less than 4 ppm. The products also preferably are highly porous and highly reactive and contain silica and fixed carbon that are intimately mixed at the micron and/or nanometric level. These unique materials can be produced in a fine powder form or made into pellets without the need for external binders. The disclosed devolatilized carbon-silica products are preferred for use in the subsequent production of silicon containing products, including, but not limited to, silicon carbide, silicon nitride, silicon, and silicon tetrachloride.

Following leaching, washing and drying, the carbon-silica products of the invention are frangible and easily reduced in size with minimal energy consumption to particles sizes in the fine (500 µm to 50 µm), very fine (50 µm to 5 µm) and ultrafine (5 µm to submicron) categories. The average size and size distribution of the resulting particles is set by the physical characteristics desired in the final silicon-containing products. Milling devices suitable for this purpose include, for example, batch impeller-type stirred ball mills, continuous disc-type stirred ball mills, continuous vibrating ball mills, batch vertical vibrating ball mills, and fluid energy mills such as a continuous loop mill or a continuous pancake mill.

Either a carbon-silica product or a devolatilized carbon-silica product can be used as a powder or, in another embodiment of this invention, can be pelletized for use in subsequent processes. The conventional method of producing pellets involves mixing silica and carbon compounds with a binding agent, such as sugar, and then compressing the mixture into a pellet. The use of a conventional binding agent increases the cost of processing and the binding agent may introduce impurities into the pelletized product. In contrast, the unique carbon-silica products and the devolatilized carbon-silica products of the present invention can be pelletized without the use of an additional binder. Without limiting the invention, it is believed that the lignin and cellulose that are present in the product can act as a sufficient binding agent for the silica and carbon. In contrast to conventional pellets that are generally only admixed on a macro scale, use of the current invention results in pellets that have carbon and silica intimately admixed at the µm and nanometer scale. This intimate mixture of highly reactive forms of the carbon and silica facilitate production of a pellet that reacts more quickly and completely during the subsequent carbothermal reaction than conventional pellets. The pelletized products made from carbon-silica products and/or devolatilized carbon-silica products as disclosed herein contain a desired mole ratio of fixed carbon to silica and/or very low levels of minerals, especially low levels of phosphorus and iron, and constitute another embodiment of the invention.

Referring again to FIGS. 1A and 1B, the carbothermal reduction method of the invention generally involves heating the carbon-silica product and/or the devolatilized carbon-silica product in a carbothermal reactor to a very high temperature to initiate the reduction of the silica to the silicon-containing product. Carbothermal reactors generally will heat the carbon-silica composition to about 1350-1800° C., depending upon the silicon-containing product of interest. For silicon or silicon carbide, an inert atmosphere is used. For other products, different atmospheres are used in the carbothermal reactor. For example, nitrogen or nitrogen plus hydrogen or nitrogen plus ammonia can be used to produce silicon nitride, whereas chlorine can be used to produce silicon tetrachloride. The reaction times are extremely fast compared to conventional carbothermal processes that use conventional sources of silica and carbon. Using carbon-silica products and/or devolatilized carbon-silica products, reaction times are on the order of minutes to a few hours, depending upon the desired silicon-containing product. This compares to times of a day or more for most conventional carbothermal processes that use conventional sources of silica and carbon. The fast reaction time provides for significantly lower use of energy and higher throughput compared to conventional carbothermal processes that use conventional sources of silica and carbon. In addition, because the carbon silica product and devolatilized carbon silica product are available in the form of fine powder, these products can be readily used in advanced carbothermal reactor systems, whereas conventional sources of carbon and silica cannot. Examples of commercial equipment that can be used to implement the advanced carbothermal processes disclosed herein include, but are not limited to, static bed reactors, moving bed reactors, fluidized bed reactors; rotary tube reactors, laser reactors, flame reactors, furnace reactors employing an external heat source; and plasma reactors. Many of these advanced reactors can provide for isothermal conditions and controlled reaction times, both of which are important for silicon-containing product quality.

Additionally, because the novel carbon-silica products of the invention can, if desired, contain significant amounts of volatile carbon, use of these unique materials affords the opportunity to recover significant volatile carbon during the carbothermal process and use such material for energy purposes or other valuable purposes. The use of energy from the volatilized carbon can reduce and perhaps eliminate the need to acquire energy from an outside source to operate the carbothermal process. A further benefit is that a portion of the remaining mineral content is also volatilized along with the volatile carbon. The volatilized minerals can be separately collected in order to further purify the final silicon-containing product.

According to a carbothermal method of the invention using bench-scale apparatus, the reaction is performed in an alumina reactor fitted with a metal head plate. Other materials, including graphite, can be used to construct the reactor. The reactor is three feet long and six inches in diameter. The carbon-silica product or the devolatilized carbon-silica product is contained in an alumina or graphite crucible that is located at the bottom of the reactor. The lower portion of the reactor is positioned in an electric furnace that is controlled by a program that allows different rates of temperature rise. The furnace generally heats the carbon-silica product to a temperature ranging from about 1250 to about 2200° C., preferably from about 1350 to about 1800° C. depending upon the type of silicon-containing product to be produced. Inert, and/or reactive gas enters the top of the reactor and is directed to a particular level in the reactor through an adjustable tube. If the feed material used is carbon-silica product containing a certain amount of volatile carbon, as opposed to a devolatilized-carbon-silica product, volatilized carbonaceous material exits the reactor through a gas outlet tube attached to the metal head plate. A slipstream of the off-gas is sent to a CO monitor, and the majority of the material is directed to a condenser where the condensables are separated from the gases.

The atmosphere used in the carbothermal reactor depends upon the silicon-containing product that is desired. For silicon carbide and silicon, argon can be used. To produce silicon nitride, pure nitrogen or 90% nitrogen plus 10% hydrogen or 90% nitrogen plus 10% ammonia can be used. Likewise, a chlorine atmosphere can be used to produce silicon tetrachloride.

Due to the loss of SiO gas from the carbothermal reactor and/or the desire to have carbon in the silicon-containing product, and/or the desire to have excess carbon fed to the reactor to insure complete conversion of the non-carbon reactants, the actual desired mole ratio of fixed carbon to silica will generally be different from the theoretical value. For example, the theoretical fixed carbon to silica mole ratio for production of silicon carbide is 3:1 and the theoretical ratio for production of silicon and silicon nitride is 2:1. However, the optimum ratio for a particular reactor may be less than the theoretical value, depending on the efficiency of the particular reactor in terms of loss of SiO gas. This invention provides the means to produce material with a carbon to silica ratio that is "rich" in silica compared to the theoretical ratio to accommodate the loss of SiO. Alternatively, it may be desirable to have a certain percentage of carbon left in the silicon-containing product and this invention provides the means to produce material with a carbon-to-silica ratio that is "rich" in carbon compared to the theoretical ratio in order to accommodate the desire for leftover carbon. Moreover, sometimes it is desirable to have "extra" carbon to insure that the other reactants are fully reacted and, as already noted, this invention provides the means to produce a carbon rich carbon-silica product and/or carbon rich devolatilized carbon silica product for such applications. If two or three of the above situations exist or are desired, this invention provides the means to produce a carbon-silica product or devolatilized carbon-silica product with the optimum carbon-to-silica mole ratio for the given situation.

The process and products of the current invention are further illustrated by the examples below. Milled rice hulls and the solid and liquid samples were analyzed by a variety of methods. Proximate analysis was used to determine percent moisture, percent volatile carbon, percent fixed carbon, and percent ash in the solids. The solids were also analyzed for total carbon and for $SiO_2$. The solid samples were also analyzed for mineral content using spark source mass spectroscopy, glow discharge mass spectroscopy, atomic absorption spectroscopy, and x-ray fluorescence. The Malvern method was used to determine particle size distribution. Specific surface area was calculated using the BET method and porosity using the mercury porosimetry method. A coulometric method was used to analyze the liquid filtrate samples for total organic carbon (TOC), a blue colorimetric method was used to analyze for phosphorus, and atomic absorption was used to analyze for minerals.

Example 1

Rice hulls were obtained from a mill in Arkansas. The hulls were mixed and then milled in a ring and puck mill to achieve an average particle size of 138 μm. The milled hulls were analyzed via proximate analysis and for $SiO_2$ content. They were found to contain 7.17% moisture, 62.72% volatile carbon, 11.97% fixed carbon and 18.14% ash. The ash was 85% silica (SiO2). The fixed carbon to silica ratio (mole:mole) was 3.88. The volatile carbon to fixed carbon ratio (wt %:wt %) was 5.24. The milled hulls were also analyzed for mineral content by spark source mass spectroscopy and contained amounts of the specified minerals as shown in Table 1.

TABLE 1

| Element | ppm |
|---------|------|
| Na | 400 |
| K | >10,000 |
| Mg | >2000 |
| Ca | 2000 |
| Mn | >2000 |
| Fe | 250 |
| B | 1 |
| P | >10,000 |
| Total | >26,651 |

A 1% sulfuric acid solution was prepared using demineralized water. The acid solution containing 10% milled rice hulls was added to a 2 liter zirconium reactor and heated to 120° C. Once at reaction temperature, the contents of the reactor were sampled frequently. The samples were immediately filtered and washed with demineralized water. The solids were dried and saved for analysis along with the filtrate.

The dried solids were analyzed by proximate analysis and silica analysis. The analyses showed that the fixed carbon to silica mole ratio at 120 minutes was 2.04:1, which is essentially the theoretical ratio for production of silicon and silicon nitride. The solids, analyzed by atomic absorption spectroscopy and colorimetric tests, contained the following non-silica mineral composition, shown in Table 2:

TABLE 2

| Element | Ppm |
|---------|------|
| Na | <10 |
| K | <10 |
| Mg | <10 |
| Ca | 10 |
| Mn | 10 |
| Fe | 25 |
| P | <4 |
| Total | <79 |

Thus, the overall percent removal of the specified minerals using a single stage of leaching was greater than 99.7%, giving a product with a specified mineral impurity less than 79 ppm. In addition, it was found that sulfuric acid, at the temperature and acid concentration used in the test with a single stage of leaching, is very effective at removing phosphorus to very low levels of less than 4 ppm. The resulting carbon-silica material was in the form of a fine powder with a void volume of about 80%. In other carbon-silica products leached in a similar manner, the boron level is 1 ppm as measured by spark source mass spectroscopy.

Example 2

A 1% sulfuric acid solution was prepared using demineralized water. The acid solution containing 10% milled rice hulls was added to a 2 liter zirconium reactor and heated to 160° C. Once at reaction temperature, the contents of the reactor were sampled frequently. The samples were immediately filtered and washed with demineralized water. The solids were dried and saved for analysis along with the filtrate.

The dried solids were analyzed by proximate analysis and silica analysis. The analyses showed that the fixed carbon to silica mole ratio at 180 minutes was 3:1, which is the theoretical ratio for the production of silicon carbide. The solids, analyzed by atomic absorption spectroscopy and colorimetric tests, contained amounts of the specified minerals as shown in Table 3:

TABLE 3

| Element | Ppm |
| --- | --- |
| Na | <10 |
| K | <10 |
| Mg | <10 |
| Ca | <10 |
| Mn | <10 |
| Fe | 20 |
| P | <4 |
| Total | <79 |

Thus, the overall percent removal of the specified minerals using a single stage of leaching was greater than 99.7%, yielding a product with a mineral impurity level less than 79 ppm for the specified minerals. In addition, it was found that sulfuric acid, at the temperature and acid concentration used in the test with a single stage of leaching, is very effective at removing phosphorus to very low levels less than 4 ppm. In other carbon-silica products leached in a similar manner the boron level is 1 ppm as measured by spark source mass spectroscopy. The resulting carbon-silica material was in the form of a fine powder with a void volume of about 80%.

Example 3

A 1% sulfuric acid solution was prepared using demineralized water. The acid solution was added to a 3-liter Pyrex resin kettle and heated to 94° C. Once at temperature, milled rice hulls were added to the kettle to create a mixture with 10% solids. The milled hulls were immediately incorporated into the acid solution producing a well-mixed slurry. The reaction was carried out for five minutes. At the end of this time, the contents of the kettle were filtered and washed with demineralized water. The resulting solid material was dried. This procedure was repeated four more times. The dried solids from each run were combined.

The fixed carbon-to-silica mole ratio of the combined carbon-silica product was 2:51:1, which is between the theoretical ratio for producing silicon carbide and the theoretical ratio for producing silicon nitride. Malvern analysis of the material indicated a d50 particle diameter of 114 um.

Example 4

The material prepared in Example 3 was used to test the production of silicon carbide. According to a preferred carbothermal method of the invention using bench-scale apparatus, the reaction was performed in the alumina reactor described previously. The reactor was purged with pure argon. After the air was purged from the reactor, the temperature was increased from ambient to the final carbothermal reaction temperature of 1,550° C. The purge with argon was continued. The carbon monoxide in the off-gas was monitored and it was observed that volatilization of volatile carbon started at about 400° C. A carbon monoxide peak was reached at about 600° C. and the carbon monoxide level declined, reaching a base line at about 950° C. At about 1,300° C., the carbon monoxide level began to increase, indicating the start of the reaction between fixed carbon and silica, and reached a peak at 1,550° C. Soon after reaching 1,550° C., the carbon monoxide level began to decrease rapidly, reaching a baseline level in about 60 minutes. The total elapsed time between when the production of silicon carbide started and when it ended was about 75 minutes, which was much shorter than the reaction time for the commercial Acheson process, which reaction time is typically about 36 hours. As determined by x-ray diffraction, the resulting product contained only silicon carbide and no other crystalline material.

The silicon carbide produced by the present invention has unique features that are of significant value in making high end ceramics. For example, the silicon carbide is composed of microcrystals with dimensions of about 15 nanometers. These microcrystals are grouped into particles that are about 200 nanometers in diameter. Silicon carbide particles in the nanometric range are sought for the production of high end silicon carbide ceramics and other high-end applications. This unique carbothermal process involving the unique carbon-silica product as feedstock and the unique silicon carbide product are embodiments of this invention Example 5

The material prepared in Example 3 was used to produce silicon nitride. According to a preferred carbothermal method of the invention using bench-scale apparatus, the reaction was performed in the alumina reactor described previously. The reactor was purged with pure nitrogen and the temperature was increased from ambient to the final carbothermal reaction temperature of 1425° while continuing the nitrogen purge. The carbon monoxide in the off-gas was monitored and it was observed that volatilization of volatile carbon started at about 400° C. A carbon monoxide peak was reached at about 600° C. and the carbon monoxide level then declined, reaching a base line at about 950° C. At about 1300° C., the carbon monoxide level again began to increase, indicating the start of the reaction between fixed carbon and silica, and reached a peak at 1425° C. Soon after reaching 1425° C., the carbon monoxide level again began to decline, slowly reaching a baseline level. The total elapsed time between when the production of silicon nitride started and when it ended was about 5-7 hours. As determined by x-ray diffraction, the resulting product contained only silicon nitride and no other crystalline material. The silicon nitride is a mixture of acicular crystals with a very high aspect ratio and small particles. Silicon nitride consisting of long acicular crystals mixed with small particles may be useful for a number of applications. This carbothermal process involving the unique carbon-silica product as feedstock and the unique silicon nitride product produced by the process are embodiments of this invention.

Example 6

The material prepared in Example 3 was used to produce silicon nitride. According to a preferred carbothermal method of the invention using bench-scale apparatus, the reaction was performed in the alumina reactor as described in Example 5 above, except that a mixture of 90% nitrogen and 10% hydrogen was used in place of 100% nitrogen. The total elapsed time was again about 5-7 hours, which was much shorter than the reaction time for the commercial carbothermal process, which time is measured in days. As determined by x-ray diffraction, the resulting product contained only silicon nitride and no other crystalline material. The yield of silicon nitride was about 2 times that obtained with a pure nitrogen atmosphere. The silicon nitride was a mixture of small particles only. Silicon nitride consisting of small particles is sought after for the production of high-end ceramics and other high-end applications. This carbothermal process involving the unique carbon-silica product as feedstock and the unique silicon nitride product produced by the process are embodiments of this invention.

Example 7

The material prepared in Example 3 was used to produce silicon nitride. According to a preferred carbothermal method of the invention using bench-scale apparatus, the reaction was performed in the alumina reactor as described in Example 5 above, except that a mixture of 90% nitrogen and 10% ammonia was used in place of 100% nitrogen. The total elapsed time was again about 5-7 hours, which was much shorter than the reaction time for the commercial carbothermal process, which time is measured in days. As determined by x-ray diffraction, the resulting product contained only silicon nitride and no other crystalline material. The yield of silicon nitride was comparable to that achieved with a pure nitrogen atmosphere. The silicon nitride is a mixture of acicular crystals with a moderate aspect ratio and small particles. This type of material is a self-reinforcing form of silicon nitride that is ideal for the production of superior ceramics and other high-end applications. This carbothermal process involving the unique carbon-silica product as feedstock and the unique silicon nitride product produced by the process are embodiments of this invention.

When carbon-silica products as disclosed herein are used in the carbothermal process of the invention, remaining volatile carbon is released at temperatures below the temperature needed to effect the reaction between fixed carbon and silica to make the desired silicon-containing product. This released volatile carbon can be captured and used for fuel, either to provide energy to the carbothermal process or to some other process such as, for example, the leaching process. Further devolatilization of the carbon-silica products of the invention inside the reactor will also further reduce the impurities present in the resultant silicon-containing product because some of the contaminating minerals and metals will be volatilized and removed along with the volatile carbon.

The above-described processes and the unique carbon-silica products and devolatilized carbon silica products created therefrom can be used in other known reactor configurations or carbothermal processes to produce other types of silicon-containing products. It is expected that the unique characteristics of the carbon-silica products and the devolatilized carbon-silica products will result in products of a superior quality and/or significant time, energy, and cost savings in the creation of a wide variety of silicon containing products, when compared to conventional carbothermal processes using conventional material inputs.

In a conventional carbothermal process, the products that are made earlier in the process have to sit in the reactor at temperature for very long times. Because of this, the conventional products begin to sinter, forming larger agglomerated particles. In addition, the crystalline phase changes and, as a result, the product quality is compromised. With the processes disclosed herein, the faster reaction times provide a shorter residence time insider the reactor at temperature and there is much less chance for the undesirable secondary effects to occur, meaning that the particle size and crystalline phase of the products are not compromised. Also, because faster reaction rates typically produce higher product yields, it is expected that the carbothermal process practiced as disclosed herein, using the improved carbon-silica products or devolatilized carbon-silica products of the invention as feed material, will produce better product yields compared to conventional carbothermal processes. Moreover, because the carbon-silica products and devolatilized carbon-silica products used as starting materials are very pure, the resulting silicon-containing products are also very pure.

While investigating the production of Si from the carbon-silica products as disclosed herein by heating such products to a temperature of about 2,000° C., we realized that the formation of silicon carbide takes place at a lower temperature and that this reaction is very fast. As a result, the reactants are consumed in making silicon carbide, a very stable product, before the temperature of 2,000 can be reached. We subsequently discovered a method for producing a high purity form of silicon nitride (Si3N4) and then disassociating this material at about 1,700 deg C. to produce high purity silicon (Si) and nitrogen gas, which gas is removed from the reactor, according to the reaction shown below:

$$Si3N4 = 3Si + 2N2 \ (1{,}700 \ \text{deg C.})$$

Figure 3:
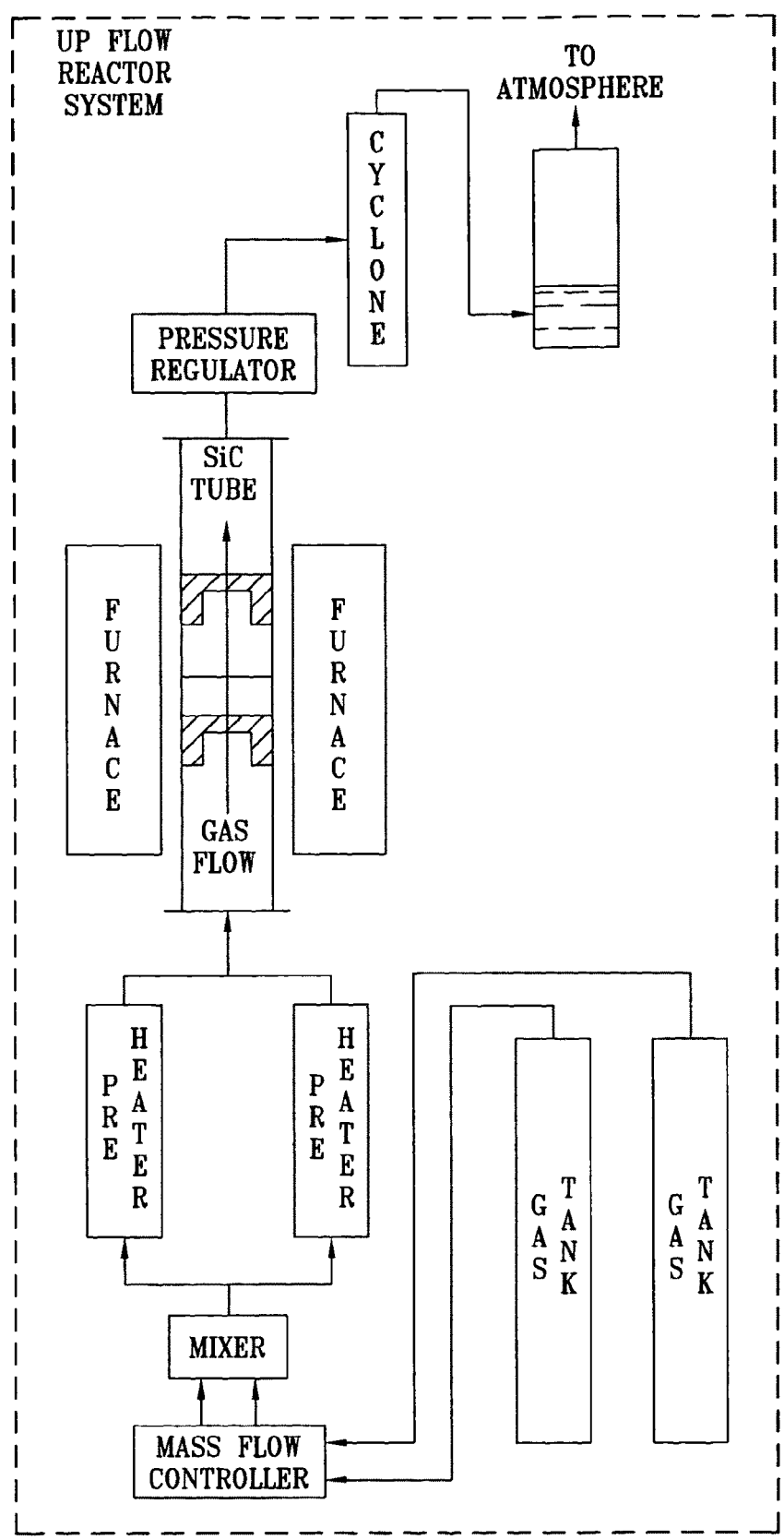
FIG. 3 is a simplified process flow diagram.

FIG. 3 is a simplified process flow diagram illustrating a preferred methodology for producing high purity silicon nitride, silicon and alpha- and beta-silicon carbide from the carbon-silica products produced by leaching as described above.

Carbothermal Production of Alpha Silicon Nitride (Si3N4)

Silicon Nitride can be produced carbothermally by reacting free carbon (C), silica (SiO2) and a nitrogen (N2) containing gas at a temperature of about 1,400° C. We have now discovered how to change the morphology of silicon nitride by changing the gas composition. These more recent investigations have been carried out in a new reactor system consisting of a horizontal rotary reactor tube heated by an electric furnace. The mass of the reactor and its contents are monitored continuously by a load cell system as a way to gauge the extent of reactions. The level of carbon monoxide in the off gas is also measured continuously as another way to gauge the extent of reactions. Our investigations have confirmed that the morphology of the alpha silicon nitride product is a function of the composition of the nitrogen-containing gas. More particularly, we have discovered that the use of nitrogen alone provides for a fibrous morphology, whereas the addition of 10% hydrogen or 10% ammonia to the nitrogen gas provides for a particulate morphology.

From these more recent investigations, we have discovered that the used of ultra high purity (UHP) nitrogen, containing less than 1 ppm of oxygen and less than 3 ppm of water, provides significantly improved yields of silicon nitride as compared to the use of industrial nitrogen, which contains 20 ppm of oxygen and about 20 ppm of water. For example, yields with industrial nitrogen are in the range of 80%, whereas the yields with ultra pure nitrogen are in the range of 90%. These yields are significantly greater than any reported in the literature for silicon nitride from rice hull derived materials.

From these more recent investigations, we have also discovered that higher yields of silicon nitride can be obtained when leached hulls are used as a starting material and the temperature is increased from ambient to about 1,400 deg C. at a rate that allows the pyrolysis reactions to be completed at the lower temperatures before the temperature reaches the higher carbothermal reaction temperature. This is in contrast to a situation where the pyrolysis reactions are first carried out in a separate reactor and then the pyrolysis product is cooled and then transferred to another reactor where the pyrolyzed material is heated to around 1,400 deg C. to carry out the carbothermal reactions to produce Si3N4. It appears that the carbon in prepyrolyzed material that has been cooled is further consolidated during the separate carbothermal run as the material is heated again from ambient through the pyrolysis temperature zone to the carbothermal reaction temperature. This more consolidated carbon is less reactive than carbon that is formed "on the fly" in a run that includes the pyrolysis step in the heat-up phase as the reactor moves toward the carbothermal reaction temperature. This indicates that after the material is pyrolyzed, it should not be cooled before entering the subsequent carbothermal reaction. Cooling can be avoided by carrying out the pyrolysis and subsequent carbothermal reactions in a single reactor that is heated from ambient to about 1,400 deg C. at a rate that allows the pyrolysis reactions to be completed before the reactor reaches the carbothermal reaction temperature. This is the situation described above. Another approach is to carry out the pyrolysis reaction in a separate reactor and then transfer the pyrolysis product without cooling to a separate carbothermal reactor that is already at or above the highest pyrolysis temperature.

Oxidative Removal of Excess Carbon from Silicon Nitride (Si3N4) Product

The silicon nitride (Si3N4) product described above typically still contains excess carbon. We have now learned that the carbon can be removed by oxidation in air at around 950 deg C. for several hours. The resulting oxidized product is greater than 95% alpha silicon nitride (Si3N4) as measured by XRD. There are no signs of amorphous or crystalline silica (SiO2) as measured by x-ray diffraction (XRD). Additionally, there are no signs of silicon carbide (SiC) as measured by XRD. Furthermore, the mineral levels are below or at those specified for the best commercial grades of silicon nitride (Si3N4). Calcium is <50 ppm, aluminum is <100 ppm and iron is <200 ppm. This is the first report of a method by which rice hulls or other silica-containing plant matter can be used to produce silicon nitride that meets or exceeds the known mineral impurity, carbon and alpha phase specifications for the best commercial silicon nitride (Si3N4).

Carbothermal Production of Alpha Silicon Carbide (a-SiC)

We described above a process for making silicon carbide (b-SiC) from material derived from rice hulls. In these earlier investigations, leached rice hull material was pyrolyzed and then reacted at about 1550° C. in one run in the vertical alumina tube reactor. XRD scans showed that good yields of beta silicon carbide (b-SiC) were produced. The product still contained excess carbon. Moreover, because the material was "hidden" by the carbon it was not possible to examine the silicon carbide under the optical microscope. Furthermore, the mineral content of the material was not measured.

We have now developed a method to produce alpha silicon carbide (a-SiC), which is the preferred phase form for commercial applications. In these more recent investigations, we produced alpha silicon carbide (a-SiC) by reacting leached/pyrolyzed material from rice hulls, which materials had free carbon:silica ratios of 2:1 and 4:1 under argon. The leached/pyrolyzed material was placed in a crucible that was put into the reactor and then heated from ambient temperature to 2200° C. The carbon monoxide was monitored to gauge the extent of the reaction involved in producing beta silicon carbide at 1550° C. In two tests, the temperature was held at 1550° C. until the formation of beta silicon carbide was complete. The temperature was then increased to 2200° C. and held there for 2 hours to carry out the phase transformation from beta silicon carbide (b-SiC) to alpha silicon carbide (a-SiC). In two other tests, the starting material was heated directly to 2200° C. with beta silicon carbide being made "on the fly" and then subsequently transformed to alpha silicon carbide (a-SiC) at the highest temperature. As shown by x-ray diffraction (XRD) the only crystalline product made in any of the tests was alpha silicon carbide. In the test which used starting material containing carbon:silica ratios at 4:1, the alpha silicon carbide product contained excess carbon, but there were no signs via x-ray diffraction of amorphous silica (SiO2). Removal of excess carbon from silicon carbide by oxidation is tricky since we have confirmed that a certain portion of the silicon carbide is also oxidized. On the other hand, in the tests which used starting material containing carbon:silica ratios of around 2:1 (significantly less than the stoichiometric ratio of 3:1), the alpha silicon carbide product contained no excess carbon and there was no left over silica (SiO2) even though the starting material was "rich" in silica. It was determined that the excess silica had volatilized. As a result, the resulting alpha silicon carbide was very clean in that it contained no free carbon or silica. The significance of this discovery is that a very clean alpha silicon carbide (a-SiC) product can be produced if the starting material is rich in silica. In this situation there is more silica than is needed and so all of the carbon is consumed in the carbothermal reaction to produce beta silicon carbide (b-SiC) and a certain amount of silica is left behind in the beta silicon carbide product. However, as the temperature is increased to affect the phase transformation to alpha silicon carbide (a-SiC), the remaining silica is vaporized and, thereby, removed from the product. We have therefore discovered a method for producing carbon-free and silica-free alpha silicon carbide (a-SiC) by using a starting material that is "rich" in silica, i.e., contain a ratio of carbon to silica that is less than 3:1.

Examination under optical microscope of the alpha silicon carbide containing no excess carbon or excess silica showed it to be composed of light green and light yellow hexagonal crystals. The content of 25 different metals was examined by glow discharge mass spectroscopy and shown to be extremely low. The total concentration of 25 elements was <41.62 ppm. Levels of many of the elements, including phosphorous, were in the parts per billion (ppb) range. This purity level is the highest known purity achieved using a carbothermal process. We have therefore discovered an ultra-pure silicon carbide made by leaching rice hulls to reduce the level of non-silica minerals followed by pyrolysis, carbothermal reaction and high temperature phase transformation.

Thermodynamic Analysis

The initial investigation involved the use of HSC Chemistry software to establish the thermodynamic basis of the conceptual Si3N4 to Si process. The software features a Gibbs Free Energy minimization algorithm, which enables the user to determine the stable phases in a system as a function of temperatures based on user-defined input and (potential) output species. These analyses showed the thermodynamically stable species that are produced between 1,000 and 2,000° C. when 100 kilograms of pure Si3N4 are exposed to 1,000 kilograms of H2. Hydrogen was selected to ensure a strongly reducing furnace atmosphere. The data indicate that the reaction begins at approximately 1,400° C. and that the Si3N4 will completely decompose to Si and N2 when the temperature exceeds 1,730° C.

The effect of including 20 kilomoles of carbon (C) with the input species from the above example was also explored. The data indicate that some of the nitride reacts with the carbon (C) to form SiC at temperatures below 1,700 deg C., and that the incipient Si formation occurs at approximately 1,550 deg C. As in the previous example, complete conversion of Si3N4 to Si takes place above 1,730 deg C. The model also shows that the residual carbon remains a stable phase.

Leach Product

Untreated rice hulls contain about 20% silica (SiO2), about 1-3% (10,000 to 30,000 ppm) non-silica minerals, and from about 77% to 79% organic material by weight. The organic material can be thought of as comprising fixed carbon and volatile carbon. The mole ratio of fixed carbon:silica in untreated rice hulls is about 4:1, and the weight ratio of fixed carbon:volatile carbon is about 5:1.

Leaching the rice hulls with an aqueous solution of sulfuric acid produces an intermediate carbon-silica product ("Leach Product"). Leaching (a) reduces the mineral content of the leached rice hulls significantly; (b) adjusts the mole ratio of fixed carbon:silica in the leached rice hulls; and (c) increases the porosity of the leached rice hulls.

The level of mineral reduction sought depends upon the intended end-use of the Leach Product. If the Leach Product will be used to produce silicon nitride or silicon carbide for advanced ceramic applications, the level of mineral reduction required is moderate. On the other hand, if the Leach Product will be used to produce silicon nitride that will, in turn, be use to produce photovoltaic silicon, the level of mineral reduction sought is very significant. In particular, for use in producing photovoltaic silicon via silicon nitride, it is critical that the levels of phosphorous and boron in the Leach Product be very low.

The optimum mole ratio of fixed carbon:silica in the Leach Product also depends on what the Leach Product will be used for. For example, if the product will be used for production of silicon nitride, the optimum mole ratio of fixed carbon:silica is around 2:1. On the other hand, if the Leach Product will be used for production of silicon carbide, the optimum mole ratio of fixed carbon:silica ratio is about 3:1.

For all uses it is desirable for the Leach Product to have a high level of porosity as this enhances the rate of reaction during the subsequent carbothermal step used to produce silicon nitride and silicon carbide.

The key leaching conditions or parameters that determine the mineral purity, the mole ratio of fixed carbon:silica, and the porosity of the Leach Product are (a) the concentration of rice hulls in the leach mixture; (b) the concentration of sulfuric acid in the leach mixture; (c) the temperature of the leach mixture; and (d) the leach time.

Through our investigations, we have discovered that temperature has a significant effect on the mole ratio of fixed carbon:silica in the Leach Product. At the relatively low leach temperature of 25 deg C. (room temperature) the fixed carbon:silica ratio of the Leach Product is about 3:1. As the leach temperature increases, the mole ratio declines and reaches a minimum of about 2:1 at about 120 deg C. As the temperature increases, the mole ratio increases and reaches 3:1 at about 160 deg C. At higher temperatures of about 200 deg C. and moderate times of about 1 hour, the ratio reaches a high level of about 5:1.

Through our investigations, we have also discovered that temperature has a significant effect on the mineral purity of the Leach Product. With regard to mineral purity, Si Options has discovered that close to 99% of the total minerals in the rice hulls can be removed by leaching with sulfuric acid at temperatures of 94 deg C. or less. Under these conditions the minerals of sodium (Na), magnesium (Mg), aluminum (Al), potassium (K), calcium (Ca), and manganese (Mn) can be reduced to levels less than about 10 ppm in the Leach Product. These conditions also greatly reduce the level of phosphorous, but not to the extent that the other minerals are reduced. The level of phosphorous in the Leach Product produced at 94 deg C. or less is about 60 ppm. The level of boron is naturally very low in untreated rice hulls, so the level of this element remains low in the Leach Product.

We have discovered that almost all of the residual phosphorous remaining after leaching at 94 deg C. or less is associated with the surface of the silica particles in rice hulls. The residual phosphorous is "trapped" by a layer of organic material and this layer of organic material can be solubilized by sulfuric acid at a temperature around 120 deg C. Once the organic layer is solubilized, the sulfuric acid can reach the phosphorous bound to the surface of the silica particles and release it. The resulting phosphorous levels in the Leached Product are less than 4 ppm and close to 1 ppm. Thus, increasing the leach temperature above "boiling" is believed to be important to achieving the phosphorous levels needed, for example, for the production of photovoltaic silicon via Si3N4.

We have also found that the minerals leached out of the rice hulls in each temperature range are released quickly, typically in 30 minutes or less. As a practical matter, 15 minutes is adequate leach time for the production of Leach Product intended for use in the production of silicon-containing products. However, we have determined that significant purification occurs in as little as about 6 seconds of contact with sulfuric acid, which is about the minimum time in which a sample can be pulled after contacting the rice hulls with the acid solution.

We have also found that acid concentration and rice hull concentration have some effect on the release of minerals. Acid concentrations greater than 1% and less than 10% provide for the maximum release of minerals. Higher and lower concentrations of acid are not as effective. Rice hull concentration of about 10% provides for maximum release of minerals. Higher and lower rice hull concentrations are not as effective.

Proprietary Process Design for Rice Hull Leaching, Solid-Liquid Separation and Drying Si Options has carried out a complete preliminary engineering design of its process to convert rice hulls into unique carbon-silica products, unique devolatilized carbon-silica products, other unique intermediate products and unique silicon-containing final products. Inputs to this effort were derived from the research and development activities of Si Options as well as from the engineering expertise of its engineering consultant. As part of this effort, a design was developed for the unit operation concerned with leaching rice hulls. A description of the design follows.

Rice hulls are conveyed from storage silos to the leaching area for storage in a day bin. The rice hulls are metered from the day bin to an agitated mixing tank, where they are slurried to 10% solids (initial) with 2.5% by weight sulfuric acid from the lixivant preparation tank. The slurry is pumped to the pressure vessel (autoclave) for leaching. Hulls are leached in a high grade pressure vessel that operates in a continuous mode. The prescribed leaching conditions are 0.5 hour solid residence time, 120 deg C., and 2 atmospheres total (steam plus oxygen) pressure. The leach discharge slurry passes through a two stage let-down system to restore atmospheric pressure by flashing steam. The slurry is then pumped to the leach residue filter receiving tank. A horizontal belt filter separates the leach solution from the leach residue. The belt filter is equipped with a series of receiving tanks to accommodate multiple washing stages designed to minimize entrainment of dissolved impurities in the filter cake. Deionized water is used in the washing stages. The washed filter cake is collected on a conveyor and transferred to the leach residue dryer. The primary filtrate reports to the gypsum precipitation circuit and the wash solution advances to the lixivant preparation tank. To minimize fines in the dryer discharge gas, an indirectly heated rotary dryer is used to reduce the bulk moisture in the filter cake. The dried leached hulls (carbon-silica product) are collected and conveyed to an intermediate storage bin located in the devolatilization area. The acidic primary filtrate solution is pumped to a mechanically agitated mixing tank, where it is neutralized with powdered lime. Gypsum is produced according to the following chemical reaction:

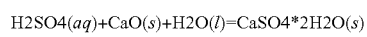
$$H2SO4(aq)+CaO(s)+H2O(l)=CaSO4*2H2O(s)$$

The solution pH is monitored and controlled to maximize the precipitation of the dissolved impurities. The neutralized gypsum slurry is pumped into the filter feed tank. Gypsum is separated from the neutralized leach solution on two vacuum drum filters which operate in parallel. An open belt conveyor transports the moist gypsum cake to the concrete dying pad. A front end loader moves the filter cake onto trucks for transportation to off-site markets. The barren leach liquor is pumped from the vacuum filter to a lixivant preparation tank, where the barren liquor is blended with the belt filter wash solution and fresh 93% sulfuric acid. The 2.5% sulfuric acid lixivant is then pumped to the rice hull mixing tank.

Devolatilized Leach Product

Effect of the Heat Up Rate of the Devolatilization Step on the Characteristics of the Devolatilized Carbon-Silica Product The Leach Product can contain significant volatile carbon. Si Options has developed a devolatilization process to convert its unique carbon-silica products into its unique devolatilized carbon-silicon products. Methods of preparing the devolatilized carbon-silica product are outlined in the previous Declaration of Norman D. Hinman. Methods and advantages of using the product are also described.

In addition to this information, Si Options has also developed information regarding the effect of the rate of heat up of the devolatilization process on the characteristics of the devolatilized carbon-silica product. This information indicates that the carbon:silica mole ratio (C:SiO2) can be adjusted by the rate of heat up. It has been found that by increasing the rate of heat up, it is possible to adjust the C:SiO2 mole ratio of the devolatilized carbon-silica product downward. For example, for a given carbon-silica feed material the C:SiO2 mole ratio of a devolatilized carbon-silica product produced with an instantaneous rate of heat up is 3.04:1, whereas the C:SIO2 mole ratio of a devolatized carbon-silica product produced with a heat up rate of 2.5 deg C./min is 5.64:1. It has been shown by Si Options that the C:SiO2 mole ratio in its carbon-silica product can be adjusted by alterations in the sulfuric acid leaching conditions. This new information shows that the ratio can be further adjusted by changing the rate of heat up in the devolatilization step.

The information on the effect of the rate of heat up of the devolatilization on the characteristics of the devolatilized carbon-silica product indicates that regardless of the heat up rate, the concentration of Na, Mg, Al, K, and Fe are the same in the devolatilized carbon-silica product as they are in carbon-silica product feed. However, the concentration of P, Ca and Mn are higher in the devolatilized carbon-silica product than they are in the carbon-silica product feed. However the concentration of these three minerals in the devolatilized carbon-silica product is not affected by the rate of heat up. These results are consistent with the conclusion drawn earlier by Si Options from its leach work that the phosphorous remaining in the carbon-silica product after leaching at 94 deg C. or less is associated with the silica particles.

The rate of heating does not have an effect on the particle size or the specific surface area of the devolatilized carbon-silica product. Details of the effect of heat up rate are given below.

Si Options has developed a unique process design for the devolatilization step. A description of this design is presented below. The Leach Product can contain significant volatile carbon. The volatile carbon is carbonaceous material that is volatilized at temperature between about 300 deg C. and 1000 deg C. under an inert gas atmosphere such as argon. Where it is desirable to separate the release of the volatile carbon from a subsequent carbothermal reaction, the Leach Product is preferably devolatilized by heating it to a temperature of 900 deg C., to release the volatile carbon. The released volatile carbon is desirably condensed to form an oily byproduct. This devolatilized carbon silica product is referred to as a "Devolatilized Leach Product." The Devolatilized Leach Product should be viewed as an intermediate product that is then desirably fed to a carbothermal reactor. The remaining fixed carbon and silica react to form the silicon-containing product of interest.

The carbothermal reactor operates at about 1450 to 2000 deg C. However, the volatile carbon can be removed at a much lower temperature of around 900 deg C. Thus, less energy is used to remove the volatile carbon by carrying out the removal of the volatile carbon at 900 deg C. prior to the carbothermal operation instead of at 1450 deg C. to 2000 deg C. as part of the carbothermal operation.

Removal of the volatile carbon in the carbothermal operation may cause the carbothermal reactor to "plug up" due to condensation of the volatile carbon. Removal of the volatile carbon prior to the carbothermal operation avoids this potential problem.

Removal of the volatile carbon in the carbothermal operation at about 1450 deg C. to 2000 deg C. makes the volatile carbon vapors subject to high temperatures which may cause changes in the resulting oil product that make such product less desirable as an energy product or as a feed for chemical production.

Removal of the Volatile Carbon at a Lower Temperature Prior to the Carbothermal Operation Avoids this Potential Problem.

If the Leach Product is fed directly to the carbothermal reactor, the volatile carbon is volatilized in the carbothermal reactor while the fixed carbon and silica react to form the silicon-containing product of interest. The volatile carbon will exit the carbothermal reactor in the off-gas stream and can then be condensed to form an oily material that can be used as a fuel or as a chemical feedstock.

Although there are some concerns regarding feeding the Leach Product directly to the carbothermal reactor as noted above, directly feeding the Leach Product to the carbothermal reactor means that both the devolatilization and the carbothermal reaction can be carried out in a single operation as opposed to two separate operations. This may reduce capital and operating costs. Whether it is best to carry out devolatilization and the carbothermal reaction in separate reactors or in a single reactor depends on the results of an engineering and economic analysis for a specific commercial plant.

The C:SO2 mole ratio of the products derived from devolatilization (devolatilized carbon-silica products) of leached products (carbon-silica products) depends on: 1) the leaching conditions used to prepare the leached carbon-silica product, and 2) the devolatilization conditions used to prepare the devolatilized carbon-silica product. In this regard, Si Options has carried out an investigation into the effect of the rate of heat up of the devolatilization step on the carbon:silica mole ratio of the devolatilized carbon-silica product and on the mineral content off the devolatilized carbon-silica product.

Experimental Carbon-Silica Product

The carbon-silica product used in the tests below was prepared from 20/80 grind hulls. The milled rice hulls were leached at about 10% solids, 1.3% acid, 92 deg C., for 30 minutes. The mineral content of the carbon silica product is given in the table below.

| | | | Values in ppm | | | | | |
|---|---|---|---|---|---|---|---|---|
| Material | Na | Mg | Al | P | K | Ca | Mn | Fe | Total |
| Carbon-Silica Product | 10 | 20 | 10 | 48 | 5 | 10 | 5 | 10 | 118 |

Equipment/Procedures/Analysis

The effect of different devolatilization heat up rates in the range of 2.5 deg C./minute to 50 deg C./minute on the characteristics of the devolatilized carbon-silica products was carried out in a rotating horizontal tube furnace was used to investigate. The charge was maintained in an oxygen free environment by flowing argon gas through the tube. The charge was kept in the furnace until devolatilization was 100% complete. An oxygen furnace was used to determine the ash content of the devolatilized carbon silica product. It was assumed that the ash was essentially 100% silica and the weight of the carbon in the devolatilized carbon-silica product was determined by subtracting the ash weight from the total product weight. The carbon:silica mole ratio for a devolatilized carbon-silica product was calculated from the estimates of the amount of carbon and silica in the product The effect of an essentially instantaneous devolatilization heat up rate on the characteristics of the devolatilized carbon-silica product was investigated using a furnace that was heated to 950 deg C. prior to inserting the carbon-silica product. The charge was maintained in an oxygen free environment. The charge was kept in the furnace until devolatilization was 100% complete. An oxygen furnace was used to determine the ash content of the devolatilized carbon-silica product. It was assumed that the ash was essentially 100% silica and the weight of the carbon in the devolatilized carbon-silica product was determined by subtracting the ash weight from the total product weight. The carbon:silica mole ratio for a devolatilized carbon-silica product was calculated from the estimates of the amount of carbon and silica in the product Carbon:Silica Mole Ratio as a Function of Rate of Heat Up The carbon:silica mole ratio of the devolatilized carbon-silica products as a function of the heat up rate of the devolatilization process is shown in the table below:

| Heat Up Rate, deg C./minute | |
|---|---|
| Instantaneous | 3.04 |
| 50 deg C./min | 3.92 |
| 15 deg C./min | 4.58 |
| 5 deg C./min | 5.45 |
| 2.5 deg C./min | 5.64 |

The best fit equation to this data is:

$$y = -0.60 \ln(x) + 6.268$$

where x is the rate of heat up, deg C/min, and y is the C:SiO2 mole ratio of the devolatilized carbon-silica product. This equation was used to prepare a table that showed the C:SiO2 mole ratio as a function of heat up rate. Each of the C:SiO2 mole ratios in the new table was divided by the ratio obtained with instantaneous heating to show the affect of different heat rates relative to the instantaneous heating rate on the value of the C:SiO2 mole ratio. The best fit logarithmic function to the data is represented by the following equation:

$$y = -0.19 \ln(x) + 2.063,$$

where x is the heat up rate and y is the factor to be applied to the C:SiO2 mole ratio from the instantaneous heating of the carbon-silica product. For a given carbon-silica product feed material, equation 2 allows one to predict the C:SiO2 mole ratio of a devolatilized carbon-silica product produced at any heat up rate from the C:SiO2 mole ratio of the devolatilized carbon-silica product produced with an instantaneous heat up rate.

Affect of Devolatilization Heat Up Rate on Mineral Concentration in Devolatilized Carbon-Silica Products The concentration of each of the standard minerals (Na, Mg, Al, P, K, Ca, Mn, and Fe) was measured in the devolatilized carbon-silica products produced at different heat up rates: 2.5 deg C./min, 5 deg C./min, 15 deg C./min and 50 deg C./min. The following table shows the concentration of each mineral in the devolatilized carbon-silica product divided by the concentration of the same mineral in the carbon-silica as a function of the rate of heat up during devolatilization.

| | | | | Values in ppm | | | | |
|---|---|---|---|---|---|---|---|---|
| Rate of Heat Up, deg C./min | Na | Mg | Al | P | K | Ca | Mn | Fe |
| 50 | 1 | 1 | 1 | 3.08 | 1 | 2.5 | 3 | 1 |
| 15 | 1 | 1 | 1 | 2.38 | 1 | 2 | 2 | 1 |
| 5 | 1 | 1.25 | 1 | 2.42 | 2 | 2.5 | 2 | 1 |
| 2.5 | 1 | 1 | 1 | 2.83 | 1 | 2 | 2 | 2.5 |

The data indicates that the devolatilized carbon-silica product has the same concentration for Na, Mg, Al, K and Fe as the carbon-silica feed product, regardless of the heat up rate. However the concentration for P, CA and Mn is higher in the devolatilized carbon silica product than in the carbon-silica product feed. If a mineral was associated mainly with the carbonaceous material in the feed and was removed in proportion to the carbonaceous material, one would expect the ratio in the above chart to be less than one. If the mineral were evenly distributed between the SiO2 and carbonaceous material, one would expect the ratio to be about 1.0. Finally, if the mineral were mainly associated with SiO2, one would expect the ratio to be greater than 1.0. Based on this reasoning, the above data indicates that Na, Mg, Al, K and Fe are evenly distributed between the SiO2 and carbonaceous material. However, P, Ca and Mn appear to be mainly associated with SiO2. Previous information presented by Si Options regarding the leaching process also indicated that the residual phosphorous in the carbon silica product produced at 94 deg C. or less was associated with the silica.

Effect of Heat Up Rate on Particle Size

Figure 16:
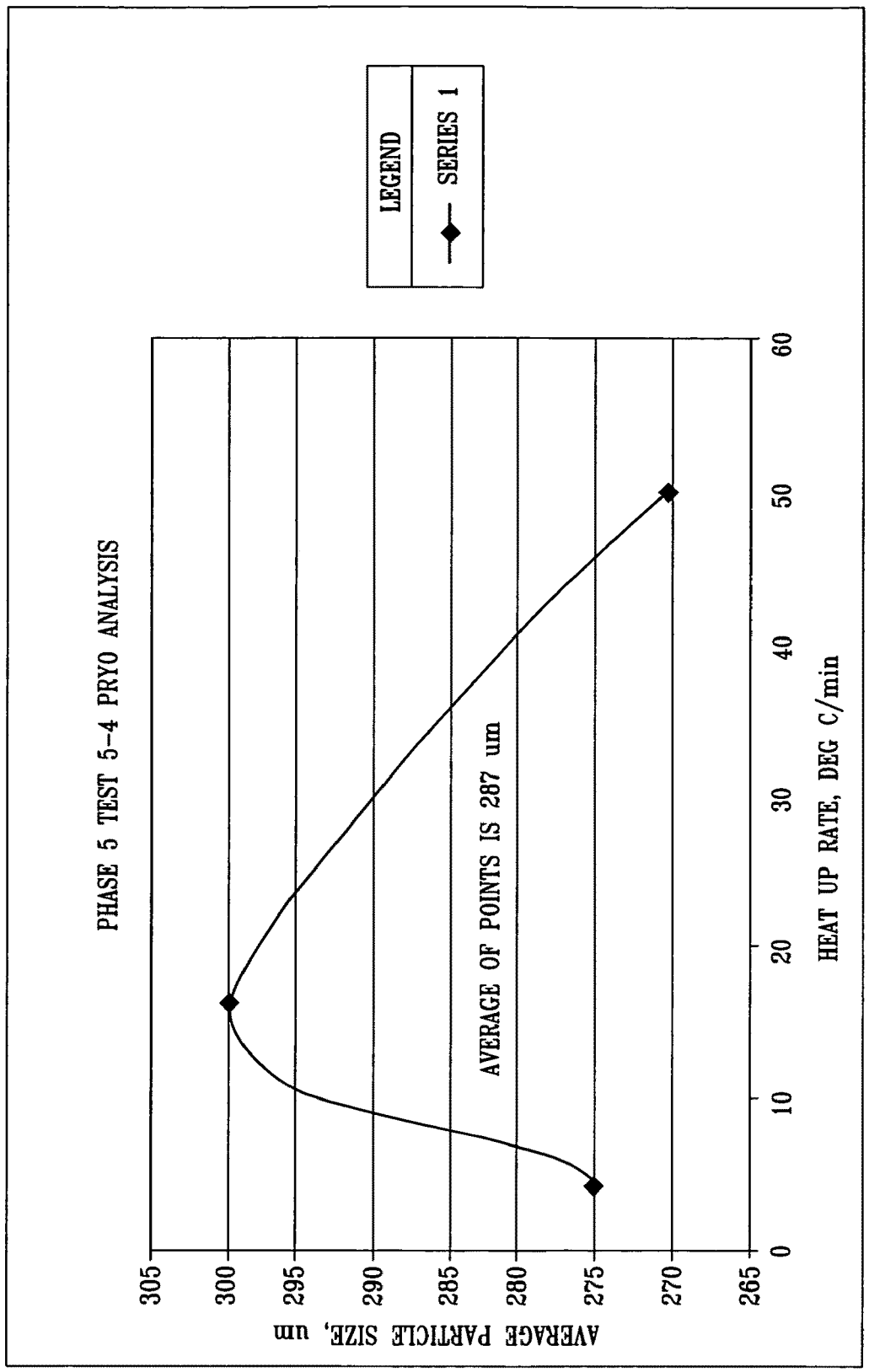
FIG. 16 is a graph showing average particle size against heat up rate.
Figure 17:
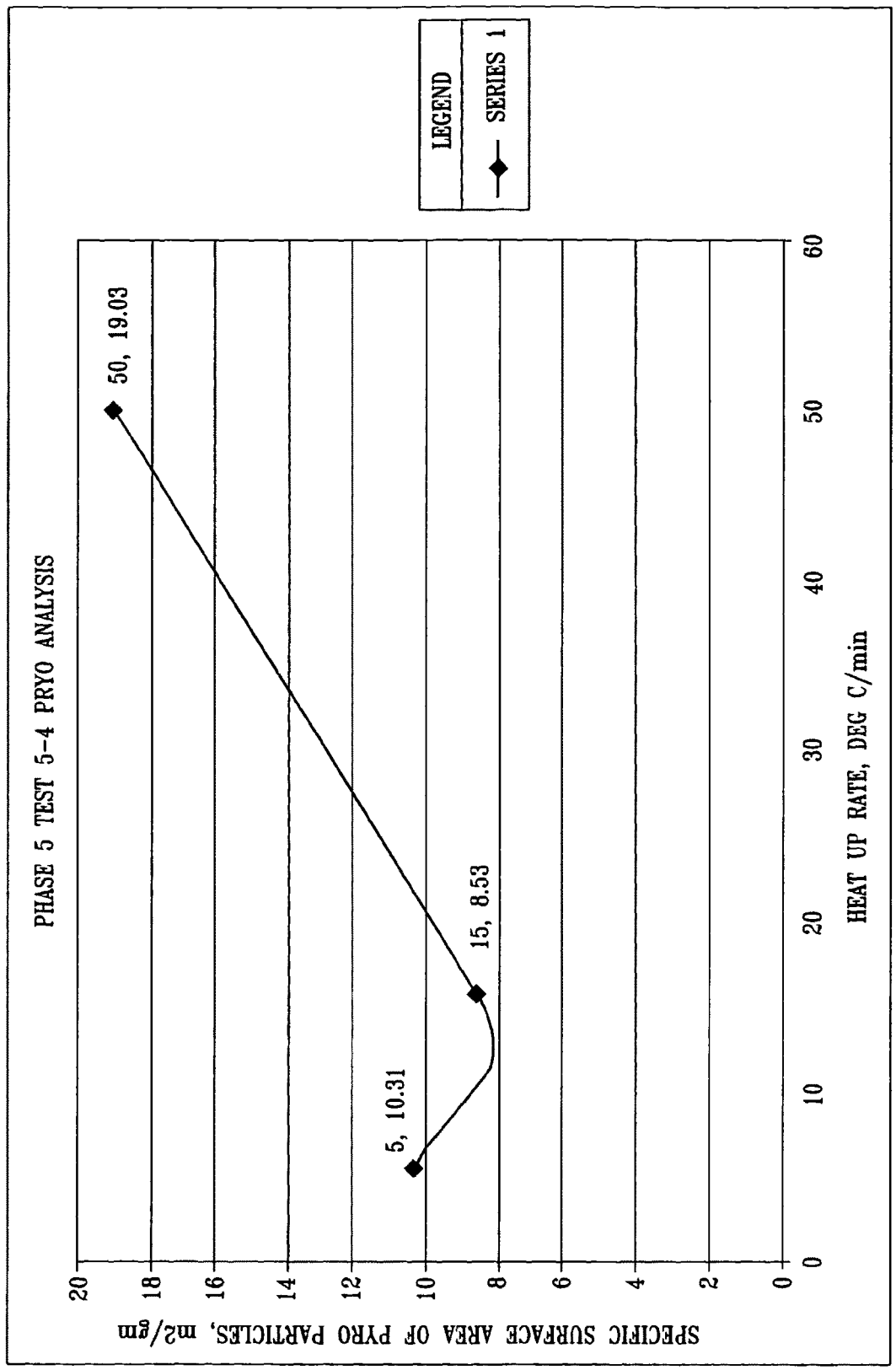
FIG. 17 is a graph showing specific surface are of pyro, particles against heat up rate.

The products from rates of heat up of 5 deg C./min, 15 deg C./min and 50 deg C./min were screened to get a size distribution. The average size of each product is shown in FIG. 16. The average size for all products was about 300 um. It is concluded that the rate of heat up has no significant affect on particle size.

Effect of Heat up Rate on Specific Surface Area

The effect of rate of heat up on the specific surface area of the devolatilized carbon-silica product is shown in the chart below. The results suggest that a higher specific surface area is achieved with a fast heat up rate. If this is true it, a product produced by a fast heat up rate may be more reactive with regard to producing Si3N4 or SiC than a product produced by slow heat up.

Proprietary Process Design for Devolatilization and Oil Recovery

Si Options has carried out a complete preliminary engineering design of its' process to convert rice hulls into unique carbon-silica products, unique devolatilized carbon-silica products, other unique intermediate products and unique silicon-containing final products. Inputs to this effort were derived from the research and development activities of Si Options as well as from the engineering expertise of its engineering consultant. As part of this effort, a design was developed for the unit operation concerned with devolatilization and oil recovery. A description of the design follows.

An apron conveyor draws the carbon-silica product from one of the two feed bins. The carbon-silica product is fed to an indirectly heated fluidized-bed calciner, which is operated to promote devolatilization. The carbon-silica product enters the calciner via gas-assisted transport in a preheated nitrogen stream. The calciner discharges the solid devolatilized carbon-silica product onto a sealed conveyor system, which transports the material to the carbothermal process furnace.

The fluidized-bed calciner discharge gases pass through a cyclone for coarse particulate matter removal and then through an electrostatic precipitator for fine particulate removal. The captured particulate matter is returned to the feed bins.

After exiting the electrostatic precipitator, the volatilized off gas inters an oil recovery circuit. In the first stage, the gas passes through a packed bed column to condense and collect the high boiling point organic fraction. Column temperature is maintained by passing a circulating stream of the condensed fraction oils through an indirect heat exchanger where it is indirectly heated by superheated steam. A bleed stream of the condensed high boiling point oils is taken from the condenser reservoir, cooled and stored in a tank pending shipment for offsite processing or market.

After exiting the high boiling point column, the process gas temperature is reduced as it passes through a heat exchanger. In the low boiling point organic recovery column, the gas passes countercurrent to a circulating stream of condensed liquid from the column reservoir. Again, a bleed stream of the condensed low boiling point oils is taken from the condenser reservoir and stored in a tank pending shipment for offsite processing or market.

The second stage condenser discharge gas enters a secondary combustion chamber, where it is oxidized with air to ensure total combustion of the uncondensed hydrocarbons, carbon monoxide, hydrogen, and other combustible gases. In an alternative scenario, the second stage condenser discharge gas is directed to the calciner furnace firebox, where it is burned as supplemental fuel.

The volatile carbon is carbonaceous material that is volatilized at temperature between about 300 deg C. and 1000 deg C. under an inert gas atmosphere such as argon. Where it is desirable to separate the release of the volatile carbon from a subsequent carbothermal reaction, the Leach Product is preferably devolatilized by heating it to a temperature of 900 deg C., to release the volatile carbon. The released volatile carbon is desirably condensed to form an oily byproduct. This devolatilized carbon silica product is referred to as a "Devolatilized Leach Product." The Devolatilized Leach Product should be viewed as an intermediate product that is then desirably fed to a carbothermal reactor. The remaining fixed carbon and silica react to form the silicon-containing product of interest.

The carbothermal reactor operates at about 1450 to 2000 deg C. However, the volatile carbon can be removed at a much lower temperature of around 900 deg C. Thus, less energy is used to remove the volatile carbon by carrying out the removal of the volatile carbon at 900 deg C. prior to the carbothermal operation instead of at 1450 deg C. to 2000 deg C. as part of the carbothermal operation.

Removal of the volatile carbon in the carbothermal operation may cause the carbothermal reactor to "plug up" due to condensation of the volatile carbon. Removal of the volatile carbon prior to the carbothermal operation avoids this potential problem.

Removal of the volatile carbon in the carbothermal operation at about 1450 deg C. to 2000 deg C. makes the volatile carbon vapors subject to high temperatures which may cause changes in the resulting oil product that make such product less desirable as an energy product or as a feed for chemical production. Removal of the volatile carbon at a lower temperature prior to the carbothermal operation avoids this potential problem.

If the Leach Product is fed directly to the carbothermal reactor, the volatile carbon is volatilized in the carbothermal reactor while the fixed carbon and silica react to form the silicon-containing product of interest. The volatile carbon will exit the carbothermal reactor in the off-gas stream and can then be condensed to form an oily material that can be used as a fuel or as a chemical feedstock.

Although there are some concerns regarding feeding the Leach Product directly to the carbothermal reactor as noted above, directly feeding the Leach Product to the carbothermal reactor means that both the devolatilization and the carbothermal reaction can be carried out in a single operation as opposed to two separate operations. This may reduce capital and operating costs. Whether it is best to carry out devolatilization and the carbothermal reaction in separate reactors or in a single reactor depends on the results of an engineering and economic analysis for a specific commercial plant.

Si Options has carried out a complete preliminary engineering design of its process to convert rice hulls into unique carbon-silica products, unique devolatilized carbon-silica products, other unique intermediate products and unique silicon-containing final products. Inputs to this effort were derived from the research and development activities of Si Options as well as from the engineering expertise of its engineering consultant. As part of this effort, a design was developed for the unit operation concerned with devolatilization and oil recovery. A description of the design follows.

An apron conveyor draws the carbon-silica product from one of the two feed bins. The carbon-silica product is fed to an indirectly heated fluidized-bed calciner, which is operated to promote devolatilization. The carbon-silica product enters the calciner via gas-assisted transport in a preheated nitrogen stream. The calciner discharges the solid devolatilized carbon-silica product onto a sealed conveyor system, which transports the material to the carbothermal process furnace.

The fluidized-bed calciner discharge gases pass through a cyclone for coarse particulate matter removal and then through an electrostatic precipitator for fine particulate removal. The captured particulate matter is returned to the feed bins.

After exiting the electrostatic precipitator, the volatilized off gas inters an oil recovery circuit. In the first stage, the gas passes through a packed bed column to condense and collect the high boiling point organic fraction. Column temperature is maintained by passing a circulating stream of the condensed fraction oils through an indirect heat exchanger where it is indirectly heated by superheated steam. A bleed stream of the condensed high boiling point oils is taken from the condenser reservoir, cooled and stored in a tank pending shipment for offsite processing or market.

After exiting the high boiling point column, the process gas temperature is reduced as it passes through a heat exchanger. In the low boiling point organic recovery column, the gas passes countercurrent to a circulating stream of condensed liquid from the column reservoir. Again, a bleed stream of the condensed low boiling point oils is taken from the condenser reservoir and stored in a tank pending shipment for offsite processing or market.

The second stage condenser discharge gas enters a secondary combustion chamber, where it is oxidized with air to ensure total combustion of the uncondensed hydrocarbons, carbon monoxide, hydrogen, and other combustible gases. In an alternative scenario, the second stage condenser discharge gas is directed to the calciner furnace firebox, where it is burned as supplemental fuel.

Carbothermal Reaction Products

In the carbothermal reactor, the fixed carbon removes the oxygens from the silica (SiO2) to form carbon monoxide and a silicon-containing product. If the desired silicon containing product ("Carbothermal Reaction Product") is silicon carbide, the reactor is operated with an inert gas such as argon. However, if the desired Carbothermal Reaction Product is silicon nitride, the carbothermal reactor is operated under nitrogen.

The carbothermal reaction for the production of silicon nitride is as follows:

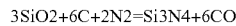

Thus, the stoichiometric carbon:silica mole ratio for the reaction is 2:1 and the feed material to the carbothermal reactor (either the Leach Product or the Devolatilized Leach Product) should have a fixed carbon:silica mole ratio of about 2:1. If the silicon nitride is to be used for producing advanced ceramics, the mineral level in the feed material must be significantly lower than in rice hulls, but not as low as is needed to produce photovoltaic grade silicon. The typical temperature employed for the carbothermal production of silicon nitride is about 1450 deg C.

We tested the Leach Product and Devolatilized Leach Product in the carbothermal production of silicon nitride and found conditions where the yield of product is excellent. However, when conventional reactors are used the reaction is very slow, taking as long as 12 hours. Through our investigations, we have discovered that the rate of production of silicon nitride is extremely sensitive to the concentration of carbon monoxide (CO). Once this was understood, we developed an up-flow carbothermal reactor that keeps the concentration of carbon monoxide very low. As a result, the reaction takes place in less than 1 hour. The up-flow reactor and methods for operating the reactor are also our inventions and are addressed in a separate patent application.

The carbothermal reaction for the production of silicon carbide is as follows:

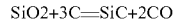

Thus the stoichiometric carbon:silica mole ratio for the reaction is 3:1 and the feed material to the carbothermal reactor (either the Leach Product or the Devolatilized Leach Product) should have a fixed carbon:silica mole ratio of about 3:1. If the silicon carbide is to be used for producing advanced ceramics, the mineral level in the feed material must be significantly lower than in rice hulls, but not as low as is needed to product photovoltaic grade silicon. The typical temperature employed for the carbothermal production of beta-silicon carbide is about 1500 deg C. and the typical temperature employed for the carbothermal production of alpha-silicon carbide is about 2,000 deg C.

We tested the Leach Product and Devolatilized Leach Product in the carbothermal production of silicon carbide and found that the reaction proceeds much faster than is seen with the commercial silicon carbide production process. Moreover the yield of product is much better than is attained with the commercial process. Moreover, we discovered that if the carbon:silica mole ratio of the feed material is somewhat less than 2:1, the alpha-silicon carbide product is free of any residual carbon or silica and is extremely pure with regard to mineral contamination.

The consensus in the literature is that the carbothermal production of Si3N4 from silica and carbon is a slow reaction taking 10-12 hours. Using small samples some researchers claim to have achieved shorter reaction times. Though its research Si Options has discovered that the key to fast reaction rates is to provide ready access of the charge particles to the bulk gas so that gas transfer to/from the reaction sites to/from the bulk gas is fast. With this in mind, Si Options has developed a unique up flow reactor with a restricted bed that when used with Si Options unique devolatilized carbon-silica product or its unique carbon silica product provides for the fast production of it unique carbothermal Si3N4 intermediate product. Furthermore the yields of product and the quality of the product are excellent.

This application provides the design, assembly and operation of this proprietary reactor. It also provides a description of extensive test work aimed at understanding the affect of different operating parameters on the performance of the reactor. Through this work the following values of operating parameters have been established that provide for optimum performance. These are:
1. The proprietary devolatilized feed material should have a mode particle size of 130 um and a fixed carbon-silica ratio of 5:1.
2. Industrial grade nitrogen (300 ppm oxygen) should be used.
3. An average charge density of at least 0.147 gm/cc should be used
4. A nitrogen flow rate that gives a nitrogen flow rate per mass of charge of at least 0.5 SLPM/gm should be used, with 0.8 SLPM/gm preferred.
5. Reactor pressures in the range of 1 atmosphere are recommended.

Using these recommended conditions the yield of Si3N4 will be >90% and the time to complete the production of Si3N4 will be less than 1.7 hours. The phosphorous concentration in the product will be significantly less than the feed material. The Si3N4 will be largely in the form of alpha-Si3N4 and largely in the form of fibers. The presence of SiC is not expected. The product will contain significant amounts of residual carbon which can be removed by a process developed by Si Options and described in another document associated with the overall patent application. The product will contain small amounts of residual silica which can be removed by a process developed by Si Options and described in another document associated with the overall patent application.

Besides the optimum conditions noted in the last paragraph Si Options has explored the following range of conditions with the up flow reactor, which conditions will also provide for the production of Si3N4.

Charge has particles having mode particles sizes of 400 and 130 um,

Charge materials having fixed carbon:SiO2 mole ratios ranging from 1.37:1 to 5:1

Average charge densities ranging from 0.049 gm/cc to 0.137 gm/cc.

4. Nitrogen flow rates per charge mass ranging from 0.1 SLPM/gm to 0.8 SLPM/gm

Average reactor temperatures from 1368 deg C. to 1475 deg C. with final reactor temperatures as high as 1500 deg C.

Reactor pressure from 1 atmosphere to 2 atmospheres.

Reaction time from a few minutes to over 12 hours.

The unique optimum operating conditions and the range of conditions explored for producing Si Options unique silicon nitride intermediate product from Si Options unique carbon silica product or its unique devolatilized carbon silica product using its unique up flow reactor with a restricted reaction zone are proprietary to Si Options.

In addition, the up flow reactor with restricted hot zone can be scaled up by simply increasing the diameter of the reaction tube or height of the height of the restricted hot zone. Furthermore, it is important to note that none of the operating parameters recommended above for optimum performance are affected by the diameter of the reaction tube or the height of the reactor hot zone. Thus, the recommended values of the parameters apply to any size reactor and, if used, should provided the same yield, reaction rate and product quality regardless of reactor size. The ease of scale up and the ability to use already established optimum operating for any size reactor are unique feature of the reactor.

In addition, Si Options have incorporated the up flow reactor into completed a process design of the entire carbothermal operation for conversion of Si Options unique devolatilized carbon silica product into its unique carbothermal Si3N4 intermediate product. A description of this process design is included in this application and is proprietary to Si Options.

In addition, the test work by Si Options for the up flow reactor with a restricted hot zone has provided Si Options with insights that suggest modifications to further improve the performance reactor and suggest other reactor types for this application. These modifications and the other reactor types are described in this application and are proprietary to Si Options for this application.

Work Leading to the Selection and Development of an Up Flow Reactor with Restricted Hot Zone Initial work by Si Options on the carbothermal production of a unique silicon nitride (Si3N4) intermediate product from its unique carbon-silica product and its unique devolatilized carbon-silica product involved the use of a horizontal externally heated rotary tube furnace. Tests were conducted with and without rotation. Without rotation the feed material formed a packed bed in the tube and nitrogen gas flowed across the top. With rotation, the bed was "turned over" as the nitrogen flowed across the top. Using this reactor in either mode provided excellent yields of Si3N4 but the time needed to complete the reaction was lengthy unless the bed depth was thin. The negative correlation between bed depth and time to complete the reaction led Si Options to the conclusion that either mass transfer of nitrogen from the bulk gas through the bed to the reaction site or mass transfer of carbon monoxide (CO) from the reaction site through the bed to the bulk gas or both were limiting the rate of the reaction. As a result, Si Options decided to develop and test an up flow reactor for the production of silicon nitride. With an up flow reactor the bulk gas flows by each particle and bed depth is effectively eliminated as a controlling variable.

Description of Up Flow Reactor with Restricted Hot Zone

The original up flow reactor was designed to operate as a fluidized bed reactor and did not include an upper graphite cup to restrict the upward flow of charge. Data from cold flow tests indicated that, at the nitrogen flow rates anticipated, the fluidized charge material would remain within a zone in the reactor tube that corresponded to the hot zone of the furnace. Subsequent test indicated that this was the case, but these tests also indicated that the temperature at the top of the reactor hot zone was significantly less than the middle of the reactor hot zone. Thus, the reactor hot zone was shortened so that the temperature in it was uniform. The reaction zone was shortened by inserting a top graphite cup into the reactor tube.

Figure 4:
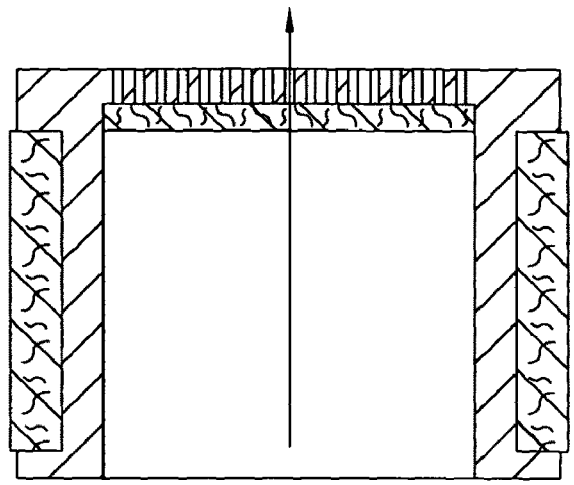
FIG. 4 is a diagrammatic view of apparatus of the invention.

The reactor tube consists of a cylinder of silicon carbide that is 5 ft. long and has an inside diameter of 1.125 inches. The tube is wrapped in insulating material. Before a test a graphite cup with holes drilled in the bottom is inserted upside down into the gas inlet end of the tube so that the bottom of the cup will be at least 3 inches inside the hot zone of the furnace once the tube is installed upright within the vertical furnace. Before being inserted into the tube the graphite cup is wrapped in graphite felt to provide a seal between the cup and the tube. In addition a round piece of graphite felt is placed next to the inside surface of the bottom of the cup. This piece of felt keeps the charge material above the cup from falling through the holes in the cup but allows gas to flow through the holes in the cup and on up through the silicon carbide tube. The bottom of the cup with holes is referred to as the gas distribution plate. A detailed diagram of the cup is shown in FIG. 4. Once this cup is installed, the charge material is then poured into the tube. This charge material rests on the top of the distribution plate. Next, a second graphite cup is installed upside down into the gas outlet end of the tube. The cup is positioned so that, once the tube is installed within the furnace, the bottom of the cup will be located at some point that is within the hot zone of the furnace.

Figure 5:
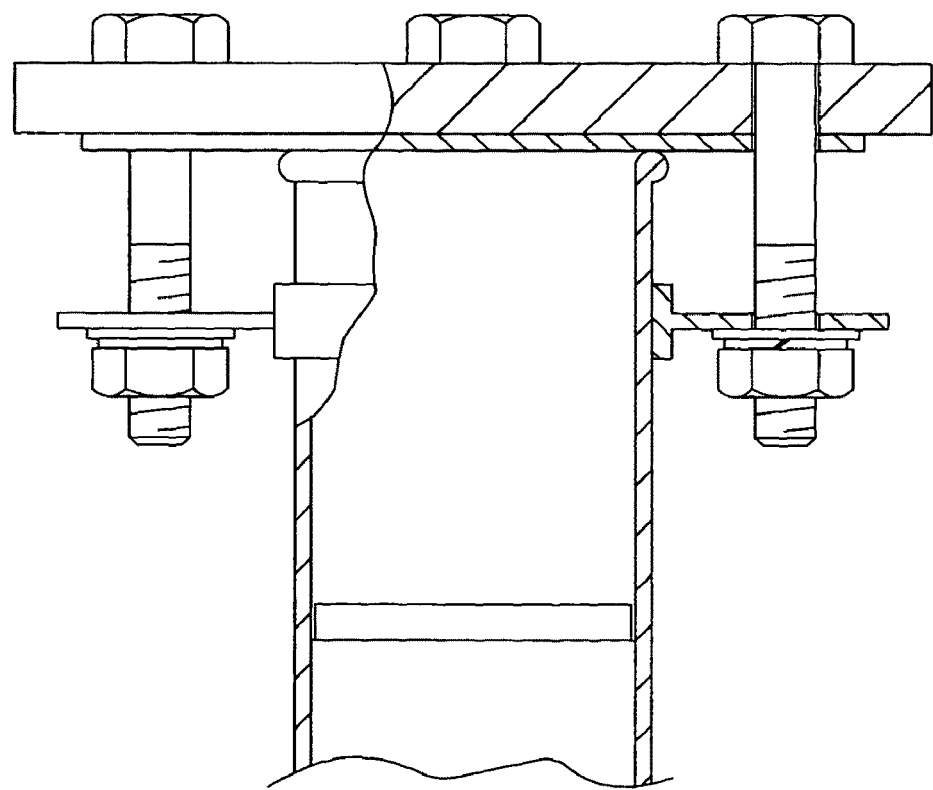
FIG. 5 is a diagrammatic view of apparatus of the invention.

Once the cups and charge have been installed, flanges are attached to each end of the tube. The flanges are made of stainless steel and have a hole drilled in the center to allow gas to flow though. Holes are also drilled near the outside edge of the flange to hold the bolts that attach the flanges to the clips that are attached to the tube. Hose clamps, with clips attached, are attached around each end of the insulated tube. A gasket, typically made of grafoil, is positioned between the end of the tube the flange. Bolts are then inserted through the holes near the outside edge of the flange and then through the holes in the clips that are attached to the tube. Wing nuts are used to tighten the flange to the clips. A diagram of the flange system is shown in FIG. 5.

A diagram of the reactor system is provided in FIG. 3. Once the reaction tube has been prepared, the gas inlet end it is place vertically in a metal holding device. This device and tube are then slid into position in the vertical clam shell tubular furnace. The furnace is then shut around the tube. The top flange is then attached to a metal cap containing a pressure gauge. Occasionally, a thermocouple was inserted through the top of the cap into the reactor tube to measure temperatures within the tube. The cap, in turn, is attached to a flexible tube that, in turn, connects to a pressure regulator. The pressure regulator is attached to a cyclone, which, in turn, is connected to a gas flow monitor. After passing through the gas flow monitor, the gas then flows to a container containing water. The end of the tube carrying gas into the container is position at least 2 inches below the water line. From the container the gas is passed to the atmosphere. The bottom flange is then attached to a tube that connects to two preheaters that preheat the incoming gas before it enters the reaction tube. The pressure up steam and downstream of the preheaters is measured. The temperature downstream of the preheater is also measured. The upstream ends of the preheaters are attached to the mass flow controllers which control the flow a gas through the system. A mixing device is positioned downstream of the mass flow controllers to cause the gases from the mass flow controller to be completely mixed before entering the preheaters and subsequently the reaction tube. The mass flow controllers are connected to the gas cylinders which provide nitrogen gas as well as other gases. The furnace is a tubular clam shell furnace. The furnace contains a thermocouple that measures the furnace temperature.

Although this description is for batch operation, this reactor can be readily modified to operate in a continuous mode. Furthermore, this reactor can be easily scaled up by increasing the reaction tube diameter or by increasing the length of the hot zone. As will be discussed below, such scale up does not require a change in operating conditions. The design and/or construction and/or methods of using this reactor are proprietary to Si Options.

FIG. 4. Graphite Cups
FIG. 5. Sealing System
Operation of Up Flow Reactor with Restricted Hot Zone The purpose of the test program was to determine the effect of a range of operating conditions on the performance of the up flow reactor with constricted hot zone. Though this program, optimum operating conditions were defined that provide for: 1) minimal time to produce Si3N4; 2) maximum yield of Si3N4; and 3) a high quality Carbothermal Si3N4 Intermediate Product.

The chemical equation for the carbothermal production of Si3N4 from a feed material containing carbon and silica (SiO2) is as follows:

$$3SiO_2 + 6C + 2N_2 = Si_3N_4 + 6CO$$

The standard feed material used in the tests was Si Options unique devolatilized carbon-silica product. All of the tests but one were conducted with material that had a mode particle size of about 400 um. One test was conducted with material that had a mode particle size of about 130 um. Proximate analysis of both materials gave the same results as shown in the table below. Essentially all of the ash is silica.

| Ash, % | Volatile Carbon, % | Fixed Carbon, % | Fixed C:SiO2 Mole Ratio |
|---|---|---|---|
| 43.64 | 13.27 | 44.09 | 5.05:1 |

The mineral analysis of both materials was essentially the same as shown in the table below.

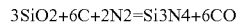

| Na | Mg | P | K | Ca | Mn | Fe |
|---|---|---|---|---|---|---|
| 10 | 20 | 30.8 | <10 | 50 | 20 | 50 |

Test Procedures

For each run, the furnace was heated up overnight at 2.5 deg C./minute so as to protect the reactor tube from thermal shock. Typically the furnace reached the furnace set point temperature at about 9 am the next morning. The furnace was held at the set point until the production of Si3N4 was complete, as indicated by the CO level in the off gas returning to the base line. Unless noted otherwise, the temperature of the reactor during the formation of Si3N4 was taken as the average reactor temperature from when the furnace temperature reached 1400 deg C. to the end of the run. After the run was completed, the furnace was cooled over night at a rate that protected the SiC reactor tube from thermal shock. During heat up, nitrogen was purged through the system at a low rate. The next morning the flow of nitrogen was increased to the test flow rate. Typically, the flow rate was increased when the furnace temperature was about 1,000 deg C. During heat up and throughout the remainder of the test, a back pressure of two inches of water (gauge) was maintained at the outlet of the system to insure that any leaks in the system would be outward. Thus, the pressure in the reactor was essentially 0 psig. Since the average pressure in Golden, Colo. is about 11.6 psia, the nominal absolute pressure in the reactor was 11.6 psia. The gas outflow was measured during each run and from these measurements it was determined that there were no leaks in the system during any of the runs. After each run the product was removed from the reactor.

Results: Effect of Operating Conditions on Time to Complete Production of Si3N4

Unless noted otherwise, the following operating conditions were constant for each test Charge material was Si Options proprietary standard feed material described above Ultra High Purity (UHP) nitrogen was used.

The nominal reactor pressure was 11.6 psia

Effect of Charge Mass on Time to Complete the Production of Si3N4

A group of tests was conducted in which the temperature was held at 1341 deg C. and the nitrogen flow rate was held at 4 SLPM while the charge mass was varied between 20-60 gms. The results showed that there is a positive linear relationship between the flow rate and time to complete the production of Si3N4. Stated another way, increases in charge mass cause the reaction rate to slow down Effect of Nitrogen Flow Rate on Time to Complete the Production of Si3N4

Groups of tests conducted at five different temperatures ranging from 1431 deg C. to 1464 deg C. Within each group the charge mass was constant. The nitrogen flow rate was varied within each group. Overall the nitrogen flow rate varied from 1-8 SLPM. Taken as a whole the data relating UHP N2 flow rate to the time to complete the production of Si3N4 clearly indicates that there is an inverse relationship between the time to complete the reaction and the UHP N2 flow rate. Moreover, it appears that the relationship is best described by a logarithmic function. Moreover, it appears than increasing the flow rate from 1 SLPM to 8 SLPM causes the reaction time to be halved. Stated another way, increases in UHP N2 flow rate cause the reaction to speed up.

Effect of UHP N2 Flow Rate per Charge Mass on the Time to Complete the Production of Si3N4

The above tests showed that charge mass and nitrogen flow rate have the opposite effect on the time to complete the production of Si3N4. Si Options speculated that these individual variables could be combined into a single variable, i.e., nitrogen flow rate per charge mass and that the time to complete the production of Si3N4 would correlate with this single variable for a given temperature. All of the data was grouped into several temperature groups and it was found that within a given temperature group those tests which had the same value for nitrogen flow rate per charge mass (SLP/gm) also had the same time to complete the production of Si3N4. Thus, for the constant conditions given above, Si Options concluded that the time to complete the production of Si3N4 is a function of only two variables instead of three. The two variables are temperature (deg C) and UHP nitrogen flow rate per charge mass. For a given temperature it was found a plot of time to complete the production of Si3N4 vs. nitrogen flow rate per charge mass was a negative logarithmic function. The shape of this curve was the same regardless of the temperature and it generally held that for a given temperature the time to complete the reaction at 0.8 SLPM/g was about half the time to complete the reaction at 0.1 SLPM/gm.

Effect of Temperature on the Time to Complete Production of Si3N4

Figure 6:
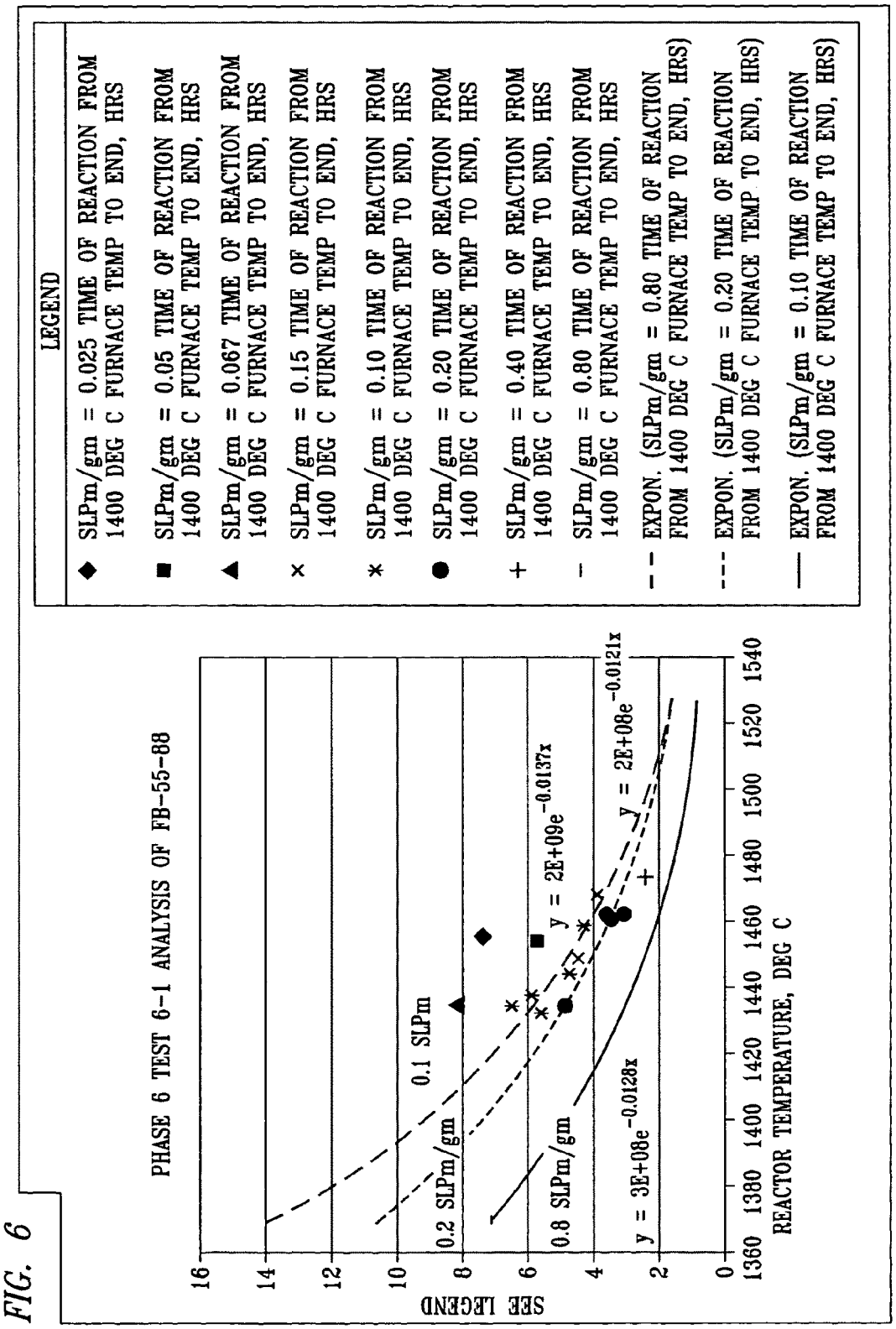
FIG. 6 is a chart showing reactor temperatures.

As shown above, for the constant conditions give, only two input variables determine the time to complete the production of Si3N4: 1) temperature and 2) UHP N2 flow rate per charge mass. Accordingly, the data from the all the runs was grouped by UHP N2 flow rate per mass charge and the time to complete Si3N4 production for a given UHP N2 flow rate per charge mass was plotted vs. the average temperature for each test within the group. These plots are shown in FIG. 6. The chart also shows the best fit curves for the data associated with UHP N2 flow rates per charge mass of 0.1 SLPM/gm, 0.2 SLPM/gm and 0.8 SLPM/gm. The curves are negative exponential functions and the equation for each curve is shown in the plot.

From FIG. 6, it is clear that increases in average reactor temperature from 1368 deg C. to close to 1480 deg C. have a very positive affect on the time to complete the production of Si3N4 For example, at 0.1 SLPM/gm, the time to complete production at 1368 deg C. would be 14 hrs whereas the time to complete production at 1480 deg C. would be about 3 hours. At 0.8 SLPM/gm the time to complete production at 1368 deg C. would be about 7 hours, whereas the time to complete production at 1480 deg C. would be about 1.7 hours and the time to complete production at 1520 deg C. would be about 1 hour. Thus, increasing the reactor temperature from 1368 deg C. to 1480 deg C. causes the reaction rate to increase by a factor of about 4.4.

The literature warns that, when reactor temperatures exceed about 1450 deg C., the formation of beta-silicon carbide is thermodynamically encouraged and that the Si3N4 product will be contaminated with beta-Si3N4. However, there were no signs of silicon carbide in any product from the runs analyzed in this report. Thus, with the reactor system and type of charge material used, a reactor temperature of at least 1480 deg C. can be used without risking contamination from beta-SiC. Further tests are needed to determine the highest temperature that can be used to produce Si3N4 without contamination from beta-SiC. In addition, the literature indicates that the production of Si3N4 does not take place at temperatures less than the lower 1400 deg C. range. However, the information in chart 18 shows than, with the reactor system and type of charge material used, the reaction proceeds to completion at a reactor temperature of 1368 deg C. Further tests are needed to determine the lowest temperature that can be used to produce Si3N4.

From FIG. 6 it is also clear that increases in UHP N2 flow rate per charge mass from 0.1 SLPM/gm to 0.8 SLPM/gm have a very positive effect on the time to complete the production of Si3N4. For example, at a reactor temperature of 1400 deg C. the time to complete the production of Si3N4 at an UHP N2 flow rate per charge mass of 0.1 SLPM/gm is about 9 hours, whereas the time to complete the production of Si3N4 at an UHP N2 flow rate per charge mass of 0.8 SLPM/gm is about 4.5 hours. Thus, increasing the UHP N2 per charge mass from 0.1 to 0.8 causes the reaction rate to increase by a factor of 2.0.

Thus, using Si Options unique up flow reactor with a restricted hot zone, its unique devolatilized carbon-silica feedstock with a fixed carbon:SiO2 mole ratio of 5:1 and mode particle size of 400 um, UHP nitrogen and a pressure of 11.6 psia, the production of Si3N4 can be completed within 1.7 hours if the average temperature is 1468 deg C. and the nitrogen flow per charge mass is 0.8 SLPM/gm. Higher temperatures and larger SLPM/gm will reduce the time of production even more. This relatively short time of production contrasts with the general opinion in the literature that the carbothermal production of Si3N4 is slow, typically taking 10-12 hours.

Using the data in FIG. 6, Si Options has developed equations to predict the time of production of Si3N4 for a range of nitrogen flow rate per charge mass of 0.1 SLPM/gm to 0.8 SLPM/gm and for a range of average reactor temperatures from 1368 deg C. to 1480 deg C. With these equations Si Options is able to evaluate the effect of different values of temperature and nitrogen flow rate per charge mass on production time of production. Thus, Si Options is able to connect these operating variables to production economics. These equations strictly apply when the constant conditions noted above are used. These equations are proprietary to Si Options.

Effect of Particle Size on the Time to Complete the Production of Si3N4

One of the constant conditions noted above was particle size, i.e., a mode particle size of 400 um. However, one test was carried out with a charge material having a mode particle size of 130 um. This limited data indicates that the time to complete the production of Si3N4 is shorter when the charge consists of smaller particles. For example, for an average temperature of 1431 deg C. and a nitrogen flow rate per charge mass of 0.1 SLPM/gm, the time to complete the production of Si3N4 with 130 um particles was about 94% of the time to complete the production of Si3N4 with 400 um particles. Thus, the use of smaller particles provides a small improvement in the time to complete the production of Si3N4.

Effect of Fixed Carbon:SiO2 Mole Ratio of Charge Material on Time to Complete the Production of Si3N4

One of the constant conditions noted above was that the charge material had a fixed carbon:SiO2 mole ratio of essentially 5:1. To test the effect of changes in the fixed carbon:SiO2 mole ratio on the time to complete the production of Si3N4, Si Options prepared devolatilized carbon-silica products that had the following fixed carbon:SiO2 mole ratios: 3.74:1; 2.64:1 and 1.37:1. The stoichiometric ratio for production of Si3N4 is 2:1. Thus, the material with a ratio of 3.74:1 was carbon rich and the material with a ratio of 2.64:1 was slightly carbon rich and the material with a ratio of 1.37:1 was carbon poor (silica rich). These materials were tested at 1413 deg C. in a tube reactor with UHP nitrogen flowing at 4 SLPM across the top of 4 gms of charge. Thus the reactor set up was not the up flow reactor, but the conclusions apply.

The following results were achieved:

| Fixed Carbon:SiO2 Mole Ratio | Time to Complete Production Production of Si3N4 (min.) | Time to Complete Production of Si3N4 Relative to Time At C:SiO2 = 3.74:1 |
| --- | --- | --- |
| 3.74 | 238 | 1.0 |
| 2.64 | 223 | 0.94 |
| 1.37 | 213 | 0.89 |

By extrapolation of this data the time to complete the production of Si3N4 at a ratio of 5:1 was estimated to be 250 minutes. Thus the time to complete the production of Si3N4 at different C:SiO2 mole ratios relative to the time to complete the production at a C:SiO2 mole ratio of 5:1 is shown below:

| Fixed Carbon:SiO2 Mole Ratio | Time to Complete Production Production of Si3N4 (min.) | Time to Complete Production of Si3N4 Relative to Time At C:SiO2 = 5:1 |
| --- | --- | --- |
| 5 | 250 | 1.0 |
| 3.74 | 238 | 0.95 |
| 2.64 | 223 | 0.89 |
| 1.37 | 213 | 0.85 |

Thus, in terms of time to complete the Si3N4 reaction, a fixed carbon:SiO2 ratio close to the stoichiometric ratio provides a modest benefit compared to the time when the charge material has a fixed carbon:SiO2 ratio of 5:1. Although the data suggests that a ratio less than stoichiometric might be best, it is important to understand that when the charge material is carbon poor, the yield of Si3N4 from SiO2 will be compromised.

Effect of Industrial Grade Nitrogen on Time to Complete the Production of Si3N4

One of the constant conditions noted above was that the nitrogen was UHP grade nitrogen. Si Options carried out additional tests with industrial grade nitrogen (300 ppm oxygen) and achieved the same results as it did with UHP nitrogen. Because the industrial grade nitrogen is significantly cheaper than the UHP nitrogen, Si Options recommends that industrial grade nitrogen be used with its invention.

Summary of Effect of Operating Parameters on Time to Complete the Production of Si3N4

Using Si Options proprietary up flow reactor offers significant advantage with regard to time to produce Si3N4 from its devolatilized carbon-silica product. Using this reactor and the devolatilized feed material, the time to complete the carbothermal production of Si3N4 can be significantly less than the typical times reported in the literature. Typical times reported in the literature are 10-12 hours, whereas times achieved using Si Option proprietary reactor and feed material are less than 1.7 hours.

Given the constant conditions noted above, there are only two variables that have significant effect on the time to complete the production of Si3N4 when using Si Options proprietary reactor and proprietary feed material, namely temperature (deg C) and nitrogen flow rate per charge mass (SLPM/gm). Average temperatures in the range of 1368 deg C. to 1480 deg C. were investigated and all provided for the production of Si3N4. Nitrogen flow rates per charge mass in the range of 0.1 SLPM/gm to 0.8 SLPM/gm were investigated and all provided for the production of Si3N4. However, higher temperatures and higher nitrogen flow rates provide for minimal Si3N4 production time.

Using Si Options proprietary up flow reactor and its proprietary devolatilized carbon-silica product as feed, variables other than temperature and nitrogen flow rate per charge mass were investigated and found to have minor effects on the time to complete the production of Si3N4. Charge material of smaller particle size offers some minor improvement in the production time. Feed containing a fixed carbon:silica ratio at or somewhat greater that the stoichiometric ratio offers some minor improvement over higher ratios. The use of UHP nitrogen offers no advantage over the use of industrial grade nitrogen (300 ppm oxygen).

The knowledge of how to adjust operating conditions when using Si Options proprietary up flow reactor and its proprietary devolatilized carbon:silica product as feed to achieve the shortest or other desired time to complete the production of Si3N4 is proprietary knowledge of Si Options.

Results: Effect of Operating Conditions on Yield of Si3N4

Unless noted otherwise, the following operating conditions were constant for each test:

Charge material was Si Options proprietary standard feed material described above Ultra High Purity (UHP) nitrogen was used.

The nominal reactor pressure was 11.6 psia

Measurement of Yield:

Yield, as used in this document, is the fraction or percent of SiO2 molecules in the feed material that are converted to Si3N4. The stoichiometric equation for the carbothermal production of Si3N4 from SiO2 and carbon is as follows:

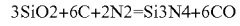

$$3SiO_2 + 6C + 2N_2 = Si_3N_4 + 6CO$$

Thus, if the feed contained 1 mole of SiO2 a 100% yield of Si3N4 would result in 0.33 moles of Si3N4.

Initially Si Options used wet chemistry methods to measure yield. However, it was found that these yields correlated with XRD data of the Si3N4 product. Specifically, it was found that the area of the 31 degree XRD peak (specific to alpha-Si3N4) for Si3N4 product correlated very well with the yield obtained from wet chemistry analysis. Thus, yield was typically determined from XRD data of the test product.

Figure 7:
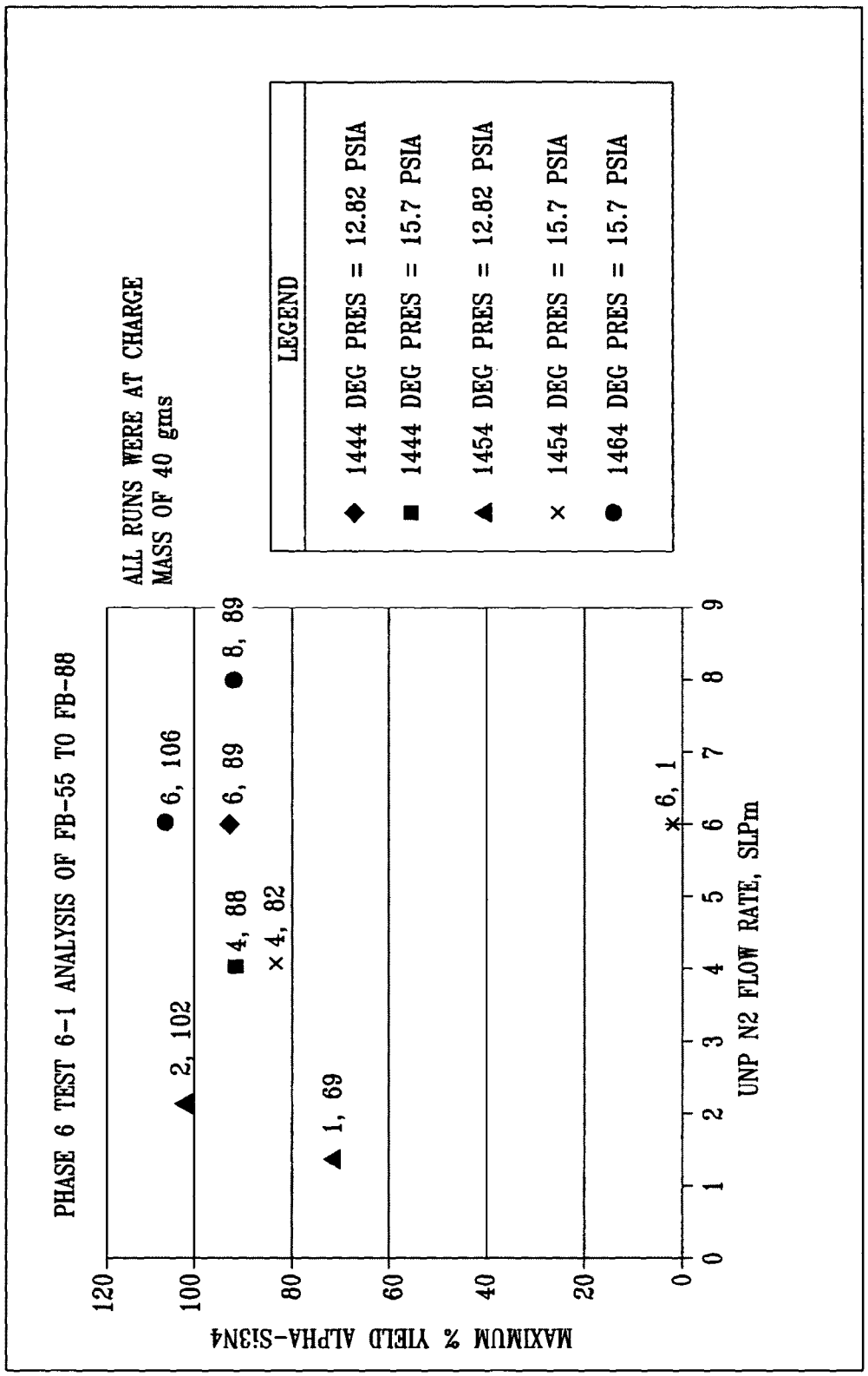
FIG. 7 is a chart showing vs. UHP N2 Flow Rate.

Effect of UHP N2 Flow Rate on Yield:

FIG. 7 shows the relationship between UHP N2 flow rate and yield of Si3N4 for seven runs under five different sets of conditions. When taken all together the data indicates that UHP N2 flow rate has no affect on the yield of Si3N4. This is in contrast to the positive effect that increases in UPH N2 flow rate have on the rate of Si3N4 production.

Figure 8:
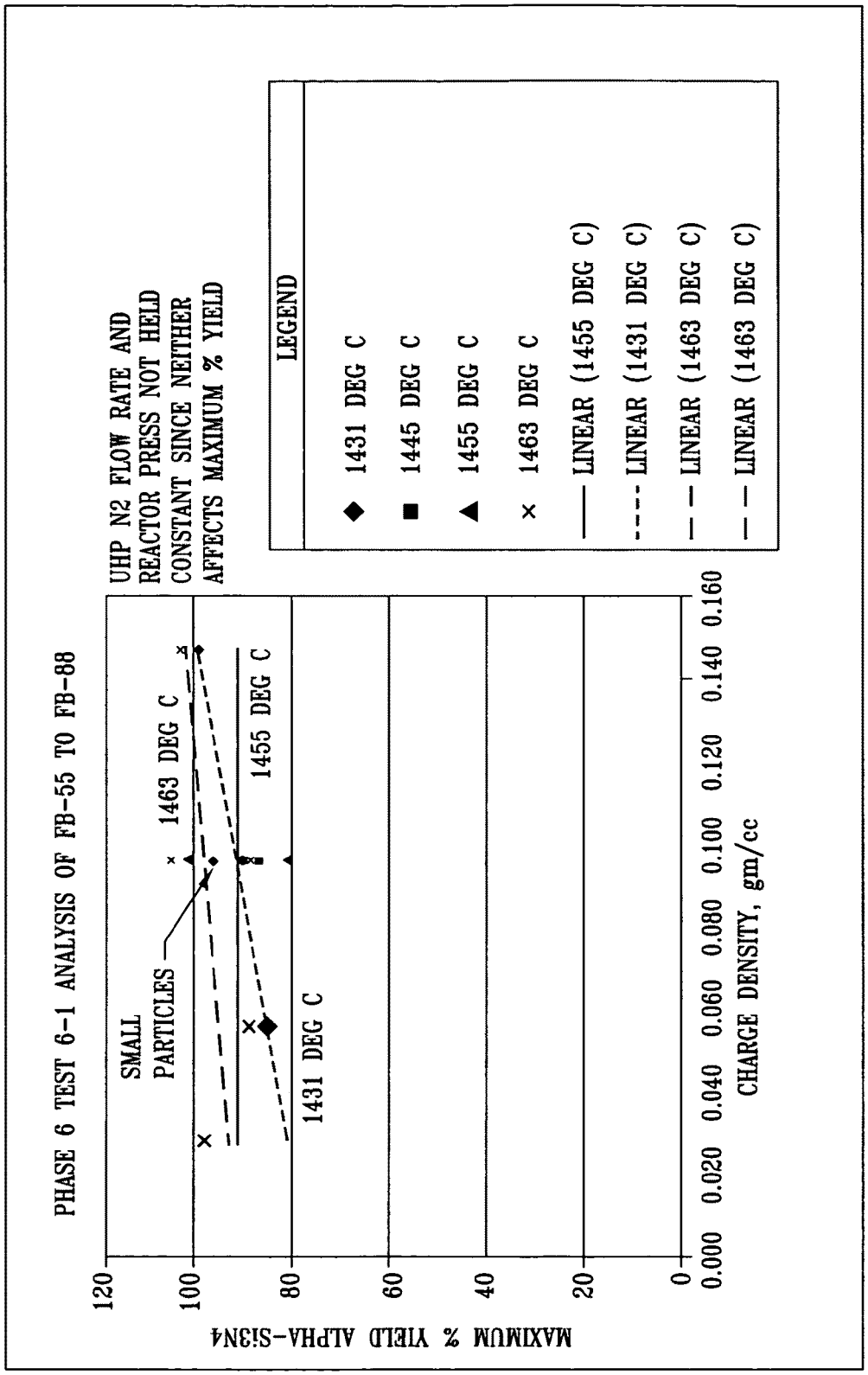
FIG. 8 is a chart showing maximum % yield of alpha silicon nitride against charge density.

Effect of Charge Mass or Average Charge Density on Yield:

The reaction zone in the up flow reactor has a volume of 407 cc. Thus the average density of the charge in the reaction zone is the charge mass divided by 407 cc. FIG. 8 shows the plot of average charge density vs. the yield of Si3N4 at three different average reactor temperatures. Since the above analysis indicates that UHP N2 flow rate has no effect on yield, this input variable was not held constant. The best fit linear functions through the data at 1431 deg C. and 1463 deg C. indicate that there is a positive relationship between average charge density and the yield of Si3N4, whereas the best fit linear function through the data at 1455 deg C. suggests that average charge density has no affect on the yield of Si3N4. Taken all together, the information in Chart 6-2 indicates that there is a positive relationship between average charge density and yield of Si3N4. This positive relationship suggests that particle to particle contact may enhance the yield of Si3N4. The positive effect of increased charge mass or average charge density on yield contrasts with the negative effect of increased charge mass on the time to complete the production of SiN4.

Effect of Nitrogen Flow Rate per Charge Mass on Yield:

Because yield is not affected by the nitrogen flow rate the ratio of nitrogen flow rate per charge mass has no meaning with regard to yield. In contrast, this ratio is one of the key variables in determining the rate of production of Si3N4.

Figure 9:
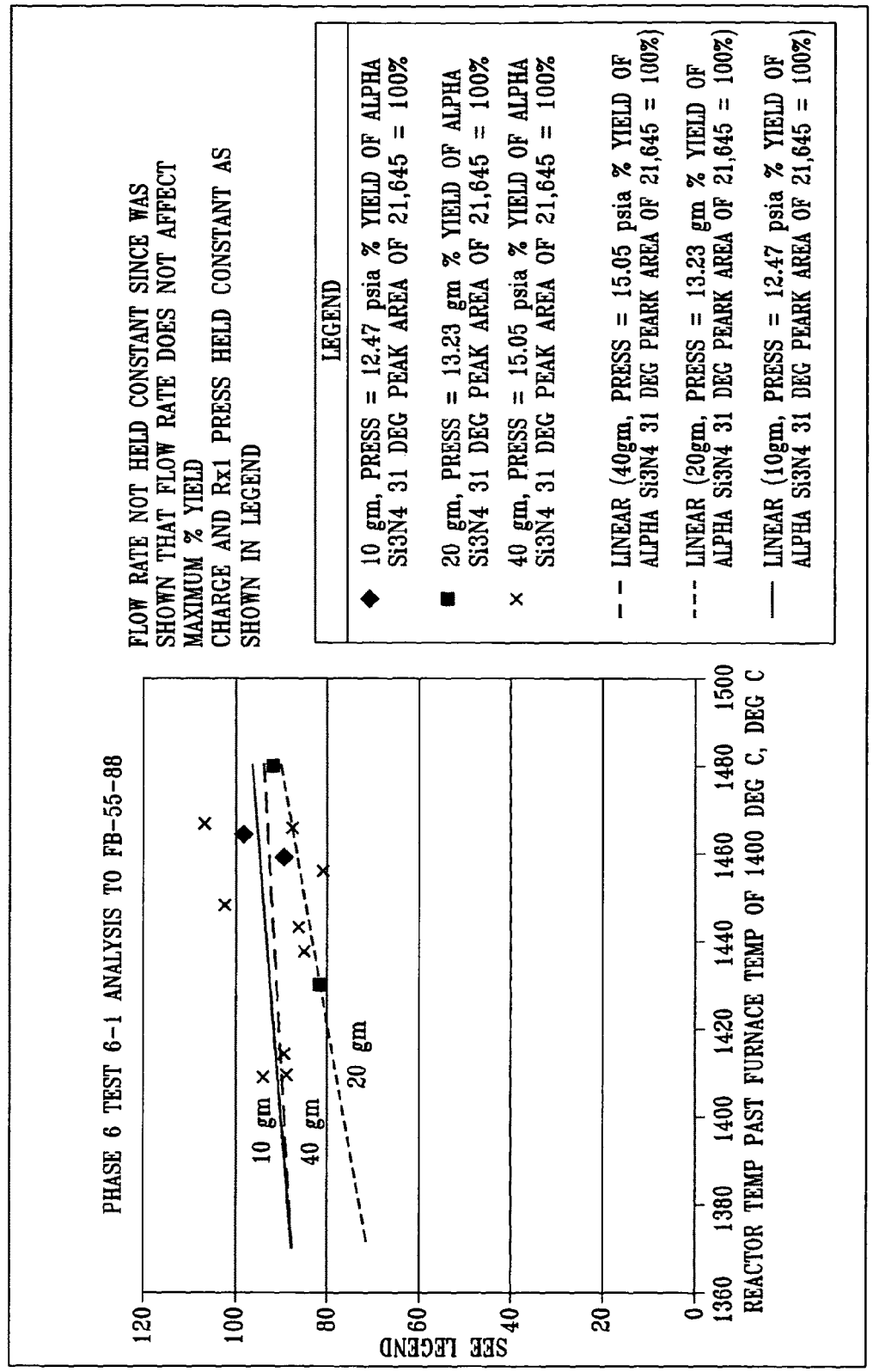
FIG. 9 is a chart showing reactor temperatures and flow rates.

Effect of Temperature on Yield:

FIG. 9 shows the relationship between average reactor temperature the yield of Si3N4 for fifteen runs under three different sets of conditions. Since the above analysis in item 1 indicates that the UHP N2 flow rate does not affect the maximum % yield of Si3N4, the UHP N2 flow rate was not specified for any of the three sets of conditions. The best fit linear function through all three sets of data indicates that there is a positive relationship between average reactor temperature and the yield of Si3N4. At an average reactor temperature of 1368 deg C. the yield is around 80%, whereas at an average reactor temperature of about 1475 deg C. the yield is about 95%. Extrapolation suggests that at an average reactor temperature of about 1500 deg C. the yield would be around 100%.

Figure 10:
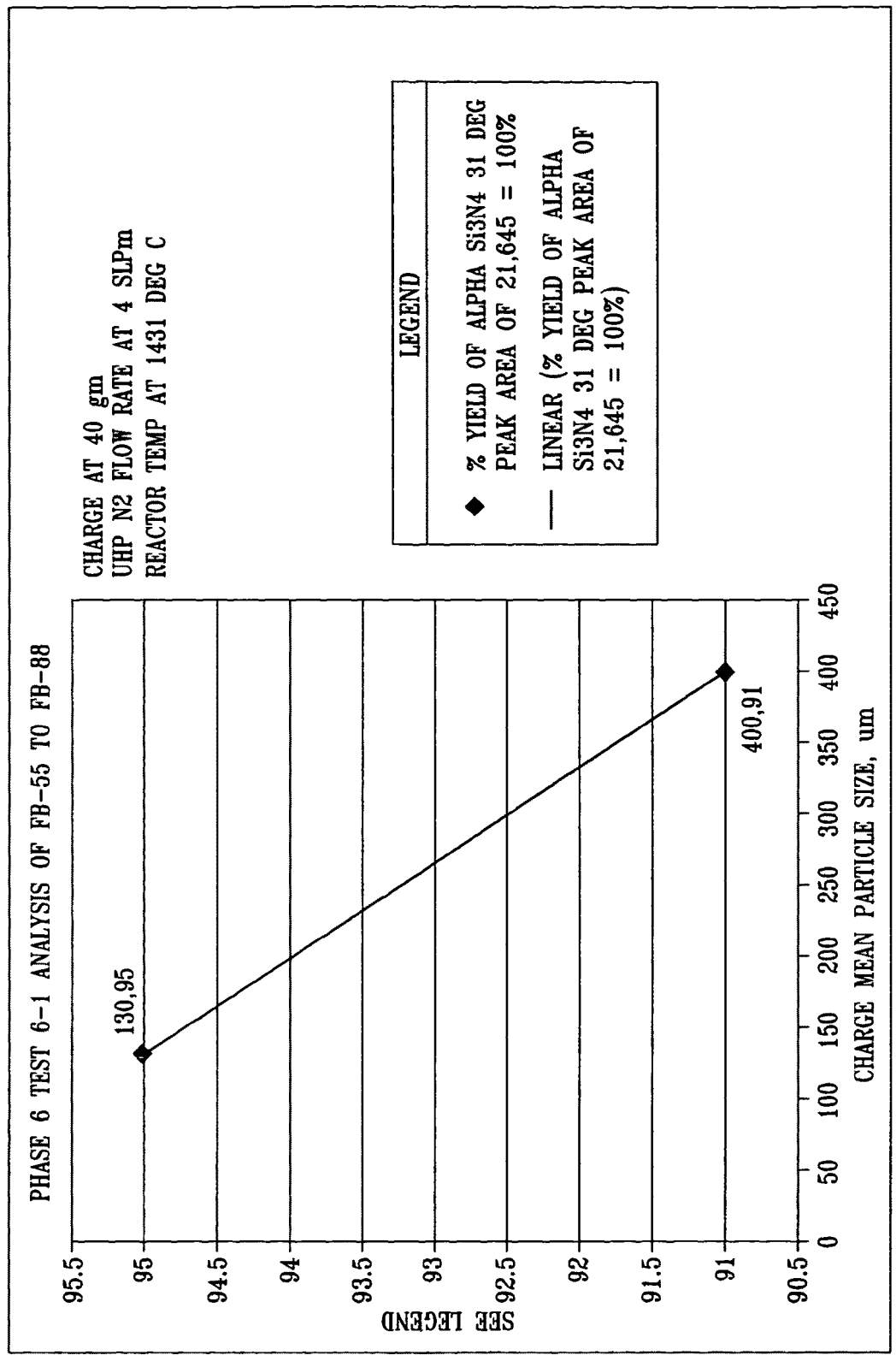
FIG. 10 is a graph showing charge flow rate against charge mean particle size.

Effect of Particle Size on Yield:

One of the constant conditions noted above was particle size, i.e., a mode particle size of 400 um. One test was carried out with a charge material having a mode particles size of 130 um as appose to the mode particle size of 400 um used in all other tests. There were only two runs where the values of all the input variables, except for particle size, were exactly the same as the one run done with charge material with a mean particle size of 130 um. FIG. 10 compares the maximum % yield of Si3N4 for these three runs. This limited amount of data suggests that smaller particles provide a higher maximum % yield than do larger particles. The difference between a 95% yield and 91% can have a significant effect on profitability. Thus, with regard to yield there may be significant advantage to using smaller particles.

Effect of Fixed Carbon:SiO2 Mole Ratio of Charge Material on Yield:

One of the constant conditions noted above was that the charge material had a fixed carbon:SiO2 mole ratio of essentially 5:1. To test the effect of changes in the fixed carbon: SiO2 mole ratio on yield, Si Options prepared devolatilized carbon-silica product that had the following fixed carbon: SiO2 mole ratios: 3.74:1; 2.64:1 and 1.37:1. The stoichiometric ratio for production of Si3N4 is 2:1. Thus, the material with a ratio of 3.74:1 was carbon rich and the material with a ratio of 2.64:1 was slightly carbon rich and the material with a ratio of 1.37:1 was carbon poor (silica rich). These materials were tested at 1413 deg C. in a tube reactor with UHP nitrogen flowing at 4 SLPM across the top of the 4 gms of charge. Thus the reactor set up was not the up flow reactor. However the results apply.

The following results were achieved:

| Fixed Carbon:SiO2 Mole Ratio | Fractional Yield | Yield Relative to Yield at Fixed Carbon:SiO2 Ratio of 3.74:1 |
| --- | --- | --- |
| 3.74 | 0.90 | 1.0 |
| 2.64 | 0.86 | 0.96 |
| 1.37 | 0.66 | 0.73 |

By extrapolation of this data the yield of Si3N4 at a ratio of 5:1 was estimated to be 100%. Thus the yield at different C:SiO2 mole ratios relative to the yield at a C:SiO2 mole ratio of 5:1 is shown below:

| Fixed Carbon:SiO2 Mole Ratio | Fractional Yield | Yield Relative to Yield at Fixed Carbon:SiO2 Ratio of 5:1 |
| --- | --- | --- |
| 5 | 100 | 1.0 |
| 3.74 | 90 | 0.90 |
| 2.64 | 86 | 0.86 |
| 1.37 | 66 | 0.66 |

Thus, in terms of yield, the higher the fixed carbon:SiO2 mole ratio the better. A ratio of 5:1 offers about a 10% improvement in yield over a ratio of 3.74:1 and about a 28% improvement over the stoichiometric ratio of 2:1. Once the ratio dips below the stoichiometric ratio the yield is compromised by lack of enough carbon to carry out full conversion of the SiO2 to Si3N4.

Effect of Industrial Grade Nitrogen on Time to Complete the Production of Si3N4

One of the constant conditions noted above was the use of UHP nitrogen. Comparison of the test results with UHP nitrogen to those with industrial grade nitrogen (300 ppm oxygen) shows that there is no difference in yield. Since industrial grade nitrogen is cheaper than UHP nitrogen, Si Options recommends the use of industrial grade nitrogen.

Summary of Effect of Operating Parameters on Yield:

Using Si Options unique up flow reactor with a restricted hot zone, its unique devolatilized carbon-silica feedstock with a fixed carbon:SiO2 mole ratio of 5:1 and mode particle size of 400 um and UHP nitrogen the yield of Si3N4 is a function of only two variables, namely average charge density and temperature. Both temperature and average charge density have a positive effect on yield.

Between the average reactor temperatures of 1368 deg C. and 1475 deg C. there is a positive relationship between the average reactor temperature and the yield of Si3N4. The increase in yield between these two temperatures is about 7%. For example, with a charge mass density of 0.049 gm/cc the yield is 84% at an average temperature of 1428 deg C., whereas with the same charge mass density the yield is 90% at 1463 deg C.

Between the average charge density of 0.049 gm/cc and 0.147 gm/cc there is a positive relationship between the average charge density and % yield of alpha-Si3N4. The increase in yield between these two densities is about 17%. For example, at a temperature of 1428 deg C. and an average charge density of 0.049 gm/cc the yield is 84%, whereas at the same temperature the yield is 98% at an average charge density of 0.147 gm/cc.

At the lowest temperature and lowest mass density shown the yield is about 84%, whereas at the highest temperature shown and the highest mass density shown the yield is essentially 100%.

UHP N2 flow rate has no affect on yield of Si3N4.

Because UHP nitrogen flow rate has no effect on yield, the quotient of UHP nitrogen flow rate per charge mass (SLPM/gm) has no meaning with regard to predicting yield.

Si Options has developed equations to predict the yield of Si3N4 from average mass density and temperature. These equations apply to the use of Si Options devolatilized carbon-silica product having a mode particle size of 400 um and a fixed carbon:SiO2 mole ratio of 5:1 with its proprietary up flow reactor when the UHP nitrogen pressure is about 1 atmosphere. These equations are proprietary to Si Options.

One of the constant conditions was that the charge material consisted of particles with a mode size of 400 um. Si Options has found that the use of charge material with a mode particle size of 130 um results in a significantly better yield. Thus, if the charge material consists of particles with a mode size less than 400 um, the predicted yield from the equations noted in item vii. must be adjusted upward.

One of the constant conditions was that the charge material had a fixed carbon:SiO2 ratio of 5:1. Si Options has found that the yield increases significantly as the fixed carbon:SiO2 ratio increases from the stoichiometric value of 2:1 to 5:1. Thus, Si Options recommends using a charge material with a fixed carbon:SiO2 mole ratio of 5:1. If this ratio is used, the equations noted in item vii.

need not be adjusted. If a lower ratio is used then the yield predicted by the equations needs to be adjusted downward.

One of the constant conditions was that UHP nitrogen was used. Si Options has found that industrial grade nitrogen works as well as UHP nitrogen. Si Options recommends that the cheaper industrial grade nitrogen be used. If industrial grade nitrogen is used, the equations noted in item 9 need not be adjusted.

Results: Effect of Operating Conditions on Quality of Si3N4

Assuming the use of a carbon rich feed material and assuming that at least a small amount of SiO2 will be left unreacted, one can expect to see certain amounts of carbon and silica in the carbothermal Si3N4 intermediate product. Si Options has developed technologies for removing the residual carbon and residual silica and these technologies are described in other documents that form part of this patent application.

In addition to residual carbon and silica, the intermediate product will contain a certain level of minerals other than silica and perhaps some amount of silicon carbide. Potential users of the product prefer low to very low levels of minerals and low to zero levels of silicon carbide. Furthermore, two crystalline forms of Si3N4 are normally found in Si3N4 products, namely alpha-Si3N4 and beta-Si3N4. The bulk of the Si3N4 is usually alpha-Si3N4 with smaller amounts of beta-Si3N4. Users of Si3N4 for ceramic applications like to have a product containing mainly alpha-Si3N4 with smaller amounts of beta-Si3N4 in the neighborhood of less than 5%. Finally, Si3N4 can exist in the form of particles and/or fibers. Either may be desired for ceramic applications. The influence of operating conditions on these various quality issues has been investigated by Si Options.

Effect of UHP N2 Flow Rate per Charge Mass (SLPM/gm) and Temperature (deg C) on the Mineral Concentration in the Carbothermal Si3N4 Intermediate Product:

The standard eight minerals tested for by Si Options are: sodium (Na), magnesium (Mg), aluminum (Al), phosphorous (P), potassium (K), calcium (Ca), manganese (Mn) and iron (Fe). The mineral composition of the charge materials used in the tests is given above.

Figure 11:
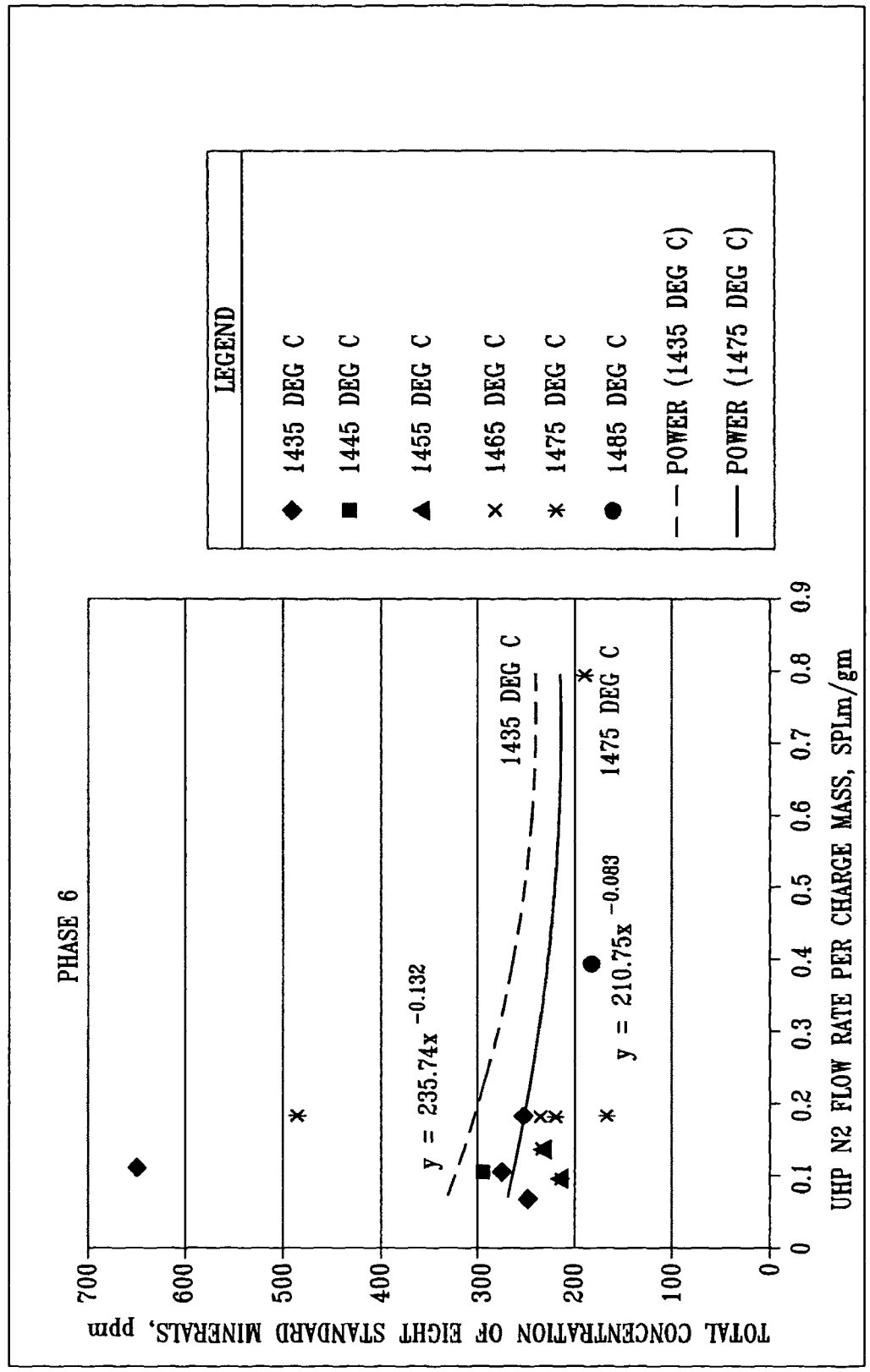
FIG. 11 is a graph showing total concentration of eight standard minerals (ppm) against flow rate per charge mass.

Effect of UHP N2 Flow Rate per Charge Mass (SLPM/gm) and Temperature (deg C) on the Total Concentration of the Standard Eight Minerals in the Carbothermal Si3N4 Intermediate Product:

FIG. 11 shows the total concentration of the eight standard minerals in the carbothermal Si3N4 product as a function of the UHP N2 flow rate per charge mass and reactor temperature. The chart also show the best fit functions for temperatures of 1435 deg C. and 1475 deg C. The equation associated with 1435 deg C. is:

$$y=235.7x-0.13$$

where y is the total concentration of the standard eight minerals (ppm) in the product and x is the UHP nitrogen flow rate per charge mass (SLPM/gm). The equation associated with 1475 deg C. is:

$$y=210.7x-0.08$$

where y is the total concentration of the standard eight minerals (ppm) in the product and x is the UHP nitrogen flow rate per charge mass (SLPM/gm).

For both temperatures, the total concentration of the standard eight minerals in the product declines as the UHP N2 flow rate per charge mass increases. Also, increasing the reactor temperature from 1435 deg C. to 1475 deg C. causes the total concentration of the standard eight minerals in the product to decline. Thus, increases in UHP N2 flow rate per charge mass and increases in temperature have positive effects on the total concentration of the standard eight minerals in the product, i.e., increases in value of these input variables cause a decrease in the concentration of the standard eight minerals in the product.

Figure 12:
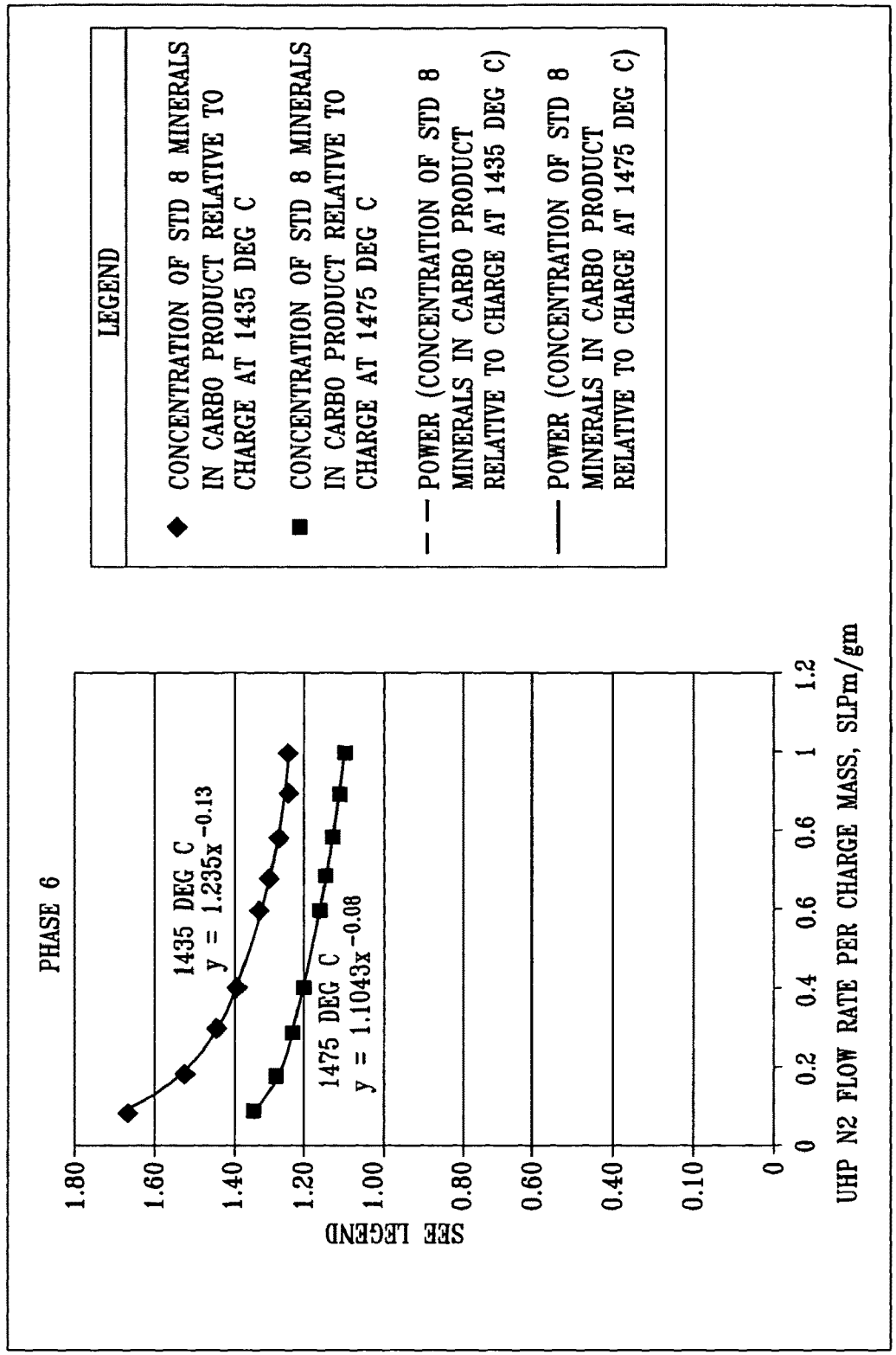
FIG. 12 is a graph showing concentration against flow rate per charge mass.

Each of the above equations was used to construct tables of the total concentration of the standard eight minerals in the product vs. the UHP N2 flow rate per charge mass for each respective temperature. The values in each of the tables were divided by the mineral concentration of the standard eight minerals in the charge to obtain measures of the impact of the nitrogen flow rate per charge mass at temperatures of 1435 deg C. and 1475 deg C. on the concentration of the standard eight minerals in the carbothermal product relative to the concentration of the standard eight minerals in the charge. FIG. 12 shows these measures at 1435 deg C. and 1475 deg C. as a function of the UHP N2 flow rate per charge mass. The best fit function to the data for 1435 deg C. is:

$$y=1.235x-0.13 \qquad (1)$$

where y is the total concentration of the standard eight minerals in the product divided by the concentration of the standard eight minerals in the charge and x is the UHP nitrogen flow rate per charge mass. The best fit function to the data for 1475 deg C. is:

$$y=1.104x-0.08 \qquad (2)$$

where y is the concentration of the standard eight minerals in the product divided by the concentration of the standard eight minerals in the charge and x is the UHP nitrogen flow rate per charge mass.

Note that, at either temperature and all nitrogen flow rates per charge mass less than 1.0 SLPM/gm, the total concentration of the standard eight minerals in the product is always higher than the total concentration of the standard eight minerals in the charge. However, as noted above, increases in the UHP N2 flow rate per charge mass reduce the total concentration of the standard eight minerals in the carbothermal product. And, as noted above, increases in the reactor temperature reduce the total concentration of the standard eight minerals in the carbothermal product.

Equations (1) and (2) apply rigorously to the following conditions:

Up flow reactor with a 7 inch restricted reaction zone

Feed to the carbothermal reaction having a C:SiO2 mole ratio of 5:1

Charge having a mode particle size of 400 um

Time equal to time needed to complete production of Si3N4

Back pressure of 11.9 psia

When using an up flow reactor, Si Options recommends using equation (1) to calculate the total concentration of the standard eight minerals in the product from the concentration of the standard eight minerals in the charge when the reactor temperature is between 1400 deg C. and 1455 deg C. And, when using an up flow reactor system, Si Options recommends using equation (2) to calculate the total concentration of the standard eight minerals in the product from the concentration of the standard eight minerals in the charge when the reactor temperature is between 1455 deg C. and above 1475 deg C.

Figure 13:
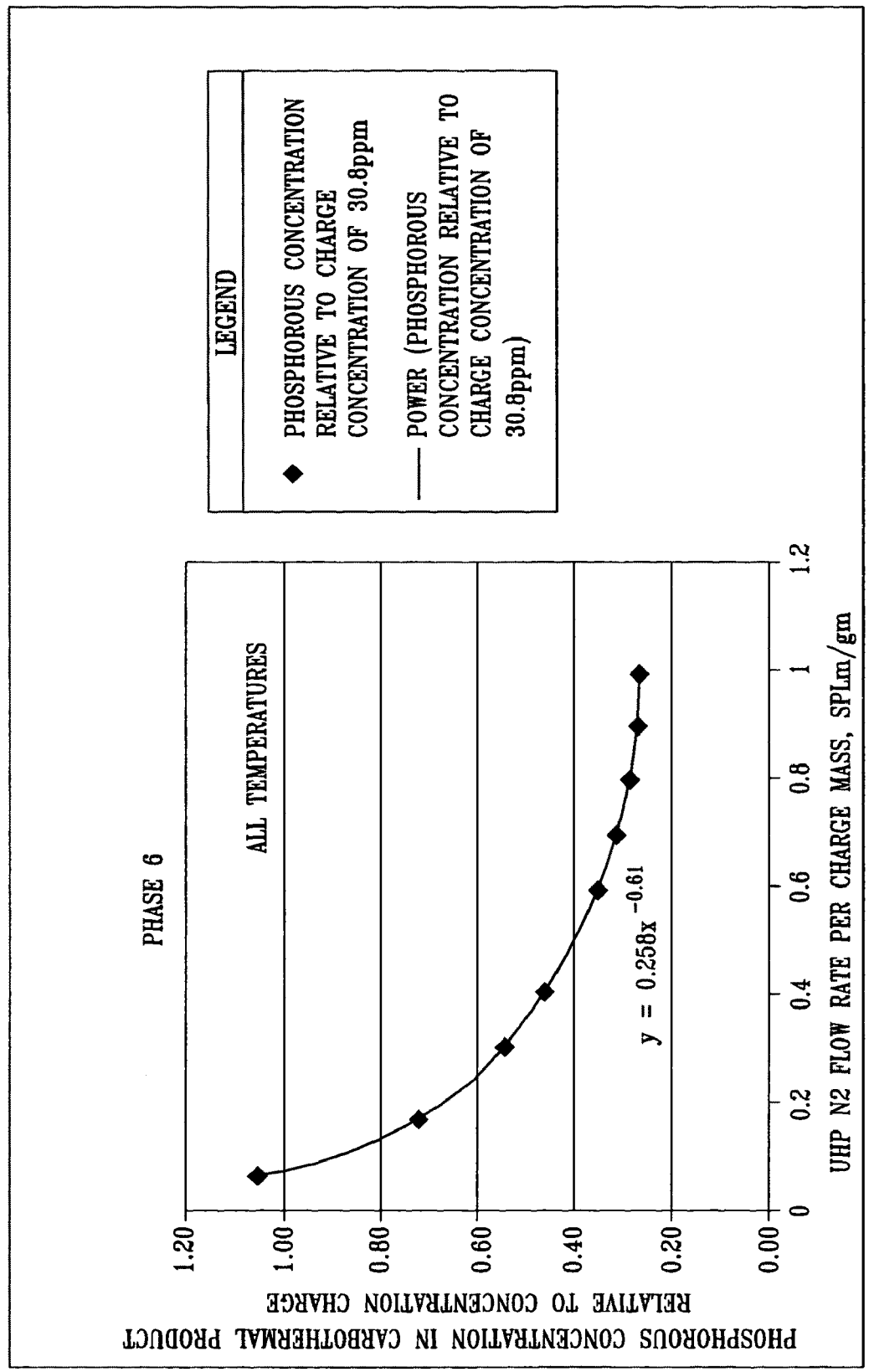
FIG. 13 is a graph showing phosphorous concentration against flow rate per charge mass.

Effect of UHP N2 Flow Rate per Charge Mass (SLPM/gm) and Temperature (deg C) on the Concentration of Phosphorous in the Carbothermal Si3N4 Product:

Using the same approach described above for total standard eight minerals, measures of the impact of the nitrogen flow rate per charge mass over a temperature range of 1400 deg C. to >1475 deg C. on the concentration of the phosphorous in the carbothermal product relative to the concentration of phosphorous in the charge were developed. FIG. 13 shows these measures. The best fit function to the data is:

$$y = 0.258x - 0.61 \quad (3)$$

where y is the concentration of phosphorous in the product divided by the concentration of phosphorous in the charge and x is the UHP nitrogen flow rate per charge mass.

Note that for all but the lowest UHP nitrogen flow rate per charge mass, the phosphorous concentration in the product is significantly lower than in the charge. At a UHP N2 flow rate per charge mass of 1.0 the concentration of phosphorous in the product is about 25% of that in the charge. Thus, regarding phosphorous, the carbothermal step can be a significant purification step. This is an important result if the Si3N4 product to be used to produce photovoltaic quality silicon. Si Options recommends using equation (3) to calculate the total concentration of the standard eight minerals in the product from the concentration of the standard eight minerals in the charge when the reactor temperature is between 1400 deg C. to 1475 deg C.

Figure 14:
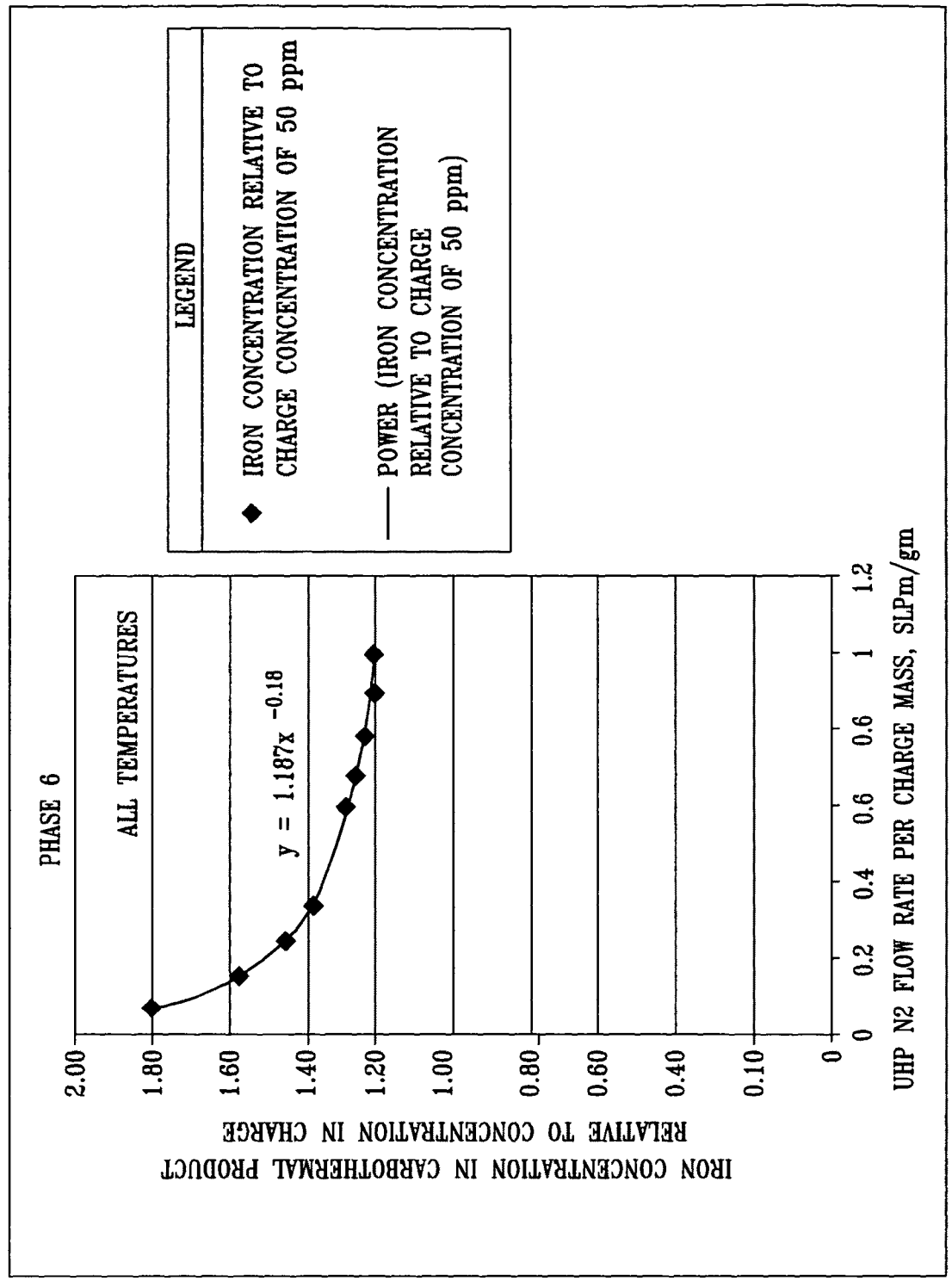
FIG. 14 is a graph showing ion concentration against flow rate charge mass.
Figure 15:
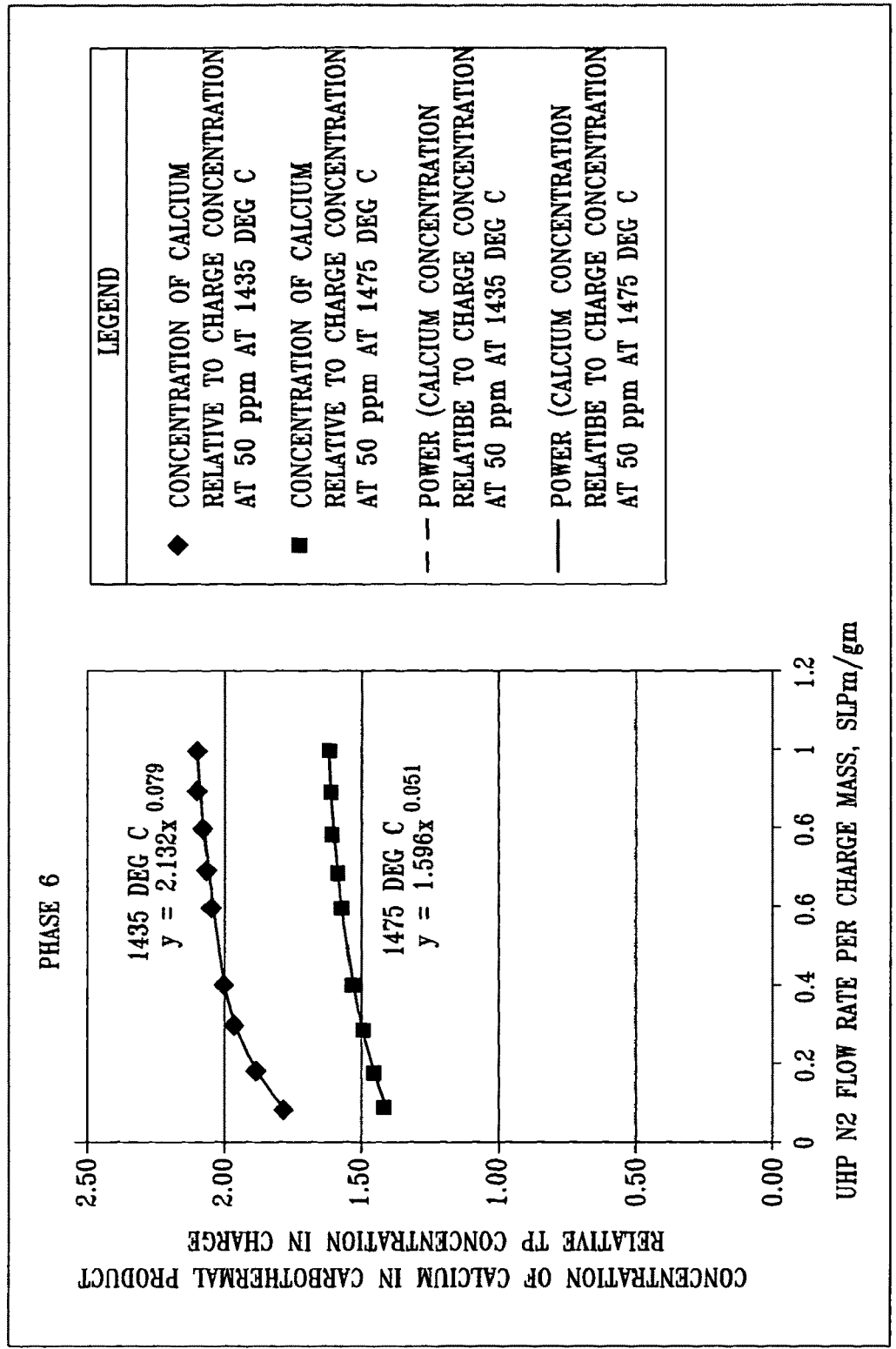
FIG. 15 is a graph showing concentration of calcium in carbothermal product against flow rate per charge mass.

Equation (3) applies rigorously to the following conditions:

Up flow reactor with a 7 inch restricted reaction zone
Feed to the carbothermal reaction having a C:SiO2 mole ratio of
Charge having a mode particle size of 400 um
Time equal to time needed to complete production of Si3N4
Back pressure of 11.9 psia
Effect of UHP N2 Flow Rate per Charge Mass (SLPM/gm) and Temperature (deg C) on the Concentration of Iron in the Carbothermal Si3N4 Intermediate Product:

Using the same approach described above for total standard eight minerals and phosphorous, measures of the impact of the nitrogen flow rate per charge mass at temperature range of 1475 deg C. on the concentration of the iron in the carbothermal product relative to the concentration of iron in the charge were developed. FIG. 14 shows these measures as a function of the UHP N2 flow rate per charge mass. The best fit function to the data for is:

$$y = 1.187x - 0.18 \quad (4)$$

where y is the concentration of iron in the product divided by the concentration of iron in the charge and x is the UHP nitrogen flow rate per charge mass. Note that for all UHP nitrogen flow rates per charge mass, the iron concentration in the product is higher than in the charge. At a UHP N2 flow rate per charge mass of 1.0 the concentration of iron in the product is about 120% of that in the charge. Si Options recommends using equation (4) to calculate the total concentration of the standard eight minerals in the product from the concentration of the standard eight minerals in the charge when the reactor temperature is between 1400 deg C. to 1475 deg C.

Equation (4) applies rigorously to the following conditions:

Up flow reactor with a 7 inch restricted reaction zone
Feed to the carbothermal reaction having a C:SiO2 mole ratio of 5:1
Charge having a mode particle size of 400 um
Temperature of 1475 deg C.
Time equal to time needed to complete production of Si3N4
Back pressure of 11.9 psia
Effect of UHP N2 Flow Rate per Charge Mass (SLPM/gm) and Temperature (deg C) on the Concentration of Calcium in the Carbothermal Si3N4 Product Using the same approach described above for total standard eight minerals, phosphorous and iron, measures of the impact of the nitrogen flow rate per charge mass over a temperature range of 1435 deg C. to 1475 deg C. on the concentration of calcium in the carbothermal product relative to the concentration of calcium in the charge were developed. Chart 5-2 shows these measures at 1435 deg C. and 1475 deg C. as a function of the UHP N2 flow rate per charge mass. The best fit function to the data for 1435 deg C. is:

$$y = 2.132x0.079 \quad (5)$$

where y is the concentration of calcium in the product divided by the concentration of calcium in the charge and x is the UHP nitrogen flow rate per charge mass.

The best fit function to the data for 1475 deg C. is:

$$y = 1.596x0.051 \quad (6)$$

where y is the concentration of calcium in the product divided by the concentration of calcium in the charge and x is the UHP nitrogen flow rate per charge mass.

Note that for all UHP nitrogen flow rate per charge mass, the calcium concentration in the product is higher than in the charge. At a UHP N2 flow rate per charge mass of 1.0 and a temperature of 1475 deg C., the concentration of calcium in the product is about 160% than that in the charge. Si Options recommends using equations (5 and 6) to calculate the total concentration of the standard eight minerals in the product from the concentration of the standard eight minerals in the charge when the reactor temperature is between 1400 deg C. to 1475 deg C.

Equations (5) and equation (6) apply rigorously to the following conditions:

Up flow reactor with a 7 inch restricted reaction zone
Feed to the carbothermal reaction having a C:SiO2 mole ratio of 5:1
Charge having a mode particle size of 400 um
Temperatures of 1435 deg C. and 1475 deg C.
Time equal to time needed to complete production of Si3N4
Back pressure of 11.9 psia
Overall Approach to Estimating the Concentration of Minerals in the Carbothermal Si3N4 Product The equations developed above are summarized in the Table below. The equations are organized according to the type of mineral and the temperature range that they apply to. X is the UHP nitrogen flow rate per charge mass and y is the concentration of the mineral in the product relative to the concentration of mineral in the charge. Thus, the concentration of mineral in the product can be obtained by multiplying the concentration in the charge by the value of y.

| Mineral | Equations: 1400 deg C. to >1475 deg C. (1) | Equations: 1400 deg C. to 1455 deg C. (1) | Equations: 1455 deg C. to >1475 deg. C. (1) |
|---|---|---|---|
| Total of Na, Mg, Al, P, K, Ca, Mn, Fe) | | $Y = 1.235*X**-0.13$ | $Y = 1.104*X*-0.08$ |

-continued

| Mineral | Equations:<br>1400 deg C.<br>to >1475 deg C. (1) | Equations:<br>1400 deg C. to<br>1455 deg C. (1) | Equations:<br>1455 deg C.<br>to >1475 deg. C. (1) |
|---|---|---|---|
| Phosphorous | Y = 0.258*X**−0.61 | | |
| Iron | Y = 1.187*X**−0.18 | | |
| Calcium | | Y = 2.132*X**0.079 | Y = 1.596*X**0.051 |

Using one of the equations for the standard eight minerals (Na, Mg, Al, P, K, Ca, Mn, and Fe), the total concentration for the standard eight minerals in the carbothermal product is calculated. Next, using the appropriate equations, the concentrations of phosphorous, iron and calcium in the carbothermal product are calculated. (These mineral are the predominant minerals in the carbothermal product.) Then, the concentrations of phosphorous, iron and calcium in the product are added together and this sum is subtracted from the total concentration of the standard eight minerals in the product to give the total concentration in the product of the 5 minor minerals, namely, Na, Mg, Al, K, and Mn. The concentration of each of these minor minerals in the product is estimated by dividing the total concentration of the minor minerals in the product by 5.

Besides showing the affect of the key operating parameters of temperature and nitrogen flow rate per charge mass on the mineral concentration in the carbothermal product, the most important outcome of this work is that the carbothermal step, under almost all conditions, produces a product that has a significantly lower concentration of phosphorous compared to the charge material. As discussed before, it is critical that Si3N4 destined for use in the production of PV cells contain very low levels of phosphorous. The carbothermal process developed by Si Options makes a significant contribution to achieving that objective.

Ratio of Beta-Si3N4 to Alpha-Si3N4

Under a wide set of conditions the ratio of beta-Si3N4 to alpha-Si3N4 was about 0.02:1. Thus the amount of beta-Si3N4 in the Si Options Intermediate Si3N4 Product will always be small. If it is desired to increase the amount of beta-Si3N4 in the product, Si Options has identified a heat treatment to convert a portion of the alpha-Si3N4 into beta-Si3N4.

Silicon Carbide

Via X-ray diffraction analysis there were no signs of SiC in any of the products produced in the up flow reactor.

Particles and/or Fibers

Microscopic examination of the Si3N4 products produced in the up flow reactor showed that a large portion of the product was fibrous. During the development of the sodium hydroxide process for removing residual silica from the intermediate Si3N4 product, it was established that about 95% of the product is fibrous and about 5% is in the form of small particles. For the production of ceramics, the fibrous nature of the product may have merit. It is envisioned that the fibers may add strength to a Si3N4 ceramic. On the other hand if small particles are desired the fibers will be milled to small size. Regarding the production of photovoltaic grade silicon from Si Options unique Si3N4 intermediate product, the form, fibrous or particulate, is not important.

Strategy for Selecting Properties of Si Options Proprietary Devolatilized Product and Other Operating Conditions to Achieve Optimum Production of Si3N4 with Si Options Proprietary Up Flow Reactor with a Restricted Bed In the above analysis attention was given to the effect of various inputs on the rate of the carbothermal reaction, the yield of the carbothermal reaction and the quality of the product. For the carbothermal step yield is the most important parameter for it is in this step that the basic intermediate products are converted into a basic near end product. If the yield in this step is poor this will have a direct impact on revenue which will have a magnified effect on profit. Thus when formulating a strategy for setting the feed character and values of the operating inputs one should first focus on determining which feed characteristics and other operating values will provide the best yield. Then these characteristics and other operating parameter can be adjusted to try to achieve reasonable production times and product quality. Attention to product quality may not be critical if there are downstream methods to remove contaminants and adjust the quality of the near end product.

Accordingly, it was established that temperature, charge density, particle size and fixed carbon:SiO2 mole ratio of the feed was all important to yield. Higher temperatures favor better yields, so the highest temperature consistent with not producing undesirable amounts of silicon carbide should be used. For the Si Options system the temperature should be at least 1475 deg C. Higher charge density also favors yield. Average densities greater than 0.147 gm/cc should be used. Smaller particle size favors yield. An average particle size less than 130 um is recommended. A high fixed carbon:SiO2 mole ratio favors yield. A fixed carbon:SiO2 mole ratio of 5:1 is recommended. Industrial grade nitrogen is as effective as UHP nitrogen. Since industrial grade nitrogen is cheaper. It should be used.

Turing to the rate of the reaction. High temperature favors a fast rate and, since high temperature also favors yield, temperatures of at least 1745 should be used. High charge density is not a problem to rate as long as the nitrogen flow rate per charge mass is above 0.5 SLPM/gm, ideally 0.8 SLPM/gm. Accordingly the charge density selected for yield purposes should be retained and balanced with a nitrogen flow rate that results in a nitrogen flow rate per charge mass of 0.5 SLPM/gm, ideally 0.8 SLPM/gm. As with yield, smaller particle size favors rate, so the particle size picked for yield purposes should be retained. The highest reaction rates are achieved with a feed material having a fixed carbon:SiO2 mole ratio at or slightly above the stoichiometric ratio of 2:1. However, as noted above, the best yield is achieved at higher fixed carbon:SiO2 mole ratios, preferably 5:1. Since increasing the fixed carbon:SiO2 mole ratio to 5:1 has a relatively small negative effect on reaction rate, whereas increasing the fixed carbon:SiO2 mole ratio has a significant positive effect on yield, which has a much bigger impact on economics, the ratio of 5:1 selected for yield should be retained.

Regarding product quality, adjustments in operating parameters seem to only affect the mineral content of the product. In this regard a high temperature and a high nitrogen flow rate per charge mass should be used. Thus the high temperature selected for yield and rate reasons and the high nitrogen flow rate per charge mass selected for rate reasons should be retained Summary In summary, maximum performance is achieved with the proprietary up flow reactor with a restricted bed operating a 1 atmosphere of nitrogen with the following conditions:

1. The proprietary devolatilized feed material should have a mode particle size of 130 um and a fixed carbon-silica ratio of 5:1.
2. Industrial grade nitrogen (300 ppm oxygen) should be used.
3. An average charge density of at least 0.147 gm/cc should be used
4. A nitrogen flow rate that gives a nitrogen flow rate per mass of charge of at least 0.5 SLPM/gm should be used, with 0.8 SLPM/gm preferred.
5. Reactor pressures in the range of 1 atmosphere are recommended.

Using these recommended conditions the yield of Si3N4 will be >90% and the time to complete the production of Si3N4 will be less than 1.7 hours. The phosphorous concentration in the product will be significantly less than the feed material. The Si3N4 will be largely in the form of alpha-Si3N4 and largely in the form of fibers. The presence of SiC is not expected. The product will contain significant amounts of residual carbon which can be removed by a process developed by Si Options and described in another document associated with the overall patent application. The product will contain small amounts of residual silica which can be removed by a process developed by Si Options and described in another document associated with the overall patent application.

Besides the optimum conditions noted in the last paragraph Si Options has explored the following range of conditions with the up flow reactor, which conditions will also provide for the production of Si3N4:

1. Charge has particles having mode particles sizes of 400 and 130 um,
2. Charge materials having fixed carbon:SiO2 mole ratios ranging from 1.37:1 to 5:1
3. Average charge densities ranging from 0.049 gm/cc to 0.137 gm/cc.
4. Nitrogen flow rates per charge mass ranging from 0.1 SLPM/gm to 0.8 SLPM/gm
5. Average reactor temperatures from 1368 deg C. to 1475 deg C. with final reactor temperatures as high as 1500 deg C.
6. Reactor pressure from 1 atmosphere to 2 atmospheres.
7. Reaction time from a few minutes to over 12 hours.

Scale Up of Si Options Up Flow Restricted Hot Zone

The up flow reactor with restricted hot zone can be scaled up by simply increasing the diameter of the reaction tube or height of the height of the restricted hot zone. It is important to note that none of the operating parameters recommended above for optimum performance are affected by the diameter of the reaction tube or the height of the reactor hot zone. Thus, the recommended values of the parameters apply to any size reactor and, if used, should provided the same yield, reaction rate and product quality regardless of reactor size.

Handling Potential Volatiles from Devolatilized Carbon-Silica Products

Depending on the temperature and time used to produce a devolatilized carbon-silica product there may or may not be certain amounts of residual volatile material left in the product. Such volatile material would be quickly released in the up flow reactor and removed in the nitrogen off gas stream. Accordingly, small amounts of residual volatiles in the feed material will not affect the production Si3N4. The volatiles removed in the nitrogen off gas would be condensed and used for energy purposes.

Process Design for Conversion of Si Options Unique Devolatilized Carbon-Silica Product into a Unique Silicon Nitride Intermediate Product with it Up Flow Reactor with a Restricted Hot Zone Si Options has carried out a complete preliminary engineering design of it's' process to convert rice hulls into unique carbon-silica products, unique devolatilized carbon-silica products, other unique intermediate products and unique silicon-containing final products. Inputs to this effort were derived from the research and development activities of Si Options as well as from the engineering expertise of its engineering consultant. As part of this effort, a design was developed for the unit operation concerned with the conversion of either its unique devolatilized carbon-silica product into its unique silicon nitride intermediate product. A description of the design follows.

Carbothermal processing is effected in an indirectly heated up flow reactor. A sealed insulating hot screw conveyor transfers hot devolatilized carbon-silica product directly to the carbothermal processing furnace feed bin. Devolatilized carbon-silica product storage bins are available for instances when it becomes necessary to divert the material for longer term storage. Within the up flow reactor, preheated nitrogen gas reacts with the silica and carbon in the devolatilized carbon-silica material according to the following net chemical equation:

$$3SiO2(s)+6C(s)+2N2(g)=Si3N4(s)+6CO(g)$$

The carbon rich silicon-nitride intermediate product is immediately transferred and fed to a fluidized bed reactor designed to remove the residual carbon The carbothermal reactor off gas, consisting predominantly of nitrogen, carbon monoxide, SiO and possibly volatile organics passes through a cyclone and a baghouse for particulate removal. The dusts captured by these devices returns to the carbothermal furnace feed bin. The cleaned gas may be cooled to remove the volatile organics, if present. The gas then enters a secondary combustion chamber where it is burned with air. This oxidation converts the CO to CO2. After exiting the secondary combustion chamber, the gas passes through a heat exchanger to transfer thermal energy to the nitrogen gas stream that enters the carbothermal furnace. The cooled gas passes through a baghouse to recover silica produced in the secondary combustion chamber from the fumed silicon monoxide (SiO) gas produced during the carbothermal reduction.

$$SiO(g)+½O2(g)=SiO2(s)$$

The silica fines are captured in a baghouse. The collected fines are marketed as a separate product.

Use of Si Options Carbon-Silica Product as Feed to the Up Flow Carbothermal Restricted Bed Reactor All tests with the up flow reactor were carried out with Si Options devolatilized carbon-silica product as feed. However, Si Options carbon-silica product can be used just as effectively. This product would be converted to a devolatilized carbon-silica product during the early time in the reactor. The volatiles released would be removed with the nitrogen off gas and subsequently condensed and used for energy purposes.

Modification to the Up Flow Reactor: Up Flow Through a Packed Bed

In the tests described above, before nitrogen flow was initiated, the charge material was in a packed bed state lying on top of the distribution plate toward the bottom of the furnace hot zone and there was an empty space above the bed. This is the densest state of the charge. Once the flow of nitrogen was initiated, the average density of the charge became less as the particles were lifted into the space above the initial packed bed. Since there is a negative correlation between the average charge density and the yield of Si3N4, the resulting increase in average charge density would have an undesired effect on the production of Si3N4. It would be possible to keep the charge material in a packed bed if the nitrogen flow rate were low. However, the low nitrogen flow rate would result in a low nitrogen flow rate per charge mass which would have a significant negative effect on the reaction rate. Another way to keep the charge material in a packed bed state without compromising the nitrogen flow rate would be to lower the top graphite cup so that there was no space above the charge. This would, in effect, keep the charge in a packed bed state regardless of the flow rate of nitrogen and provide for enhanced yield. The flow of nitrogen would be set at a value that provided a nitrogen flow rate per charge mass of at least 0.5 SLPM/gm, preferably 0.8 SLPM/gm, to give a desired rate of reaction. Thus, through this modification, yield would be enhanced and the rate of reaction and quality of product would not be compromised. Such a reactor could be operated in a batch or continuous mode. This modification is proprietary to Si Option.

Modification to the Up Flow Reactor: Fluidized Bed

The original up flow reactor was designed to operate as a fluidized bed reactor and did not include an upper graphite cup to restrict the upward flow of charge. Data from cold flow tests indicated that at the nitrogen flow rates anticipated the fluidized charge material would remain within a zone in the reactor tube that corresponded to the hot zone of the furnace. Subsequent test indicated that this was the case, but these tests also indicated that the temperature at the top of the reactor hot zone was significantly less than the middle of the reactor hot zone. Thus, the reactor hot zone was shortened so that the temperature in it was uniform. The reaction zone was shortened by inserting a top graphite cup into the reactor tube. See description of Up Flow Reactor. A consequence of shortening the reactor hot zone was that, under most nitrogen flow rates, the charge was not fully fluidized. It is proposed to modify the current up flow reactor by removing the top cup and using a furnace with a longer hot zone such that when the fluidized charge in the reactor hot zone is at a uniform temperature. This modification is proprietary to Si Options.

Down Flow Reactor: Down Flow Through a Packed Bed

Another approach to keeping the charge in a packed bed state while flowing nitrogen through the bed at a rate that provides for a desired reaction rate is to flow the nitrogen downward through a packed bed of charge material. With such a reactor it would not be necessary to place a restriction on top of the bed. The bed would remain in a packed bed state regardless of the nitrogen flow rate. The nitrogen flow rate would be set at the value that provided the nitrogen flow rate per charge density needed to achieve the desired reaction rate. Thus, such a don flow reactor would provide optimum yield, reaction rate and product quality. Such a reactor could be operated in a batch or continuous mode. This reactor type applied for the conversion of Si Options unique devolatiled carbon-silica product or its unique carbon-silica product to its unique carbothermal Si3N4 intermediate is proprietary to Si Options.

Removal of Residual Carbon from the Carbothermal Si3N4

We found that the best yields of silicon nitride are obtained from a feed material (either the Leach Product or the Devolatilized Leach Product) that is carbon rich, i.e. a feed that contains a fixed carbon:silica mole ratio of greater than 2:1. However, the silicon nitride product contains both residual carbon and some residual silica. Both of these materials must be reduced. In this regard, we developed an oxidation step that removes residual carbon from the silicon nitride product of the carbothermal step without oxidizing the silicon nitride. Air is used as the oxidizing agent and the optimum temperature is about 1000 deg C. With temperatures of about 1200 deg C. and greater, silicon nitride is partially oxidized to silica. The oxidation of silicon nitride reduces the product yield, which can have a negative impact on revenue and, therefore, a direct negative impact on profitability.

Process Design for Removal of Residual Carbon from Si Options Unique Silicon Nitride Intermediate Product Si Options has carried out a complete preliminary engineering design of its' process to convert rice hulls into unique carbon-silica products, unique devolatilized carbon-silica products, other unique intermediate products and unique silicon-containing final products. Inputs to this effort were derived from the research and development activities of Si Options as well as from the engineering expertise of its engineering consultant. As part of this effort, a design was developed for the unit operation concerned with removal of residual carbon from Si Options unique carbothermal Si3N4 intermediate product. The product of this operation is a unique silicon nitride intermediate. According to this design Si Options carbothermal Si3N4 intermediate product is immediately transferred from the carbothermal reactor to a fluidized-bed reactor via a sealed heated screw conveyor. By this method the heat in the carbothermal Si3N4 intermediate product is conserved making it unnecessary to heat the material before it enters the fluidized bed reactor. The fluidized-bed reactor operates to remove the residual carbon by reaction with the fluidizing gas that can consist of air or can consist of carbon monoxide and carbon dioxide; the CO/CO2 ratio is precisely controlled to maintain the proper oxygen potential. If CO/CO2 is used, carbon removal is effected by the Boudouard reaction:

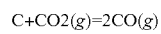

$$C + CO_2(g) = 2CO(g)$$

A cooling (screw) conveyor transfers the unique oxidized silicon nitride intermediate product to the feed bins in the area where the residual silica is to be removed. The carbon oxidation furnace off gas passes through a particulate removal device and is then routed to a direct-fired (natural gas and air) secondary combustion chamber. Alternately, the gas will be processed for energy recovery. This design, which encompasses the use of Si Options proprietary silicon nitride intermediate product and which produces a unique proprietary product, is proprietary to Si Options.

Order of Use

It should be noted that the method developed by Si Options to remove residual carbon from its unique carbothermal Si3N4 intermediate product can be applied after the residual silica is removed from carbothermal Si3N4 intermediate product, i.e., application of the carbon removal method can follow removal of the residual silica.

Sodium Hydroxide-Treated Silicon Carbide and Silicon Nitride Products

In addition, we developed a unique process that involves the use of sodium hydroxide to dissolve the residual silica from both beta-silicon carbide and silicon nitride. We also discovered that sodium hydroxide treatment removes any residual phosphorous from the silicon nitride product. This is particularly important if the silicon nitride is to be used to produce photovoltaic grade silicon. We have discovered that favorable results are achieved when the sodium hydroxide solution has a concentration of about 4% and the treatment takes place at about 92 deg C.

Effect of Sodium Hydroxide Solutions on Commercial Si3N4

Two grams of commercial Si3N4 were mixed with 100 mls of 3.5% sodium hydroxide and reacted with stirring in a water bath at 80 deg C. for 1 hour. After 1 hour the mixture was removed from the bath and allowed to cool to room temperature. The mixture was then filtered through a cellulose ester 0.45 um filter. The cake was washed in place three times with 15 ml of 0.35% sodium hydroxide. The washed cake was then dried and weighed. Analysis of the filtrate for Si indicated that no Si3N4 had been solubilized. Moreover the weight of the dry cake was essentially the same as the starting weight of the Si3N4. It is concluded by Si Options that solutions of sodium hydroxide will not dissolve commercial Si3N4.

The above test was repeated except that, after the third wash with 0.35% sodium hydroxide, the cake was washed with 15 ml of distilled water. Upon washing with water, the Si3N4 cake unexpectedly passed through the filter. It was concluded that at high pH and/or high ionic strength the small particles of commercial Si3N4 are aggregated into larger particles that cannot pass through the filter. However, if the pH or ionic strength is lowered with a water wash, the larger particles disaggregate into the very small particles that pass through the filter. This suggests that the small particles carry an electric charge and that they can be aggregated and disaggregated depending on the pH or ionic strength. It was presumed that the aggregation/disaggregation phenomena was reversible. This behavior is a unique discovery of Si Options, LLC.

Subsequent tests substantiated the above conclusion. It was shown that commercial Si3N4 in distilled water will readily pass through a 0.45 um cellulose ester filter. However, if either sodium chloride or potassium chloride is added to the Si3N4 solution before filtration the solution becomes cloudy due to the small particles of Si3N4 aggregating into larger colloidal particles of Si3N4. The larger colloidal particles will not pass through a 0.45 um filter. If the colloidal solution is then dialyzed to remove the salt, the solution becomes clear but still contains all of the Si3N4, but in small particle form. Upon filtration the small particles will pass through a 0.45 um filter. This reversible aggregation/disaggregation behavior of particulate Si3N4 is a unique discovery of Si Options, LLC.

Effect of Sodium Hydroxide Solutions on Amorphous Silica Derived from Rice Hulls It is known from the literature that a solution of sodium hydroxide will solubilize crystalline or amorphous silica to individual sodium silicate molecules. Si Options carried out tests to confirm that sodium hydroxide will solubilize the amorphous silica found in rice hulls.

Rice hull silica was prepared by completely oxidizing the leached carbon silica product made from rice hulls to produce pure white amorphous silica. A portion of the rice hull silica was then mixed with commercial grade Si3N4 to produce a mixture that was 10% silica and 90% Si3N4. A portion of the SiO2/Si3N4 mixture was then mixed with nine parts of 3.5% sodium hydroxide solution. This solution was then stirred at 80 deg C. for 1 hour. After cooling to room temperature the solution was filtered through a 0.45 um cellulose ester filter. The cake was washed three times with 0.35% sodium hydroxide. The cake was dried and weighed and the combined filtrates were analyzed for silicon. The weight of the cake was the same weight as the amount of Si3N4 used and the amount of silicon in the filtrate was consistent with the amount of silica used. It was concluded that all of the rice hull silica had been dissolved but none of the Si3N4 had been dissolved.

Removal of Residual Silica and Residual Phosphorous from Si Options Oxidized Carbothermal Si3N4 Product Subsequent to the above tests, Si Options carried out tests to determine the effect of sodium hydroxide solutions on Si Options oxidized carbothermal Si3N4 product (OCT Si3N4). This material was prepared by reacting Si Options devolatilized leached carbon-silica product with nitrogen in a carbothermal reactor to produce a product that was substantially Si3N4 with smaller amounts of residual carbon and silica. The carbon was removed by oxidation in air to produce the oxidized carbothermal Si3N4 product used in these tests. The OCT Si3N4 product was analyzed by X-ray diffraction (XRD). The scans showed significant amounts of alpha Si3N4, lesser amount of beta-Si3N4, and amorphous silica. There were no signs of amorphous carbon. The OCT Si3N4 product had the following mineral composition. (These values are higher than the values reported for Si Options leached carbon-silica product since subsequent unit operations remove significant overall mass without removing the same relative amounts of minerals.) The OCT Si3N4 product was also analyzed for oxygen.

| Values are ppm | | | | | | | |
|---|---|---|---|---|---|---|---|
| Na | Mg | Al | P | K | Ca | Mn | Fe |
| 40 | 20 | <100 | 240 | 40 | 100 | <10 | 230 |

Two parts of the OCT Si3N4 product was mixed with 100 parts of 3.5% sodium hydroxide and the mixture was maintained with stirring at 80 deg C. for 1 hour. The mixture was cooled to room temperature and filtered through a 0.45 um cellulose ester filter. The cake was washed three times with 0.35% sodium hydroxide. Afterwards, the cake was washed one time with distilled water. The cake was dried at 80 deg C. and weighed. The cake was analyzed for the eight minerals shown in the above table, and oxygen. In addition the dried cake was analyzed by X-ray diffraction (XRD). The combined filtrates were analyzed for silicon.

The dry weight of the dried cake was 82% of the original charge material, which, if only silica was solubilized, indicates that the charge material was about 18% silica and about 82% Si3N4. Analysis of the combined filtrates for silicon indicated that the charge material contained 17.8% silica, assuming that all of the Si was derived from silica. The difference in the oxygen content of the dried cake compared to that of the charge material indicated that the charge material was 18.72% silica. XRD scans of the dried cake showed significant alpha-Si3N4, lesser amounts of beta-Si3N4, no amorphous silica and no amorphous carbon. The scans were essentially identical to scans of commercial Si3N4. It was concluded that treatment of OCT Si3N4 with sodium hydroxide followed by washing in more dilute sodium hydroxide followed by a water wash removes all of the silica and leaves most, if not all, the Si3N4 in a solid form. At first glance these results seem consistent with those results obtained from test with commercial Si3N4 and rice hull silica. However, there is an important difference between these sets of results. With commercial Si3N4 it was found that a final water wash caused the Si3N4 to disaggregate and pass through the filter, whereas a final water wash had minimal or no effect on the Si3N4 created by Si Options. This suggests that there is a physical difference between commercial Si3N4 and Si Options Si3N4. In fact, microscopic examination of Si Options Si3N4, as present in the OCT Si3N4 product, indicates that it is composed largely of fibers, whereas commercial Si3N4 is composed of small particles. Since the bulk, if not all, of the Si3N4 in the OCT Si3N4 is in the form of fibers, it is not subject to the aggregation/disaggregation phenomena seen with commercial Si3N4. As a result, after treatment with sodium hydroxide and filtering to remove silica, the cake derived from OCT Si3N4 can be washed with distilled water to remove the sodium hydroxide without loss of the Si3N4 product. If the Si3N4 in the OCT Si3N4 was composed of small particles, washing the cake with water would cause the Si3N4 to pass through the filter. In order to retrieve the Si3N4, the water wash filtrate would have to be dialyzed to remove any sodium hydroxide contained in the wash filtrate and then the water would have to be removed. Thus, the fiber form of Si Options Si3N4 is a great advantage when it comes to removing the residual silica by treatment with sodium hydroxide. This method of removing residual silica from a fibrous type of Si3N4 created by Si Options is a unique invention of Si Options. The resulting carbon free and silica free Si3N4 product produced from rice hulls is also a unique product invented by Si Options.

The following table shows the mineral analysis of the OCT Si3N4 compared to the mineral analysis of the Si3N4 product derived from sodium hydroxide treatment of OCT Si3N4 (NaOH OCT Si3N4). Also shown is the ratio of mineral ppm in OCT Si3N4:mineral ppm in NaOH OCT Si3N4 ("Purification Ratio)

| | Values in ppm | | | | | | | |
|---|---|---|---|---|---|---|---|---|
| Product | Na | Mg | Al | P | K | Ca | Mn | Fe |
| OCT Si3N4 | 40 | 20 | <100 | 240 | 40 | 100 | <10 | 230 |
| NaOH OCT Si3N4 | 580 | 10 | 200 | <4 | 30 | 180 | <10 | 90 |
| Purification Ratio | 0.07 | 2 | <0.5 | >60 | 1.33 | 0.56 | 1 | 2.56 |

The relatively large amount of sodium left in the NaOH OCT Si3N4 product is from the sodium hydroxide and simply means that more than one water wash is required to remove the sodium hydroxide. The most important conclusion to be drawn from the above data is that treatment of OCT Si3N4 with sodium hydroxide is not only effective in removing silica but is also very effective in reducing residual phosphorous to levels less than 4 ppm. The purification ratio for phosphorous is greater than 60. These results indicate that the residual phosphorous in the OCT Si3N4 product is associated with silica and when the silica is solubilized the phosphorous is also solubilized. This is an important result since one use of the NaOH OCT Si3N4 product will be in the production of photovoltaic silicon, which requires very low levels of phosphorous. This method of removing residual phosphorous from the OCT Si3N4 product, or any product containing silica, is a unique invention of Si Options. The NaOH OCT Si3N4 product containing levels of phosphorous less than 100 ppm and more typically less than 4 ppm is a unique silicon nitride product invented by Si Options The stoichiometric reaction between silica and sodium hydroxide indicates that two moles of NaOH are required to dissolve one mole of silica. Test by Si Options indicate that, to obtain full solubilization of the silica in the OCT Si3N4 product, the solubilization mixture should contain at least 4 moles of NaOH for every mole of silica. Accordingly, Si Options recommends that use of its invention for removal of residual silica and phosphorous include at least 4 moles of NaOH for each mole of residual silica.

Type of Filter

The initial tests with sodium hydroxide involved the use of cellulose ester filters. Initially these appeared to work well. However, later when the sodium hydroxide solutions were not allowed to cool before filtration, it was found that the filters would dissolve when the solution was applied on top of the filter. Several types of cellulose based filters were tried but none could hold up to a hot sodium hydroxide solution. Eventually Si Options discovered that Teflon filters would hold up to hot sodium hydroxide solutions. Si Options also discovered that when using Teflon filters it is critical that the first filtration involve a hot solution. If a solution at room temperature is initially applied to the filter, the solution beads up on the filter and does not filter. This is because the Teflon filters are hydrophobic and naturally repel water. However if a hot solution is first applied, water vapor enters the pores of the filter first and wets the filter. Once the filter is wet it will work with both cold and hot solutions. The use of Teflon filters is integral to the overall invention of Si Options for removing silica and/or phosphorous from materials.

Centrifugation vs. Filtration

Although filtration is technically suitable for separating the solubilized silica and phosphorous from the Si Options Si3N4 intermediate products it is observed that filtration associated with the first water wash is slow. At this point in the process the aggregates of the small particles are beginning to break up into smaller aggregates and the size of the aggregates may be such that they partially blind the filter. As washing goes on the aggregates trapped in the filter disaggregate even more and pass through the filter. From then on the filtration is relatively fast.

Because of the slowness of the first water wash filtration, Si Options carried out an investigation to determine the usefulness of centrifugation instead of filtration to separate the solid Si3N4 from dissolved silica, phosphorous and other materials. The tests involved mixing a portion of OCT Si3N4 with a sodium hydroxide solution and stirring the mixture at 90 deg C. for about 30 minutes. The mixture was then centrifuged in a desk top bucket centrifuge at 2,600 rpm for about 10 minutes. The centrate was poured off and the pH of the centrate and its appearance were noted. The pellet was then brought back up distilled water and stirred at 90 deg C. for 30 minutes. The mixture was then centrifuged in a desk top bucket centrifuge at 2,600 rpm for about 10 minutes. The centrate was poured off and the pH of the centrate and its appearance were noted. This process was repeated six more times. The final pellet was dried and weighed. All of the centrates were combined. Sodium hydroxide was added to the combined centrates to increase the ionic strength to cause the small particulate Si3N4 to aggregate. The combined centrate was then centrifuged to remove the aggregated Si3N4 particles. The centrate, devoid of Si3N4 particles, was analyzed for silicon to determine the amount of silica in the original charge material.

The initial centrate had a pH of about 13.9. The pH of subsequent centrates from water washing declined. At a pH of about 12.4 the centrate became cloudy indicating that the aggregated Si3N4 particles were beginning to disaggregate to colloidal size particles that concentrated in the centrate. With further water washes the centrate became less cloudy as the aggregated Si3N4 particles were more fully converted to smaller disaggregated particles that were removed in the centrates. As noted above, the disaggregated Si3N4 particles in the total centrate were reaggregated and separated from the liquid, dried and weighed. The weight of this material was about 5% of the weight of the total Si3N4 in the charge material. This indicates that the Si Options intermediate Si3N4 product is about 5% particulate Si3N4 and about 95% fibrous Si3N4. Further analysis of the data resulted in the conclusion that centrifugation is as effective as filtration in the Si Options process for removing residual silica and phosphorous from Si Options intermediate Si3N4 product.

Recovery of Solubilized Silica

The initial filtrate or centrate from the above process focused on the removal of silica and phosphorous from the OCT Si3N4 product is rich in sodium silicate which can be converted into valuable silica products by the following process. The liquid containing sodium silicate can be concentrated to remove water or not. This material is then treated with acid to lower the pH. As the pH is lowered the sodium silicate is converted to silicic acid, which, in turn, begins to polymerize into amorphous silica particles. Depending on the exact process of lowering the pH and the possible addition of other agents, various amorphous silica products can be formed. These products include silica sols, silica gels, precipitated silica, etc. The silica products can be separated from the surrounding liquid by filtration or other suitable means. The separated silica products can be dried or post treated in other appropriate ways to produce the final product. This process for producing silica by products from the filtrate derived from Si Options unique process for removing silica from its Si3N4 intermediate products and its SiC intermediate products is a unique invention of Si Options. The silica gel products are also inventions of Si Options.

Recovery of Particulate Portion of Si Options, Si3N4 Product

Additional tests by Si Options have shown that, although about 95% of the Si3N4 in the OCT Si3N4 product is in a fibrous form, about 5% of the Si3N4 is in a particulate form. As with commercial Si3N4, the particulate Si3N4 remains in an aggregated state so long as the ionic strength of the solution is significant. Thus during the first filtration or centrifugation the particles remain in an aggregated state and are kept in the cake. This holds true for subsequent washes with lower strength sodium hydroxide for fully remove the solubilized silica. However, once the washes with distilled water are started to remove the sodium hydroxide, the ionic strength of the solution is reduced to the point where the aggregates disaggregate into small particles. The consequence of this behavior is that when the cake is washed with water to remove the NaOH, the small particles pass through the filter and become mixed with the wash water. In this form these small particles are dilute and surrounded by at least some sodium hydroxide. Unless recovered, the loss of these small particles represents about a 5% loss in Si3N4 product.

With this in mind Si Options has developed the following approach for recovery of the particulate Si3N4. This involves dialyzing the solution containing the small particles in distilled water to remove any remaining sodium hydroxide and other small molecules. The bulk of the water is then removed through an evaporative process and the wet particulate Si3N4 is then dried. Alternately, the ionic strength of the dialyzed solution is increased with a salt or other agent which will not interfere with the use of the Si3N4 in a given application. The increase in ionic strength causes the small Si3N4 particles to aggregate into larger particles which can be recovered by filtration or centrifugation or other liquid solid separation techniques.

Process Design for Removal of Residual Silica from Si Options Unique Silicon Nitride Intermediate Product Si Options has carried out a complete preliminary engineering design of it's' process to convert rice hulls into unique carbon-silica products, unique devolatilized carbon-silica products, other unique intermediate products and unique silicon-containing final products. Inputs to this effort were derived from the research and development activities of Si Options as well as from the engineering expertise of its engineering consultant. As part of this effort, a design was developed for the unit operation concerned with removal of residual silica from Si Options unique Si3N4 intermediate product. The product of this operation is a unique silicon nitride product. According to this design Si Options Si3N4 intermediate product is transferred from the area where residual carbon is removed via a cooling (screw) conveyor to feed bins in the area where the residual silica is removed. Apron conveyors draw the silicon nitride intermediate from the feed bins. The material enters a multistage atmospheric leaching process, where it is contacted with caustic solution. The caustic solution is prepared in a separate make-up tank by mixing reagent grade sodium hydroxide pellets with distilled water.

The leach discharge slurry is pumped from the leaching train to a filter feed tank. A horizontal belt filter separates the leach solution from the leach residue. The belt filter is equipped with a series of filtrate receiving tanks to accommodate multiple washing stages. Deionized water is used in the washing stages. The primary filtrate reports to the silica recovery circuit and the wash solution advances to the particulate Si3N4 recovery circuit.

The washed filter cake is transferred from the filter to an indirectly heated rotary dryer. The cake is dried under nitrogen to minimize the possibility of contamination with oxygen and other gases. The nitrogen gas is used on a once-through basis but the hot gases are transferred to the carbothermal area where they are partially consumed in the carbothermal reactor. The dry silicon nitride is conveyed to sealed storage bins, where it is maintained under a nitrogen blanket. This silicon nitride product can be used for ceramic applications or can be used to produce photovoltaic grade silicon.

The silica recovery operation consists of a mechanically agitated tank where the primary filtrate is neutralized (pH about 7.0) with hydrochloric acid. Silica precipitates in the form of a gel, which is separated from the aqueous brine by centrifugation. The gel is recovered as a marketable product, while the brine is disposed of as non-hazardous waste.

This design, which encompasses the use of Si Options proprietary silicon nitride intermediate product and which produces a unique proprietary Si3N4 product as well as a unique silica gel product, is proprietary to Si Options.

Order of Use

It should be noted that the method developed by Si Options to remove residual silica and phosphorous from its OCT Si3N4 product can be applied to the unoxidized carbothermal product as well, i.e., application of the sodium hydroxide method can precede oxidation to remove residual carbon.

Application to Other Products

The invention of Si Options to remove silica and/or phosphorous from its Si3N4 intermediate products can also be applied to any other material containing residual silica where the main material of interest is not dissolved by sodium hydroxide. For example this invention and its use with silicon carbide containing residual silica and silicon containing residual silica, regardless of the method used to produce the silicon carbide or silicon material, is proprietary to Si Options and an invention of Si Options. These examples are not limiting.

Preliminary Investigation of the Decomposition of Reagent Grade Si3N4 to Si and N2

We have performed two preliminary experiments for comparison with the thermodynamic model results. In each experiment, approximately 15 gm of reagent grade Si3N4 were placed in an alumina (Al2O3) crucible, which in turn was placed in an Al2O3 containment tube that was centered in an electrically heated vertical tube furnace. The sealed containment tube was purged with N2 for 20 minutes. Next H2 (1,000 cc/min) supplanted the N2 inlet gas, as the charge temperature was raised from ambient to within +/−5 deg C. of the target. The experiments were performed at 1,520 deg C. and 1,620 deg C. Higher temperatures were not evaluated due to the available equipment limitations. Temperatures were measured with a Type K thermocouple that was positioned just above the crucible. The target temperatures were maintained for 4 hrs. The crucible was allowed to furnace cool under H2. The experimental products were recovered, weighed, and analyzed by x-ray diffraction (XRD).

The XRD pattern for 1520 deg C. product revealed that the sample was mostly composed of silicon nitride (Si3N4). The predominant phase was alpha-Si3N4 but minor amounts of beta-Si3N4 were present. The pattern also showed that a minor amount of cubic Si is present. The 1620 deg C. experiment XRD pattern showed that Si and B-Si3N4 are the major phases in the sample. This indicates that alpha Si3N4 is more easily dissociated than beta-Si3N4. This favors the use of Si3N4 produced from rice hull material as such material contains a very high percentage (approaching 100%) of alpha Si3N4. The experimental results confirmed that it is possible to form Si by processing Si3N4 at high temperature in a H2 atmosphere.

Weight losses of 6.7% and 14.4% were measured in the products from the 1,520 and 1,620 deg C. experiments, respectively. The theoretical weight loss for complete conversion of pure Si3N4 to Si is 39.9%. Assuming that N2 removal accounted for the entire weight loss in each experiment, the data suggests that the Si yields were 16.7% for the 1,520 deg C. experiment and 36.2% for the 1,620 deg C. experiment. These figures actually exceed the yields projected from the thermodynamic analysis.

The higher yields may be explained by the fact that, in the experimental system, the sample was continuously purged with H2, which effectively minimized the N2 partial pressure and thereby provided a driving force for the Si3N4 decomposition. In addition to proving that crystalline Si can be formed by this method, the experimental findings corroborate the thermodynamic model that indicated that the Si yield will substantially improve if the Si3N4 is processed at higher temperature.

Dissociated Silicon Product and Process

Originally, we intended to produce silicon according to the following well know carbothermal reaction:

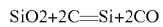

$$SiO_2 + 2C = Si + 2CO$$

Our thermodynamic analysis of this reaction indicated that the reaction would proceed under argon at a temperature of about 2,000 deg C. However, the analysis also showed that at a temperature of about 1,500 deg C., silicon carbide would form. Thus, the feed material must be heated to 2,000 deg C. very quickly. If it is heated slowly, silicon carbide will form at the lower temperature before the silicon can form. We carried out several tests with furnaces that had reasonably fast heat-up rates in an attempt to get past the temperature of about 1500 deg C. as quickly as possible. However, we were not successful in getting past this temperature quickly enough to avoid the formation of silicon carbide.

We performed additional thermodynamic modeling indicating that at around 1750 deg C., silicon nitride dissociates to molten silicon and gaseous nitrogen. We subsequently tested this idea with commercial silicon nitride using a conventional reactor and found that the silicon nitride could be completely dissociated to nitrogen and silicon and that the nitrogen could be removed in the off-gas stream, leaving the molten silicon. Next we tested this idea with our own silicon nitride product made from rice hulls in a conventional reactor and got the same results. We have found that the oxidized and sodium hydroxide-treated silicon nitride product can be dissociated into extremely pure silicon and nitrogen. The dissociated silicon is suitable, for example, for use in the production of solar panels. The idea of using silicon nitride from rice hulls to produce photovoltaic silicon is addressed in a separate patent application.

As it turns out, the method of paragraph 33 is actually preferred over the typical carbothermal route. This is because the production of silicon nitride with an up-flow reactor and the subsequent dissociation of silicon nitride to silicon and nitrogen are, together, much faster than the traditional carbothermal process for the production of silicon, which typically takes a day or longer, and a subsequent process to purify the carbothermal silicon. This is also because the last bits of residual phosphorous can be removed from the silicon nitride product by treatment with sodium hydroxide. Thus, because the resulting silicon nitride is extremely pure, having very low levels of phosphorous, the silicon from disassociation of silicon nitride is extremely pure. On the other hand, if the silicon was produced directly in a carbothermal step, the residual phosphorus would become trapped in the molten silicon and after solidification of the silicon, it would be impossible to remove this small amount of residual phosphorous.

Effect of Temperature on the Rate of Reaction

Since the thermodynamic and experimental results discussed in the above Declaration indicate that, at a pressure of about 1 atmosphere of hydrogen flowing at 1 SLPM, a temperature of 1720 deg C. is needed to get full disassociation of Si3N4 to Si, Si Options carried out a series of test to investigate the affect of temperature in (1550 deg C. to 1750 deg C.) and time (0.5 hours to 4 hours) on the conversion of 5 gm samples of commercial alpha-Si3N4 (99.999% pure) to Si with argon purge gas at 1 SLPM and samples contained in graphite crucibles. Tests were carried out in an externally heated tube furnace capable of reaching 1800 deg C. For each test the sample was placed in a graphite boat in the middle of the hot zone. The back pressure in the system was 2 inches of water (gauge).

Based on weight loss, at 1750 deg C. the conversion of Si3N4 to Si is 100% even at a time of only 30 minutes. At 1650 deg C. the conversion of Si3N4 to Si is 89% after 30 minutes and 100% after 4 hours. At 1550 deg C., the conversion is only 75% even after 4 hours. Thus, under the conditions of these tests, 1550 deg C. is not high enough to provide total conversion of Si3N4 to Si within a reasonable time. These results are generally consistent with the thermodynamic analysis describe in the Declaration.

The Si product from each test was analyzed by X-Ray Diffraction (XRD). The products from all runs at 1550 deg C. and 1650 deg C. contained significant amounts of silicon and smaller amounts of residual Si3N4 regardless of the time. The product from the run conducted at 1750 deg C. and 30 minutes consisted mainly of silicon with a small amount of residual Si3N4. However, the product from the run conducted at 1750 deg C. and 4 hours was essentially 100% silicon with no residual Si3N4. Thus, the conclusion from weight loss data has been modified. The modified conclusion is that a temperature of 1650 deg C. is too low for complete conversion of Si3N4 in less than 4 hours. At a temperature of 1750 deg C. and a time of 1 hour the conversion of Si3N4 is complete. Thus, based on its research, Si Options recommends that a temperature of 1750 deg C. and a time 1 hour be used to get full conversion of Si3N4 in minimal time under the other conditions of these tests. These operating conditions are proprietary to Si Options.

Effect of Operating Temperature on Materials of Construction

Although the conversion of Si3N4 is slower at 1650 deg C. than at 1750 deg C., the latest tests show that full conversion can be accomplished at 1650 deg C. within a time somewhat greater than 30 minutes. Furthermore, the results at 1550 deg C. show that 75% of the Si3N4 can be converted after 4 hours and it is presumed that if enough time is allowed that all of the Si3N4 can be converted at 1550 deg C. Although, there are advantages to fast reaction times (less energy, smaller equipment), there are disadvantages to operating at higher temperatures with one of the main disadvantages being that the materials of construction needed at 1750 deg C. are significantly more costly than those needed at 1550 deg C. Thus, from an economic point of view, under the conditions described in Section A, the overall best temperature to operate at could be 1550 deg C. Only an economic analysis of each situation for a given project can determine which is preferred.

Effect of Operating Pressure on Materials of Construction and Thermodynamic Driving Force Si Options has conducted a thermodynamic study of the affect of pressures less than 1 atmosphere absolute on the conversion of Si3N4 to Si. These studies show that operating at a reduced pressure can have a significant impact on the temperature where full disassociation occurs. For example, the thermodynamic analysis indicates that Si3N4 will dissociate to form liquid Si and nitrogen gas at 1830° C. when the total system pressure is maintained at 1 bar but when the total pressure is maintained at 0.1 bar, dissociation is expected to spontaneously occur at approximately 1670° C. By similar analyses, the approximate dissociation temperatures corresponding to various total pressures are: 1530° C. at 0.01 bar; 1410° C. at 0.001 bar; and 1100° C. at 1.3×10-6 bar.

As noted above the cost of a reactor due to materials of construction is significantly lower at 1550 deg C. compared to 1750 deg C. Although, operation at less than 1 atmosphere gauge carries some additional costs, the savings in materials of construction may greatly outweigh these additional costs. Based on its research, Si Options recommends operating the Si3N4 disassociation reactor at less than 1 atmosphere gauge to minimized the cost of materials of construction of the reactor while keeping the thermodynamic driving force equal to that at 1750 deg C. These operating conditions are proprietary to Si Options.

Effect of Argon vs. Hydrogen and Thick Sample Depth vs. Thin Sample Depth on Reaction Rate The tests described in the declaration differed from the more recent tests with regard to the type of crucible, type purge gas and sample size. As discussed below the material of construction of the crucible can have a small affect on the yield of Si from Si3N4 by encouraging the production of a small amount of Si. However, comparison of the results of the tests in the Declaration to the results of the more recent tests at the same temperature and time indicates that either the use of argon and/or the use of a smaller sample size provide for a much faster reaction rate. For example, at 1650 deg C. under hydrogen and 15 gm of sample, the conversion of Si3N4 to Si was 36%, whereas at the same temperature and time under argon and a 5 gm sample the conversion was 100%. It is possible that the difference in sample weights may have resulted in a difference in sample depth in the crucible. If this were the case, there may have been a difference in the transfer of nitrogen from the site of dissociation to the bulk gas. This, in turn would result in a difference in the nitrogen concentration at the dissociation site. A higher nitrogen concentration at the dissociation site would put "back pressure" on the disassociation reaction and slow it down with the result that less Si3N4 would be disassociated within 4 hours. In any case, based on the more recent results, Si Options recommends the use of argon over hydrogen as the carrier gas to achieve the best technical results. Furthermore, if a packed bed is used with gas flowing across the top of the bed, Si Options recommends using a relatively thin bed to achieve the best technical results. These operating conditions are proprietary to Si Options.

Reactor Types

In all of the above tests investigating the conversion of Si3N4 to Si, the samples were held static in a crucible and the carrier gas flowed across the top of the sample. This type of situation might be labeled "packed bed with gas flow across the top of the bed".

However, as discussed above, the results of these tests seem to be better when the bed was thin, suggesting that the rate of the disassociation reaction may be controlled by the rate of mass transfer of the nitrogen gas from the Si3N4 to the bulk gas flowing across the top of the bed. This being the case, a reactor configuration which enhances the rate of transfer of nitrogen from the Si3N4 particles to the bulk gas would be preferred. One such reactor type would be a continuous or batch fluidized bed reactor. The Si3N4 would be fed into the reactor and the carrier gas would enter at the bottom causing the Si3N4 particles to be fluidized. This would minimize the rate of transfer of the nitrogen from the Si3N4 particles and, thus, enhance the rate of reaction. The resulting nitrogen would leave the top of the reactor and the molten Si would be collected at the bottom of the reactor. Such a reactor would consume less energy and require smaller equipment than the "packed bed with gas flow across the top". Thus, based on its research, Si Options recommends consideration to a fluidized bed reactor operated continuously or in a batch mode. The use of such reactor in this application is proprietary to Si Options.

Other types of reactors which enhance the transfer of nitrogen into the bulk carrier gas should also be considered. These include reactors where the carrier gas flows upward through a packed bed or where the carrier gas flows downward through a packed bed. In both cases the molten Si could be collected at the bottom of the reactor. The use of such reactors in this application is proprietary to Si Options.

Materials of Construction for Crucibles and/or Reactor

Although the conversion of Si3N4 is complete at 1750 deg C. and 1 hour, i.e., no sign of Si3N4 in the XRD scans of the products, there was a small amount of beta-silicon carbide (b-SiC) in the Si product. The SiC formed within the first hour with subsequent formation dropping off significantly after that. There are two possible explanations for the appearance of SiC in the Si product. Firstly, the thermodynamic analysis described in the Declaration show that at temperatures between 1,000 deg C. and 1720 deg C., Si3N4 will react with carbon to form some SiC with most of the product remaining as Si3N4. Since the crucibles in the more recent tests were made of graphite carbon, it is possible that at least some of the SiC in the products was produced by a reaction of the Si3N4 with the graphite. Secondly, it is known from the literature that molten Si will diffuse into carbon material and react with the carbon to form SiC. Thus it is possible that some of the Si formed from the transformation of Si3N4 to Si diffused into the graphite boat and formed SiC and that some of this SiC became incorporated into the product.

The fact that the formation of SiC at 1750 deg C. drops off significantly after 1 hour can be explained by the idea that the SiC forms at the boundary between the Si3N4 and the graphite crucible and/or the molten Si and the graphite crucible, and that eventually a layer of SiC is built up between the remaining Si3N4 and/or the remaining molten Si and the graphite material, making it hard for the remaining Si3N4 and/or molten Si to come into contact with the graphite.

From a yield point of view and from a product purity point of view, it is undesirable to have SiC in the Si product. However, it is very likely that this seeming difficulty can be readily dealt with by using crucibles that are not made of carbon. In this regard, the tests described in the declaration used alumina crucibles and no SiC was detected in the products of these runs. However, there was a thin layer formed on the alumina crucible that contained silica (SiO2), suggesting that alumina will react with Si3N4 and/or Si to form SiO2. It should be noted that SiO2 was not detected in the product removed from the crucible. Nevertheless, it seems advisable not to substitute alumina crucibles for graphite crucibles A search of the chemical literature indicates that neither Si nor Si3N4 react with SiC. Thus, based on its research, Si Options recommends that SiC crucibles be used and that graphite and alumina crucibles be avoided in order to prevent the formation of SiC, which formation has a small affect on the yield of Si from Si3N4 but, more importantly, has an effect on the quality of the Si product. If the type of reactor used does not involve crucibles, one should be careful use materials of construction for the reactor that do not result in the production of SiC. Such material of construction is likely SiC. The investigation of materials of construction for crucibles and reactors is proprietary to Si Options.

Process Designs for Dissociated Silicon Product

Si Options has carried out a complete preliminary engineering design of its process to convert rice hulls into unique carbon-silica products, unique devolatilized carbon-silica products, other unique intermediate products and unique silicon-containing final products. Inputs to this effort were from the research and development activities of Si Options as well as from the engineering expertise of its engineering consultant. As part of this effort, a design was developed for the unit operation concerned with production of the unique dissociated silicon product. According to one design, Si Options unique Si3N4 product is transferred on a closed belt conveyor from the sealed storage bins to a feed bin. The silicon nitride reduction operation is conducted in a batch mode. Silicon nitride is transferred from the feed bin to mold shaped trays, which are then placed inside the high temperature reduction furnace which is operated at about 1 atmosphere. Silicon is reduced by thermal dissociation (calcination) according to the following chemical reaction:

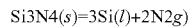

Si3N4(s)=3Si(l)+2N2g)

Argon sweep gas is used to remove the released nitrogen from the furnace. The batch cycle is concluded by allowing the silicon to crystallize. The furnace is equipped to capture any fume that escapes during the processing. The captured fume is placed in molds along with the silicon nitride during the subsequent steps. This furnace can be designed to operate continuously, with mold trays fed into and removed from the furnace on a continuous basis.

In another design, Si Options unique Si3N4 product is transferred on a closed belt conveyor from the sealed storage bins to a feed bin. The silicon nitride reduction operation is carried out in a batch up flow furnace. Silicon nitride is transferred from the feed bin to the furnace. Sweep gas, such as argon, is fed into the bottom of the reactor and carries the released nitrogen out the top of the furnace. Depending on the flow rate of the sweep gas, the silicon nitride may exist in a packed bed state or a fluidized bed state. The molten silicon falls to the bottom of the reactor where it is collected. At the end of the run the molten silicon is drawn off into mold trays which are cooled, allowing the silicon to crystallize. The furnace is equipped to capture any fume that escapes during the processing. The captured fume is fed back into the furnace. This furnace can be designed to operate continuously, with silicon nitride fed into the furnace on a continuous basis and molten silicon drawn of the bottom of the reactor on a continuous basis.

In another design Si Options unique Si3N4 product is transferred on a closed belt conveyor from the sealed storage bins to a feed bin. The silicon nitride reduction operation is conducted in a vacuum furnace operated in a batch mode. Silicon nitride is transferred from the feed bin to mold shaped trays, which are then placed inside of the high temperature reduction furnace. The pressure in the furnace is reduced and the released nitrogen is removed by the vacuum pump. At the end of the run the pressure in the furnace is increased to atmospheric and the mold trays are removed and cooled allowing the silicon to crystallize. The furnace is equipped to capture any fume that escapes during the processing. The captured fume is placed in molds along with the silicon nitride during the subsequent steps.

In another design Si Options unique Si3N4 product is transferred on a closed belt conveyor from the sealed storage bins to a feed bin. The silicon nitride reduction operation is carried out in a vertical vacuum furnace, operated in a batch mode. Silicon nitride is transferred into the reactor from the feed bin. The pressure is reduced and the released nitrogen is removed by the vacuum pump. The molten silicon falls to the bottom of the reactor where it is collected. At the end of the run the pressure is increased to atmospheric pressure and the molten silicon is drawn off into mold trays that are cooled, allowing the silicon to crystallize. The furnace is equipped to capture any fume that escapes during the processing. The captured fume is fed back into the furnace All of these designs encompass the use of Si Options proprietary silicon nitride intermediate product as feed material and produce a unique proprietary silicon product.

Production of Si Options Unique Alpha-Silicon Carbide (a-SiC) and Si Options Unique Beta Silicon Carbide from Si Options Unique Devolatilized Carbon-Silica Product and Si Options Unique Carbon-Silica Product I. Summary Si Options has developed a unique method to produce a inique extremely pure form of a-SiC from its unique devolatilized carbon-silica product. The product consists only of a-SiC with extremely low mineral content. The process involves the use of devolatilized carbon-silica product with a C:SiO2 mole ratio less than 3:1. Yields of a-Si3N4 are highest with ratios only slightly less than 3:1.

The process can be carried out by heating the charge material to 1,550 deg C. and holding at this temperature for awhile to produce b-SiC and then raising the temperature to 2,200 deg C. to convert the b-SiC to a-SiC. The entire process is conducted using argon sweep gas. As the temperature is increased from 1,550 deg C. to 2,200 deg C., residual SiO2 reacts with b-SiC to produce a-SiC (s), SiO (g), CO (g) and Si (volatile). The SiO, CO and Si are removed in the off gas stream. The product consist only of beautiful a-SiC crystals. The crystals are of mostly of light green and light yellow color. The crystals are extremely pure with total mineral levels of about 68 ppm and an aluminum level of 11 ppm. Thus, these crystals are much purer than the commercial a-SiC used for production of advanced ceramics.

The process can also be carried out by heating the charge material directly to 2,200 deg C. to convert the devolatilized carbon-silica product to a-SiC. The entire process is conducted using argon sweep gas. B-SiC is formed at the lower temperatures around 1550 deg C. and at the higher temperatures residual SiO2 reacts with b-SiC to produce a-SiC, SiO (g), CO (g) and Si (volatile). The SiO, CO and Si are removed in the off gas stream. The product consist only of beautiful a-SiC crystals. The crystals are of mostly of light green and light yellow color. The crystals are extremely pure with total mineral levels of about 68 ppm and an aluminum level of 11 ppm. Thus, these crystals are much purer than the commercial a-SiC used for production of advanced ceramics. The methods used to produce the a-SiC products are unique because of the unique feed material used and because of the unique process condition used. Moreover, the a-SiC product produced by the above process is unique because of its unique charge material used, because of the unique process used to prepare it and because of the extremely high mineral purity of the product.

Various types of reactors can be used to produce the unique a-Si3N4 product from the unique devolatilized carbon-silica charge and from the unique process conditions. Such reactors include:

1. Packed bed reactors operated with gas flowing upward or downward through the bed. Such reactors can be operated in a continuous mode or a batch mode.
2. Fluidized bed reactors operated with gas flowing upward through the charge material. Such reactors can be operated in a continuous mode or a batch mode.
3. Packed bed reactors operated with gas flowing across the top of the bed (s). Such reactors can be operated in a continuous mode or a batch mode
4. Rotary reactors with gas flowing across the top of the rotating charge bed. Such reactors can be operated in a continuous mode or a batch mode.

The process developed can also be carried out using Si Options unique carbon-silica products. With such a feed material the volatile material released would be contained in the off gas stream. This volatile material would be recovered from the off gas steam and used to provide energy to the production plant or sold to the market.

II. Background

The stoichiometric equation for the carbothermal production of silicon carbide (SiC) is as follows:

$$SiO2(s)+3C(s)=SiC(s)+2CO(g).$$

Thus, the stoichiometric mole ratio of carbon to silica is 3:1. Beta silicon carbide (b-SiC) is produced at temperatures in the range of 1500 deg C. and above. Alpha silicon carbide (a-SiC) is produced from b-SiC by a phase transformation at a temperature above 2,000 deg C.

III. Thermodynamic Modeling

Si Options has conducted a thermodynamic analysis of the SiO2+C+argon system using a free energy minimization model to gain insight into the optimum carbon:SiO2 ratio (C:SiO2) and temperature to use for maximum yield of b-SiC. The model indicates that the maximum yield of b-SiC is achieved at the stoichiometric C:SiO2 ratio of 3:1. The maximum yield is 97%. At lower ratios and higher ratios the yield becomes less. In addition, contamination by carbon and silica is minimal at the stoichiometric ratio. At higher ratios there is no contamination by silica but the contamination by carbon becomes significant and there is a small amount of contamination by silicon (Si). At lower C:SiO2 ratios there is no contamination by carbon or silicon but there is contamination by silica. At C:SiO2 ratios slightly less than 3:1 the contamination by silica is minimal, but at lower ratios the contamination can become significant. Regarding temperature, the thermodynamic analysis indicated that the yield of b-SiC is highest at 1520 deg C. As the temperature increases the yield drops off slowly. However, at temperatures only slightly less than 1520 deg C. the yield of b-SiC drops off dramatically.

According to the above analysis, if a C:SiO2 mole ratio of the feed for production of beta-SiC were less than 3:1 the product would consists of beta-SiC and a certain amount of SiO2. Accordingly, Si Options also conducted a thermodynamic analysis of the beta-SiC+SiO2+argon system at 2,000 deg C. The stoichiometric mole ratio of beta-SiC to SiO was 1:1. Under these conditions it was predicted that b-SiC would react with SiO2 according to the following equation:

$$b\text{-SiC}+1SiO2=0.35Si+1.3SiO+0.65CO+0.35a\text{-SiC}$$

Thus, if the feed material used to produce b-SiC contains a C:SiO2 ratio which is less than 3:1 the resulting intermediate solid product produced at around 1550 deg C. will consist of b-SiC and SiO2. At a C:SiO2 mole ratio just slightly less than 3:1 the product will be largely b-SiC with a small amount of SiO2. As the temperature is raised to 2,200 deg C. the residual SiO2 will react with a small portion of the beta-SiC to produce some alpha SiC, SiO, CO and Si. The bulk of the b-SiC will be transformed to a-SiC. Thus using a devolatilized carbon-silica product with a mole ratio of C:SiO2 slightly less than 3:1 and heating this material to 2,200 deg should result in high yields of a-Si3N4. Moreover, since SiO and CO are gases they will be removed in the off gas stream. Also since the boiling temperature of Si is very close to 2,200 deg, it is expected that the Si will be volatilized and removed in the off gas. Thus, the a-SiC product should be free of SiO2 and any other contaminating material. Moreover, if the mineral content of the devolatilized carbon-silica product is low, it is expected that the a-SiC product will be extremely pure with regard to minerals.

IV. Tests Carried Out by Si Options to Produce Alpha-Si3N4

Based on the results of its thermodynamic analysis, Si Options carried out tests to examine the production alpha-SiC from two of Si Options unique devolatilized carbon-silica products. One product had a C:SiO2 mole ratio above 3:1 and one product had a C:SiO2 mole ratio less than 3:1.

A. Tests with Devolatilized Carbon-Silica Product with C:SiO2 Mole Ratio of 3.24:1

The tests were conducted in a furnace that was capable of reaching temperatures exceeding 2,200 deg C. The furnace was purged with argon. Temperatures inside the furnace were measured with a pyrometer and the concentration of CO in the off gas was measured.

For test #1, 6.1 gm of devolatilized carbon-silica product was placed in a graphite crucible which was then placed in the furnace. The furnace was purged with argon to removal all air. The furnace was then heated to 1,550 deg C. at 46 deg C./minute and held at that temperature for 69 minutes until the CO concentration in the off gas became essentially zero. It is during this portion of the test that the b-SiC is produced. The temperature was then increased to 2,200 deg C. at 38 deg C./minute and held there for 141 minutes. It is in this portion of the test that the b-SiC is transformed to a-SiC. Afterward, the furnace was cooled and the product in the crucible was then placed in a polycarbonate screw top bottle and purged with argon before the bottle was sealed. Later, the product was examined under the microscope and was also analyzed by X-ray diffraction (XRD). For Test #2, 13.6 gm of charge material was used. The test procedure was similar to that used in test #1, except that the furnace was heated directly to 2,200 deg C. at 59 deg C./minute and held at that temperature for 138 minutes.

The XRD pattern of the product from Test #1 gave strong peaks for alpha/hexagonal-SiC with a trace of alpha/rhomohedral-SiC. There was a trace of b-SiC and some sign of amorphous carbon but no sign of crystalline carbon. There was no sign of amorphous or crystalline SiO2 and no sign of Si. Under the optical microscope the product looked like pieces of amorphous carbon with small crystals embedded in the pieces. There were hexagonal shaped crystals.

The XRD pattern of the product from Test #2 gave strong peaks for alpha/hexagonal-SiC with a trace of rhombohedral SiC. There was a trace of b-SiC. There was some sign of amorphous carbon, but no sign of crystalline carbon. There was no sign of amorphous or crystalline SiO2 and no sign of Si. Under the optical microscope the product looked like pieces of amorphous carbon with small crystals embedded in the pieces. There were hexagonal shaped crystals.

B. Tests with Devolatilized Carbon-Silica Product with C:SiO2 Mole Ratio of 2:1

For test #3, 10.3 gm of charge material was placed in a graphite crucible which was then placed in the furnace. The furnace was purged with argon to removal all air. The furnace was then heated to 1,550 deg C. at 59 deg C./minute and held at that temperature for 83 minutes until the CO concentration in the off gas became essentially zero. It is during this portion of the test that the b-SiC is produced. The temperature was then increased to 2,200 deg C. at 50 deg C./minute and held there for 107 minutes. It is in this portion of the test that the b-SiC is transformed to a-SiC. Afterward, the furnace was cooled and the product in the crucible was removed and weighed and then placed in a polycarbonate screw top bottle and purged with argon before the bottle was sealed. Later the product was examined under the microscope and was also analyzed by X-ray diffraction (XRD). For Test #4, 15 gm of feed material was used. The test procedure was similar to that used in test #3, except that the furnace was heated directly to 2,200 deg C. at 42 deg C./minute and held at that temperature for 177 minutes.

Figure 18:
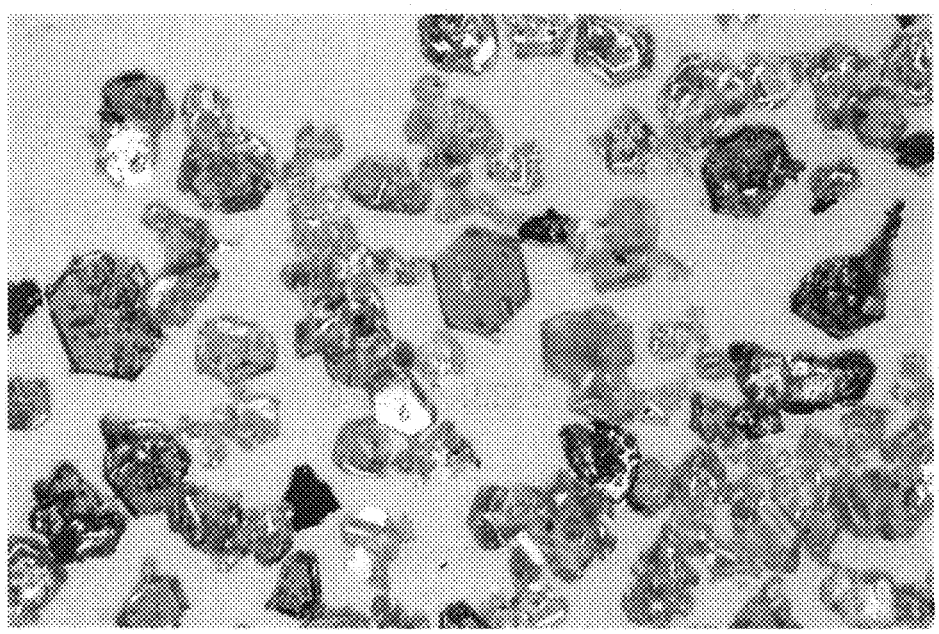
FIG. 18 is a photomicrograph.
Figure 19:
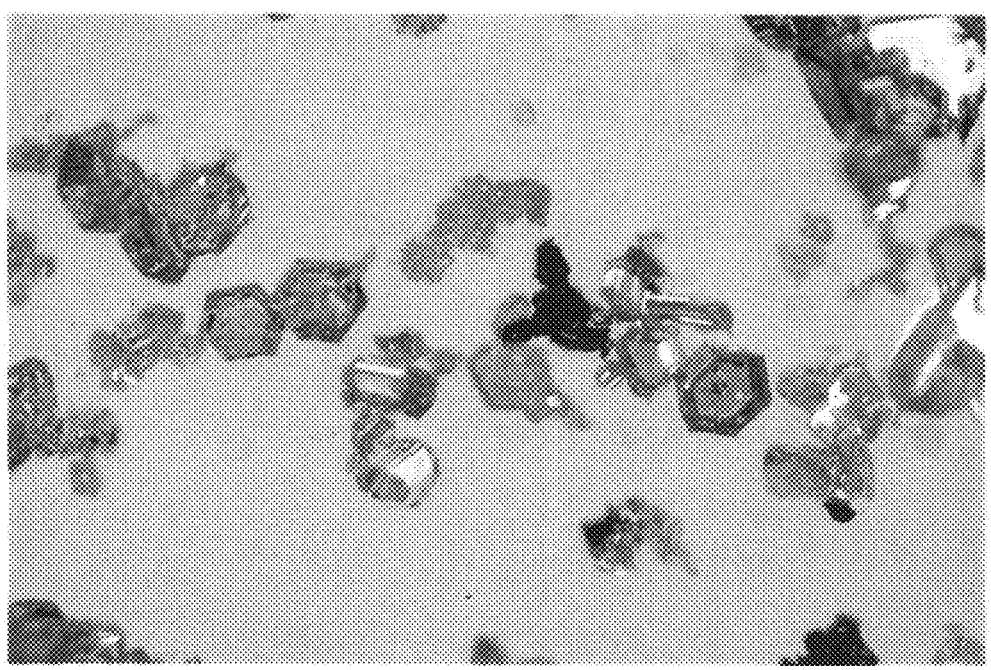
FIG. 19 is a photomicrograph.

For Test #3, the mass yield of the a-SiC product from the devolatilized carbon-silica charge was 16%. The XRD pattern of the product from gave strong peaks for alpha/hexagonal-SiC with a trace of alpha/rhomohedral-SiC. There were no signs of b-SiC, amorphous or crystalline SiO2, amorphous or crystalline carbon and Si. The product examined under an optical microscope and only crystalline material was present. The crystals were beautiful crystals of three colors: light green, light yellow and black. About 80% of the crystals were light green, about 18% were yellow and about 2% were black. The green and yellow crystals were clear. The green crystals displayed hexagonal shape. The yellow crystals were aggregated so it was not possible to discern their individual shape. FIG. 18 is a photo micrograph of these crystals. The crystals were analyzed for a wide number of minerals and it was found that the overall mineral concentration was only 68 ppm and the aluminum concentration was only 11 ppm. This overall mineral concentration is much lower than that of commercial SiC used for production of advanced ceramics and the aluminum concentration is at least ten times lower than commercial SiC used for production of advanced ceramics For Test #4, the mass yield of the a-SiC product from the devolatilized carbon-silica charge was 19%. The XRD pattern of the product from gave strong peaks for alpha/hexagonal-SiC with a trace of alpha/rhomohedral-SiC. There were no signs of b-SiC, amorphous or crystalline SiO2, amorphous or crystalline carbon or Si. Under an optical microscope and only crystalline material was present. The crystals were beautiful crystals of three colors: light green, light yellow and black. About 60-70% of the crystals were light green, about 29-39% were yellow and about 1% were black. The green and yellow crystals were clear. The green crystals displayed hexagonal shape. The yellow crystals were aggregated so it was not possible to discern their individual shape. FIG. 19 is a photo micrograph of these crystals. The crystals were analyzed for a wide number of minerals content and it was found that the overall mineral concentration was only 43 ppm and the aluminum concentration was only 5 ppm. This overall mineral concentration is much lower than that of commercial SiC used for production of advanced ceramics and the aluminum concentration is at least greater than ten times lower than commercial SiC used for production of advanced ceramics The above descriptions of certain embodiments are made for illustrative purposes only and are not intended to be limiting in any manner. Other alterations and modifications of the preferred embodiment will become apparent to those of ordinary skill in the art upon reading this disclosure, and it is intended that the scope of the invention disclosed herein be limited only by the broadest interpretation of the appended claims to which the inventors are legally entitled.

What is claimed is:

1. A high-purity, silicon-containing product selected from the group consisting of silicon, silicon carbide, silicon nitride, alpha-silicon carbide and beta-silicon carbide, said high-purity, silicon-containing product being made by:
   providing a carbon-silica product derived from plant matter containing at least about 3 wt % silica that is leached with an aqueous sulfuric acid solution, the carbon-silica product consisting essentially of fixed carbon and silica bound to each other in a mole ratio of fixed carbon to silica that is appropriate to the stoichiometry of the intended product, said mole ratio being selectively adjustable to different levels between 1.37:1 and 5:1 without combustion and without adding high purity silica, said carbon-silica product containing less than 1000 ppm total mineral impurities in the group consisting of sodium, potassium, magnesium, calcium, manganese, iron, aluminum, boron and phosphorus;
   optionally devolatilizing the carbon-silica product; and
   carbothermally reacting the carbon-silica product or the optionally devolatilized carbon-silica product with a gas selected from the group consisting of hydrogen, argon, nitrogen, ultra-high purity nitrogen, nitrogen and hydrogen, and nitrogen and ammonia at a temperature between 1350° C. and 2200° C.;
   wherein said high-purity, silicon-containing product comprises a combined total of less than 1000 ppm of minerals or metals in the group consisting of sodium, potassium, magnesium, calcium, manganese, iron, aluminum, boron and phosphorus.

2. The high-purity, silicon-containing product of claim 1 wherein the carbon-silica product is devolatilized.

3. The high-purity, silicon-containing product of claim 2 wherein the carbon-silica product is devolatilized by heating.

4. The high-purity, silicon-containing product of claim 2 wherein the carbon-silica product is devolatilized by acid treating.

5. The high-purity, silicon-containing product of claim 1 wherein the carbon-silica product is not devolatilized.

6. The high-purity, silicon-containing product of claim 1 wherein the carbon-silica product or the devolatilized carbon-silica product is reacted with a gas selected from the group consisting of nitrogen, a mixture of nitrogen and hydrogen, and a mixture of nitrogen and ammonia.

7. The high-purity, silicon-containing product of claim 6 wherein the carbon-silica product and gas or the devolatilized carbon-silica product and gas are reacted at a temperature between 1368° C. and 1475° C.

8. The high-purity, silicon-containing product of claim 6 wherein the carbon-silica product and gas or the devolatilized carbon-silica product and gas are reacted in a reactor selected from the group consisting of an up-flow reactor, a rotary tube reactor, a fixed-bed reactor, and a fluidized-bed reactor.

9. The high-purity, silicon-containing product of claim 8 wherein the carbon-silica product and gas or the devolatilized carbon-silica product and gas are reacted in an up-flow reactor.

10. The high-purity, silicon-containing product of claim 6 wherein the flow rate of nitrogen gas per feed mass ranges between 0.1 slpm/gm and 0.8 slpm/gm.

11. The high-purity, silicon-containing product of claim 1 wherein said high-purity, silicon-containing product is silicon nitride selected from the group consisting of fibrous silicon nitride, particulate silicon nitride, or mixtures of fibrous and particulate silicon nitride.

12. The high-purity, silicon-containing product of claim 11 wherein the silicon nitride comprises a combined total of less than 500 ppm of minerals or metals in the group consisting of sodium, potassium, magnesium, calcium, manganese, iron, aluminum, boron and phosphorus.

13. The high-purity, silicon-containing product of claim 12 wherein the silicon nitride comprises a combined total of less than 200 ppm of minerals or metals in the group consisting of sodium, potassium, magnesium, calcium, manganese, iron, aluminum, boron and phosphorus.

14. The high-purity, silicon-containing product of claim 13 wherein the high-purity silicon-containing product is silicon nitride and comprises a combined total of less than 100 ppm of minerals or metals in the group consisting of sodium, potassium, magnesium, calcium, manganese, iron, aluminum, boron and phosphorus.

15. The high-purity, silicon-containing product of claim 1 wherein the high-purity silicon-containing product is silicon nitride containing residual carbon and wherein the residual carbon content of the silicon nitride is reduced by reacting the silicon nitride with air.

16. The high-purity, silicon-containing product of claim 15 wherein the residual carbon content of the silicon nitride is reduced by reacting the silicon nitride with air at a temperature between 950° C. and 1200° C.

17. The high-purity, silicon-containing product of claim 1 wherein the high-purity silicon-containing product is silicon nitride containing residual carbon and wherein the residual carbon content of the silicon nitride is reduced by reacting the silicon nitride with a mixture of carbon monoxide and carbon dioxide.

18. The high-purity, silicon-containing product of claim 17 wherein the residual carbon content of the silicon nitride is reduced by reacting the silicon nitride with a mixture of carbon monoxide and carbon dioxide at a temperature between 950° C. and 1200° C.

19. The high-purity, silicon-containing product of claim 11 wherein said high-purity, silicon-containing product is silicon nitride produced from silicon nitride comprising a major portion of fibrous silicon nitride and excess silica, from which the excess silica is removed by mixing the fibrous silicon nitride with a solution of sodium hydroxide, stirring the mixture at a temperature less than boiling to dissolve the excess silica and then removing the dissolved silica by filtering to produce a cake containing the fibrous silicon nitride, which cake is then washed to remove any remaining sodium hydroxide, after which the cake is dried to produce fibrous silicon nitride.

20. The high-purity, silicon-containing product of claim 19 wherein the sodium hydroxide solution comprises 3.5% sodium hydroxide.

21. The high-purity, silicon-containing product of claim 11 wherein said high-purity, silicon-containing product is silicon nitride produced from silicon nitride comprising a major portion of particulate silicon nitride and excess silica, from which the excess silica is removed by mixing the particulate silicon nitride with a solution of sodium hydroxide, stirring the mixture at a temperature less than boiling, after which the mixture is dialyzed against water to remove the dissolved silica and sodium hydroxide, after which the water is removed from the particulate silicon nitride to produce particulate silicon nitride.

22. The high-purity, silicon-containing product of claim 21 wherein the sodium hydroxide solution comprises 3.5% sodium hydroxide.

23. The high-purity, silicon-containing product of claim 1 comprising less than 100 ppm phosphorus.

24. The high-purity, silicon-containing product of claim 23 comprising less than 10 ppm phosphorus.

25. High-purity silicon produced from the high-purity silicon nitride of claim 11 by dissociation of the silicon nitride to silicon and nitrogen.

26. The high-purity silicon of claim 25 wherein the silicon nitride is dissociated in a reactor at a pressure not less than one atmosphere.

27. The high-purity silicon of claim 25 wherein the silicon nitride is dissociated in hydrogen.

28. The high-purity silicon of claim 27 wherein the silicon nitride is dissociated at a temperature between 1400° C. and 1730° C.

29. The high-purity silicon of claim 25 wherein the silicon nitride is dissociated in argon.

30. The high-purity silicon of claim 29 wherein the silicon nitride is dissociated at a temperature between 1550° C. and 1750° C.

31. The high-purity silicon of claim 26 wherein the silicon is in a molten state.

32. The high-purity silicon of claim 26 wherein the silicon has been solidified from a molten state.

33. The high-purity silicon of claim 25 wherein the silicon nitride is dissociated in a reactor at a pressure less than one atmosphere.

34. The high-purity silicon of claim 33 wherein the silicon is a powder.

35. The high-purity silicon of claim 33 wherein the silicon nitride is dissociated in a gas that is either hydrogen or argon.

36. The high-purity silicon of claim 33 wherein the silicon nitride is dissociated at a pressure of 0.1 bar and a temperature of 1670° C.

37. The high-purity silicon of claim 33 wherein the silicon nitride is dissociated at a pressure of 0.01 bar and a temperature of 1530° C.

38. The high-purity silicon of claim 33 wherein the silicon nitride is dissociated at a pressure of 0.001 bar and a temperature of 1410° C.

39. The high-purity silicon of claim 33 wherein the silicon nitride is dissociated at a pressure of $1 \times 10^{-6}$ bar and a temperature of 1100° C.

40. The high-purity silicon-containing product of claim 1 wherein the product is silicon carbide.

41. The high-purity silicon-containing product of claim 40 wherein the silicon carbide is in the form of beta-silicon carbide.

42. The high-purity silicon-containing product of claim 40 wherein the silicon carbide is in the form of alpha-silicon carbide.

43. The high-purity silicon-containing product of claim 40 wherein the ratio of fixed-carbon to silica is 3:1.

44. The high-purity silicon-containing product of claim 40 wherein the ratio of fixed-carbon to silica is greater than 3:1.

45. The high-purity silicon-containing product of claim 40 wherein the ratio of fixed-carbon to silica is less than 3:1.

46. The high-purity silicon-containing product of claim 40 wherein the carbon-silica product is carbothermally reacted in argon gas.

47. The high-purity silicon-containing product of claim 41 wherein the carbon-silica product is carbothermally reacted in argon gas at a temperature ranging from 1520° C. to 1550° C. to produce beta-silicon carbide.

48. The high-purity silicon-containing product of claim 47 wherein the temperature is then raised to at least 2000° C. to transform the beta-silicon carbide to alpha-silicon carbide.

49. The high-purity silicon-containing product of claim 41 that comprises silicon carbide microcrystals with dimensions of 15 nanometers.

50. The high-purity silicon-containing product of claim 49 wherein the silicon-carbide microcrystals are grouped into particles that are 200 nanometers in diameter.

51. The high-purity silicon-containing product of claim 42, comprising less than 500 ppm minerals or metals in the group consisting of sodium, potassium, magnesium, calcium, manganese, iron, aluminum, boron and phosphorus.

52. The high-purity silicon-containing product of claim 51, comprising less than 100 ppm minerals or metals in the group consisting of sodium, potassium, magnesium, calcium, manganese, iron, aluminum, boron and phosphorus.

53. The high-purity silicon-containing product of claim 52, comprising less than 42 ppm minerals or metals in the group consisting of sodium, potassium, magnesium, calcium, manganese, iron, aluminum, boron and phosphorus.

54. The high-purity silicon-containing product of claim 41, comprising less than 100 ppm phosphorus.

55. The high-purity silicon-containing product of claim 54, comprising less than 10 ppm phosphorus.

56. The high-purity silicon-containing product of claim 42, comprising less than 100 ppm phosphorus.

57. The high-purity silicon-containing product of claim 56, comprising less than 10 ppm phosphorus.

58. The high-purity silicon-containing product of claim 42 wherein the product comprises green and yellow hexagonal crystals.

\* \* \* \* \*